(12) United States Patent
Huang et al.

(10) Patent No.: US 12,479,887 B2
(45) Date of Patent: Nov. 25, 2025

(54) INHIBITORS FOR PROTEIN N-TERMINAL METHYLTRANSFERASE AND USES THEREOF

(71) Applicant: Purdue Research Foundation, West Lafayette, IN (US)

(72) Inventors: Rong Huang, West Lafayette, IN (US); Dongxing Chen, West Lafayette, IN (US); Guangping Dong, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 397 days.

(21) Appl. No.: 16/414,024

(22) Filed: May 16, 2019

(65) Prior Publication Data

US 2019/0352338 A1    Nov. 21, 2019

Related U.S. Application Data

(60) Provisional application No. 62/672,614, filed on May 17, 2018.

(51) Int. Cl.
| | | |
|---|---|---|
| C07K 7/08 | (2006.01) | |
| C07K 7/06 | (2006.01) | |
| A61K 38/00 | (2006.01) | |
| A61P 9/00 | (2006.01) | |
| A61P 25/28 | (2006.01) | |
| A61P 29/00 | (2006.01) | |
| A61P 35/00 | (2006.01) | |
| C07K 5/097 | (2006.01) | |
| C07K 5/117 | (2006.01) | |

(52) U.S. Cl.
CPC ............... *C07K 7/08* (2013.01); *C07K 7/06* (2013.01); *A61K 38/00* (2013.01); *A61P 9/00* (2018.01); *A61P 25/28* (2018.01); *A61P 29/00* (2018.01); *A61P 35/00* (2018.01); *C07K 5/0823* (2013.01); *C07K 5/1024* (2013.01)

(58) Field of Classification Search
CPC .......... A61K 38/00; A61P 25/28; A61P 29/00; A61P 35/00; A61P 9/00; C07K 5/0823; C07K 5/1024; C07K 7/06; C07K 7/08; C12N 9/99
See application file for complete search history.

(56) References Cited

FOREIGN PATENT DOCUMENTS

WO    WO-2009144432 A1 * 12/2009 ........... A61K 31/495

OTHER PUBLICATIONS

Kazutetsu Aoshiba, Nicotine prolongs neutrophil survival by suppressing apoptosis, J Lab Clin Med vol. 1-27, No. 2, 1996.*
Roderich Walter, Time-Dependency of Neurohypophysealpeptide Attenuation of Puromycin Amnesia in Mice, Inter. J. Peptide Prot. Res. 16, 1980, 482-486.*
Lifetein* (https://www.lifetein.com/handling_and_storage_of_synthetic_peptides.html; Peptide synthesis: Handling and Storage of synthetic peptides, published on 2014).*
Matthieu Sainlos, Tools for investigating peptide-protein interactions: peptide incorporation of environment-sensitive fluorophores via on-resin derivatization, 3202, vol. 2 No. 12, 2007, Nature Protocols.*
Lifetein (https://www.lifetein.com/Peptide-Synthesis-Amidation-Acetylation.htm, published online 2013).*
Tatos Akopian, Cleavage Specificity of *Mycobacterium tuberculosis* ClpP1P2 Protease and Identification of Novel Peptide Substrates and Boronate Inhibitors with Anti-bacterial Activity, The Journal of Biological Chemistry vol. 290, No. 17, pp. 11008-11020, Apr. 24, 2015.*
Romualdo Forino, Side-reactions in peptide synthesis, Int. J. Peptide Res. 43, 1994, pp. 513-519.*
Dongxing Chen, Structure-based Discovery of Cell-Potent Peptidomimetic Inhibitors for Protein N-Terminal Methyltransferase 1, ACS Med Chem Lett. Mar. 1, 2021;12(3):485-493.*
Guangping Dong, Improved Cell-Potent and Selective Peptidomimetic Inhibitors of Protein N-Terminal Methyltransferase 1, Molecules, Feb. 18, 2022;27(4):1381.*
Cho, M., et al., "DOT1L cooperates with the c-Myc-p300 complex to epigenetically derepress CDH1 transcription factors in breast cancer progression", Nat Commun, 2015, 6, 7821, p. 14.
Yao, Y., et al., "Selective inhibitors of histone methyltransferase DOT1L: design, synthesis, and crystallographic studies", J Am Chem Soc, 2011, 133, pp. 16746-16749.
Liu, X., et al., "Coactivator-associated arginine methyltransferase 1 targeted by miR-15a regulates inflammation in acute coronary syndrome", Atherosclerosis, 2014, 233, pp. 349-356.
Tsai, W., et al., et al., "PRMT5 modulates the metabolic response to fasting signals", Proc Natl Acad Sci U S A 2013, 110, pp. 8870-8875.
Scaramuzzino, C., et al., "Protein Arginine Methyltransferase 6 Enhances Polyglutamine-Expanded Androgen Receptor Function and Toxicity in Spinal and Bulbar Muscular Atrophy", Neuron 2015, 85, pp. 88-100.
Bonsginore, L., et al., "NRMT1 knockout mice exhibit phenotypes associated with impaired DNA repair and premature aging", Mech Ageing Dev 2015, 146-148, pp. 42-52.
Bonsignore, L., et al., "Loss of the N-terminal methyltransferase NRMT1 increases sensitivity to DNA damage and promotes mammary oncogenesi", Oncotarget, 2015, 6, pp. 12248-12263.
Dong, C., et al., "Structural basis for substrate recognition by the human N-terminal methyltransferase", Genes Dev, 2015, 29, pp. 2343-2348.

(Continued)

*Primary Examiner* — Julie Ha
*Assistant Examiner* — Erinne R Dabkowski
(74) *Attorney, Agent, or Firm* — Schwegman Lundberg & Woessner, P.A.

(57) ABSTRACT

The present invention relates to series of peptidomimetic compounds as an inhibitor targeting protein N-terminal methyltransferase pharmacological pathway. Pharmaceutical compositions of those compounds and methods of using them in the treatment of diseases caused by abnormal protein methyltransferase pathway, including cancer, inflammation, neurodegenerative and cardiovascular diseases, are within the scope of this disclosure.

2 Claims, No Drawings

Specification includes a Sequence Listing.

(56) References Cited

OTHER PUBLICATIONS

Gursoy-Yuzugullu, O., et al., "Oncotarget. Apr. 11, 2017;8(15):24518-24532. doi: 10.18632/oncotarget. 15543. Epigenetic therapy with inhibitors of histone methylation suppresses DNA damage signaling and increases glioma cell radiosensitivity", Oncotarget, 2017, 8, pp. 24518-24532.

Liszczak, G., et al., "Molecular basis for N-terminal acetylation by the heterodimeric NatA complex", Nat. Struct. Mol. Biol., 2013, 20, pp. 1098-1105.

Richardson, S., et al., "Kinetic Mechanism of Protein N-terminal Methyltransferase 1*", J. Biol. Chem. 290, 2015, pp. 11601-11610.

Chan-Penebre, E., et al., "A selective inhibitor of PRMT5 with in vivo and in vitro potency in MCL models", Chem. Biol. 2015, 11, pp. 432-437.

* cited by examiner

INHIBITORS FOR PROTEIN N-TERMINAL METHYLTRANSFERASE AND USES THEREOF

CROSS REFERENCE TO RELATED APPLICATIONS

This present patent application relates to and claims the priority benefit of U.S. Provisional Application Ser. No. 62/672,614, filed May 17, 2018, the content of which is hereby incorporated herein by reference in its entirety

GOVERNMENT SUPPORT CLAUSE

This invention was made with government support under a grant GM117275-02, awarded by the National Institute of Health. The government has certain rights in the invention.

STATEMENT OF SEQUENCE LISTING

A computer-readable form (CRF) of the Sequence Listing is submitted with this application. The CRF file, generated on Jul. 29, 2019, is entitled 68180-02_ST25_txt. Applicant states that the content of the computer-readable form is the same and the information recorded in computer readable form is identical to the written sequence listing.

TECHNICAL FIELD

The present disclosure generally relates to compounds as a therapeutic intervention, particularly to a class of peptidomimetic small molecular inhibitors to protein methyltransferases (PMTs).

BACKGROUND

This section introduces aspects that may help facilitate a better understanding of the disclosure. Accordingly, these statements are to be read in this light and are not to be understood as admissions about what is or is not prior art.

Emerging evidence implies that protein methyltransferases (PMTs) play a crucial role in diverse biological processes and various human diseases including cancer, inflammation, neurodegenerative, and cardiovascular diseases (Cho, M H, et al., *Nat. Commun.* 2015, 6, 7821). They are key epigenetic regulators in gene expression, chromatin structure, and epigenetic pathways. Two well-known PMTs are protein arginine methyltransferases (PRMTs) and protein lysine methyltransferases (PKMTs). These two PMTs have stimulated increasing interest as a novel class of potential therapeutic targets over the past decade and have already shown promise in treating many diseases including cancer. Therefore, targeting PMTs activity has been aggressively pursued within the drug discovery field for effective treatments of hematological malignancies and some solid tumors.

Cancer is a group of most diverse diseases involving abnormal cell growth. Currently there are more than 100 types of identified cancer that affect human beings as well as animals. In 2016, there were an estimated 1,685,210 new human cancer cases diagnosed and 595,690 cancer deaths in the U.S. alone (Cancer Statistics 2016—American Cancer Society, Inc.). There are unmet and increasing needs for new and novel therapies for fighting cancers.

SUMMARY

These and other features, aspects and advantages of the present invention will become better understood with reference to the following associated descriptions and claims.

In some illustrative embodiments, this present invention is related to a compound having a general formula (I):

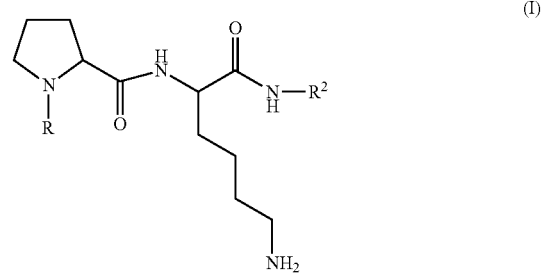

or a pharmaceutically acceptable salt thereof, wherein,

R is an alkyl, alkenyl, alkynyl, acyl, arylalkylacyl, arylacyl, cycloalkyl, heterocyclyl, aryl, heteroaryl, arylalkyl, or heteroarylalkyl, each of which is optionally substituted; and $R^2$ is an alkyl, alkenyl, alkynyl, acyl, cycloalkyl, heterocyclyl, aryl, heteroaryl, arylalkyl, or heteroarylalkyl, one to twelve amino acid residues (together with the attached nitrogen), each of which is optionally substituted.

In some illustrative embodiments, this present invention is related to a compound having a general formula (II):

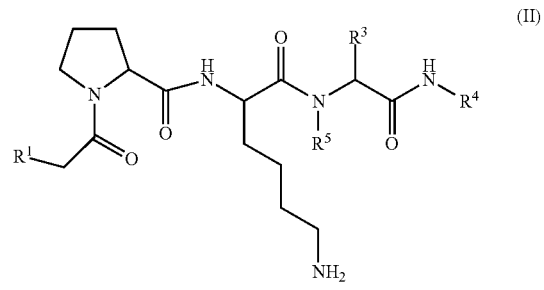

or a pharmaceutically acceptable salt thereof, wherein, $R^1$ is an alkyl, alkenyl, alkynyl, cycloalkyl, heterocyclyl, aryl, heteroaryl, arylalkyl, or heteroarylalkyl, each of which is optionally substituted;

$R^3$ is an alkyl, alkenyl, alkynyl, acyl, arylalkylacyl, arylacyl, cycloalkyl, heterocyclyl, aryl, heteroaryl, arylalkyl, heteroarylalkyl, alkylamino, alkylaminoalkyl, or alkylguanidino, each of which is optionally substituted;

$R^4$ is hydrogen, an alkyl, alkenyl, alkynyl, acyl, cycloalkyl, heterocyclyl, aryl, heteroaryl, arylalkyl, or heteroarylalkyl, one to eleven amino acid residues (together with the attached nitrogen), each of which is optionally substituted; and $R^5$ is hydrogen or an alkyl.

In some illustrative embodiments, this present invention is related to a compound having a general formula (III):

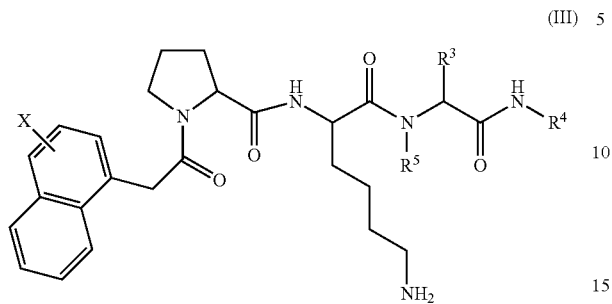

or a pharmaceutically acceptable salt thereof, wherein,
X represents seven substituents, independently, wherein X is hydrogen or halo;

$R^3$ is an alkyl, alkenyl, alkynyl, acyl, arylalkylacyl, arylacyl, cycloalkyl, heterocyclyl, aryl, heteroaryl, arylalkyl, heteroarylalkyl, alkylamino, alkylaminoalkyl, or alkylguanidino, each of which is optionally substituted;

$R^4$ is hydrogen, an alkyl, alkenyl, alkynyl, acyl, cycloalkyl, heterocyclyl, aryl, heteroaryl, arylalkyl, or heteroarylalkyl, one to eleven amino acid residues (together with the attached nitrogen), each of which is optionally substituted; and $R^5$ is hydrogen or methyl.

In some illustrative embodiments, this present invention is related to a compound having a general formula (III), wherein $R^3$ is an alkylamino or alkylguanidino, each of which is optionally substituted; X is hydrogen; and $R^4$ and $R^5$ are hydrogen.

In some illustrative embodiments, this present invention is related to a compound having a general formula (III), wherein said compound is:

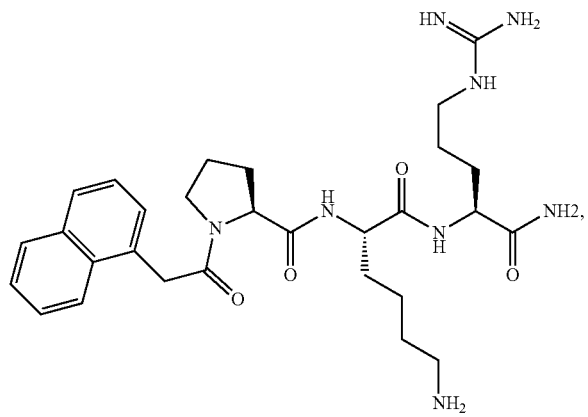

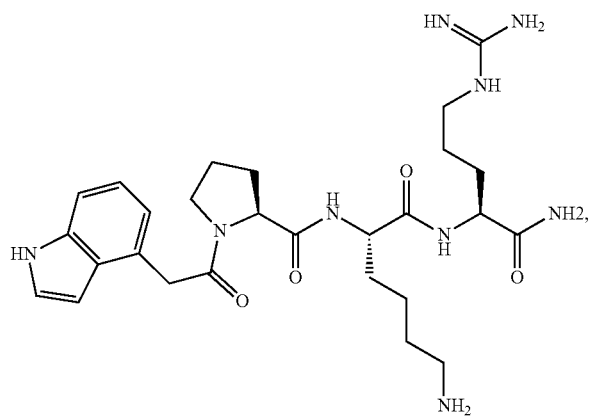

-continued
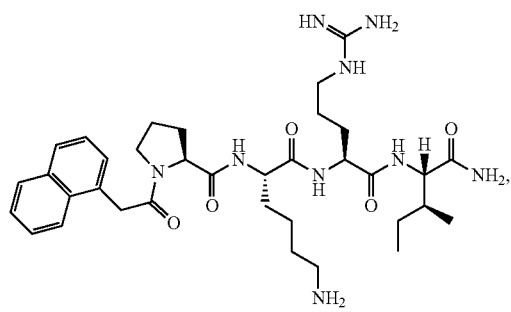
(SEQ ID NO: 1)
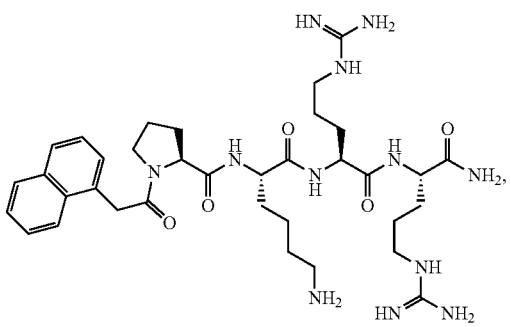
(SEQ ID NO: 2)
(SEQ ID NO: 3)
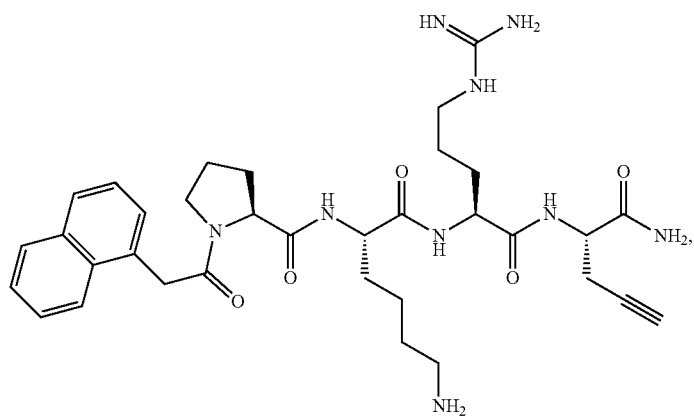
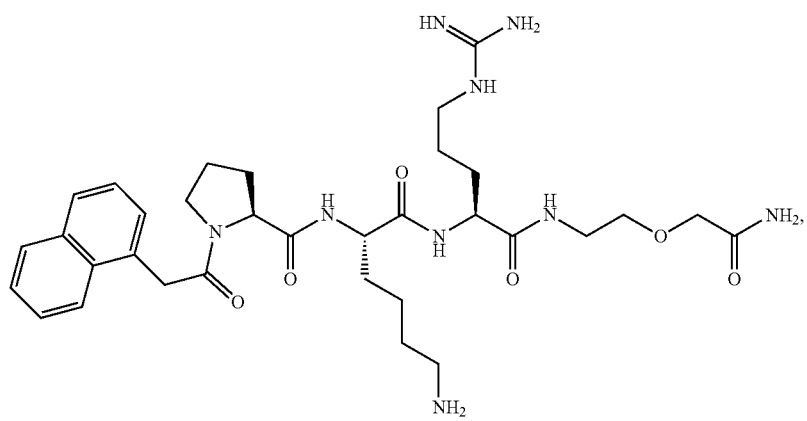

-continued
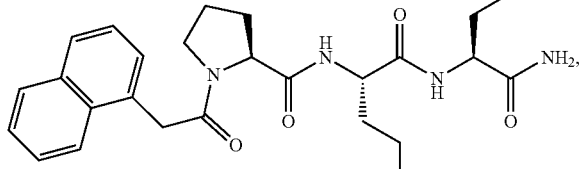
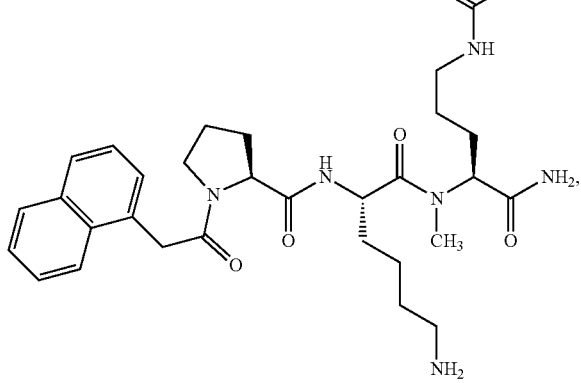
(SEQ ID NO: 4)
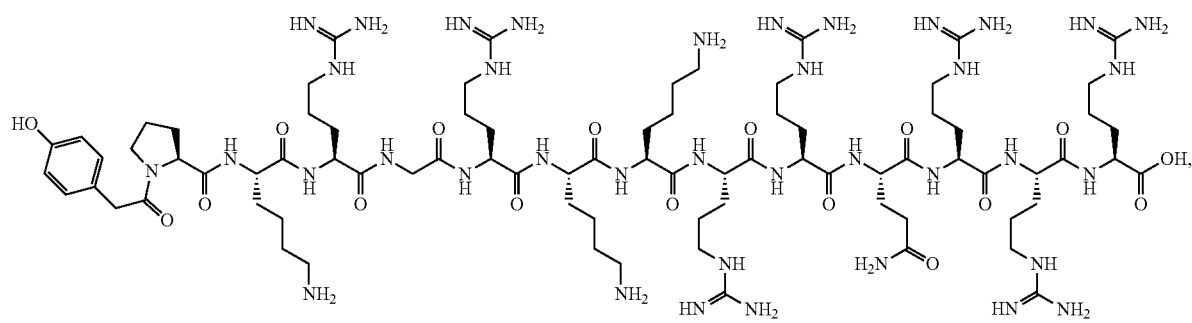
(SEQ ID NO: 5)
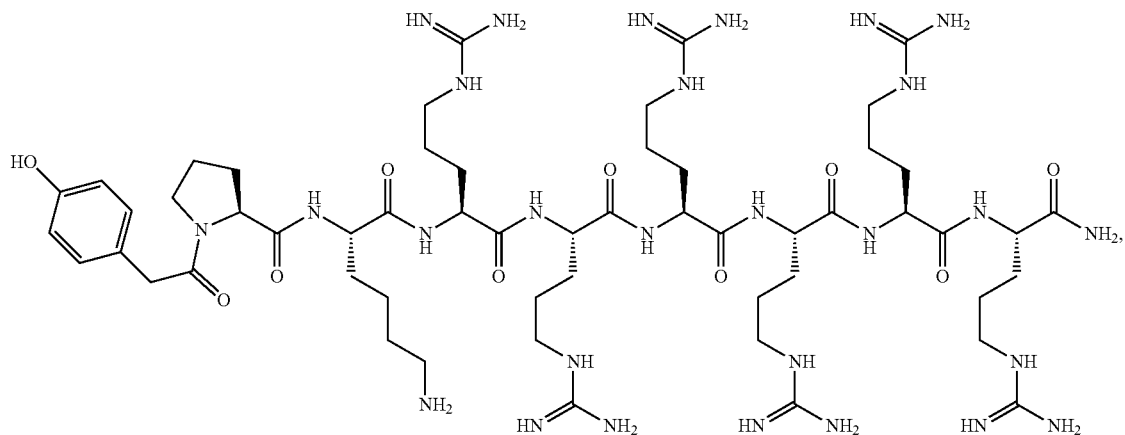

(SEQ ID NO: 6)
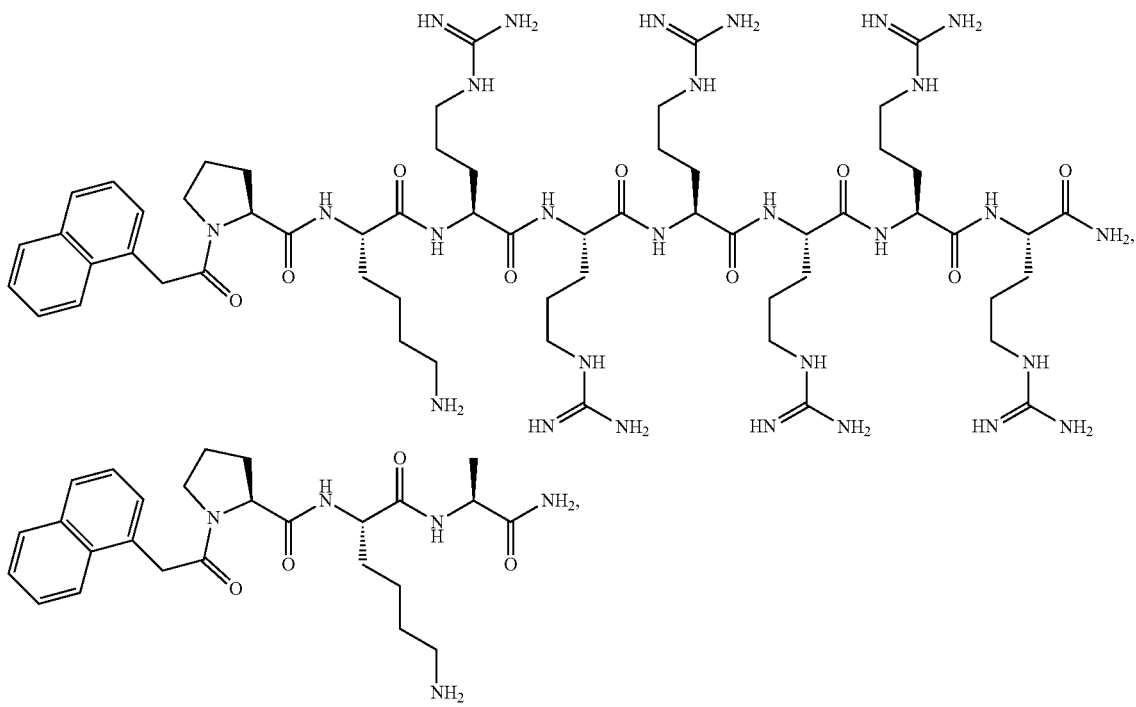
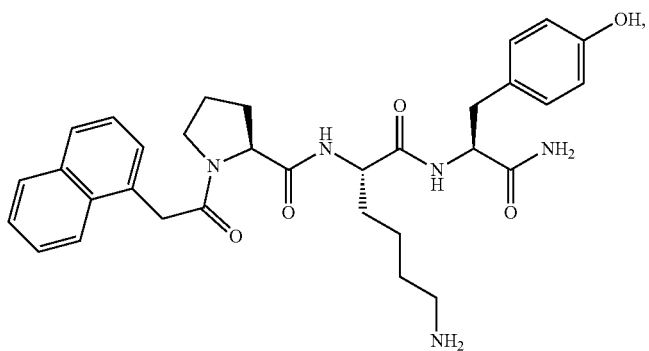
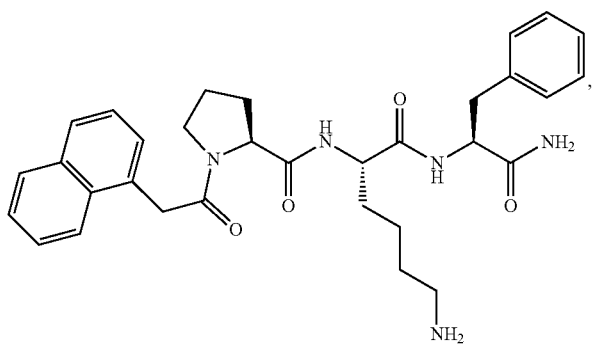

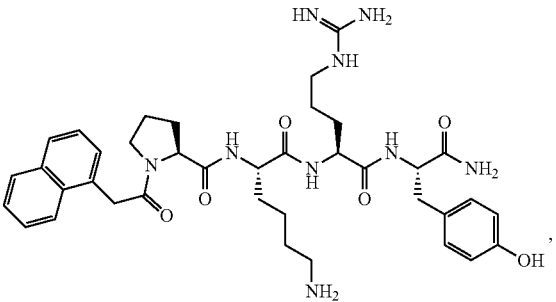

(SEQ ID NO: 7)

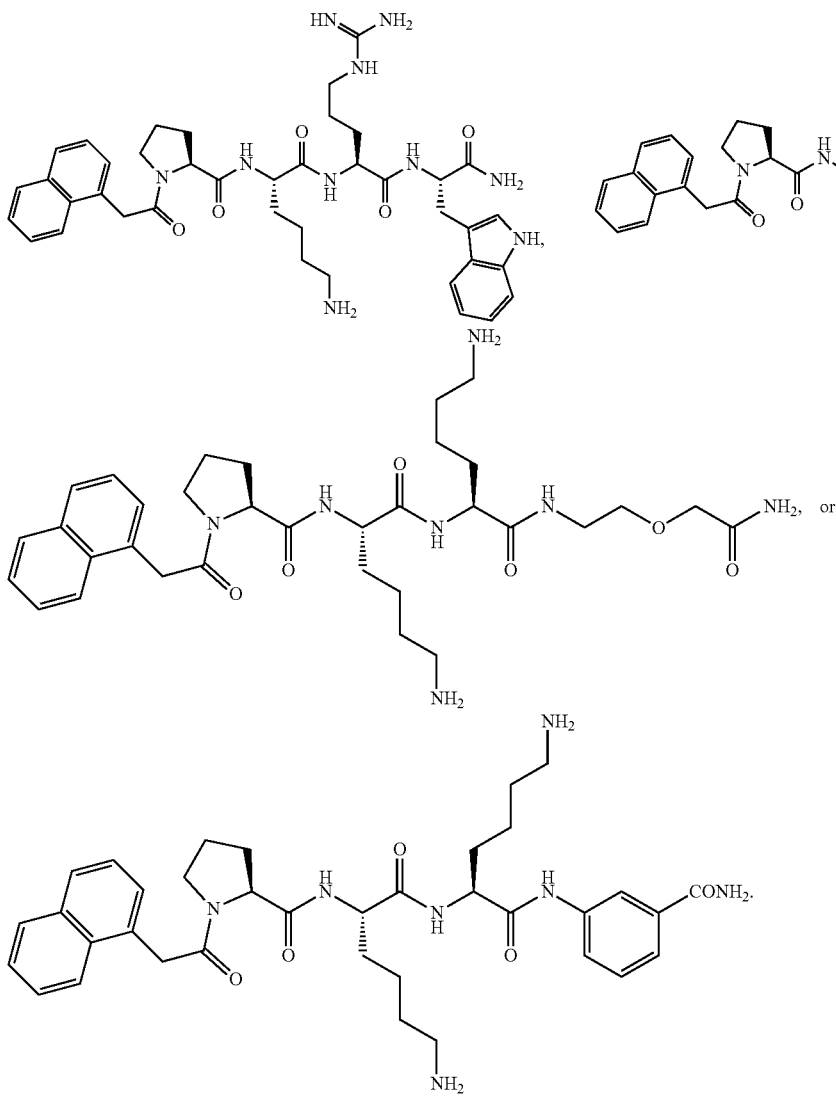

(SEQ ID NO: 8)

In some other embodiments, this present invention is related to a pharmaceutical composition comprising one or more compounds disclosed herein, together with one or more pharmaceutically acceptable diluents, excipients, or carriers.

In another embodiment, this present invention is related to a pharmaceutical composition comprising one or more compounds disclosed herein, together with one or more other therapeutically effective compounds and pharmaceutically acceptable diluents, excipients, or carriers.

In another embodiment, this present invention is related to a pharmaceutical composition comprising a compound disclosed herein, and a therapeutically effective amount of one or more other compounds targeting protein N-terminal methyltransferase pharmacological pathway, together with one or more therapeutically one or more pharmaceutically acceptable excipients.

In some embodiments, this present invention is related to a method for treating a patient with a cancer, the method comprising the step of administering a therapeutically effective amount of the compound disclosed herein to the patient in need of relief from said cancer.

In some embodiments, this present invention is related to a method for treating a patient with a prostate, lung, breast, or pancreatic cancer, the method comprising the step of administering a therapeutically effective amount of the compound disclosed herein to the patient in need of relief from said cancer.

In some embodiments, this present invention is related to a method for treating a patient with a cancer, the method comprising the step of administering a therapeutically effective amount of the compound disclosed herein, together with a therapeutically effective amount of a compound of the same or different mode of action, to the patient in need of relief from said cancer.

In some embodiments, this present invention is related to a method for treating a patient with a cancer, the method comprising the step of administering a therapeutically effective amount of the compound disclosed herein, together with a therapeutically effective amount of a compound targeting protein N-terminal methyltransferase pharmacological pathway, to the patient in need of relief from said cancer.

In some embodiments, this present invention is related to a method for treating a patient with a prostate, lung, breast, or pancreatic cancer, the method comprising the step of administering a therapeutically effective amount of the compound disclosed herein, together with a therapeutically effective amount of a compound targeting protein N-terminal methyltransferase pharmacological pathway, to the patient in need of relief from said cancer.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Those skilled in the art will recognize that numerous modifications can be made to the specific implementations described above. The implementations should not be limited to the particular limitations described. Other implementations may be possible.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. In the present disclosure the term "about" can allow for a degree of variability in a value or range, for example, within 10%, within 5%, or within 1% of a stated value or of a stated limit of a range. In the present disclosure the term "substantially" can allow for a degree of variability in a value or range, for example, within 90%, within 95%, or within 99% or more of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In each of the foregoing and following embodiments, it is to be understood that the formulae include and represent not only all pharmaceutically acceptable salts of the compounds, but also include any and all hydrates and/or solvates of the compound formulae or salts thereof. It is to be appreciated that certain functional groups, such as the hydroxy, amino, and like groups form complexes and/or coordination compounds with water and/or various solvents, in the various physical forms of the compounds. Accordingly, the above formulae are to be understood to include and represent those various hydrates and/or solvates. In each of the foregoing and following embodiments, it is also to be understood that the formulae include and represent each possible isomer, such as stereoisomers and geometric isomers, both individually and in any and all possible mixtures. In each of the foregoing and following embodiments, it is also to be understood that the formulae include and represent any and all crystalline forms, partially crystalline forms, and non-crystalline and/or amorphous forms of the compounds.

The compounds described herein may contain one or more chiral centers, or may otherwise be capable of existing as multiple stereoisomers. It is to be understood that in one embodiment, the invention described herein is not limited to any particular stereochemical requirement, and that the compounds, and compositions, methods, uses, and medicaments that include them may be optically pure, or may be any of a variety of stereoisomeric mixtures, including racemic and other mixtures of enantiomers, other mixtures of diastereomers, and the like. It is also to be understood that such mixtures of stereoisomers may include a single stereochemical configuration at one or more chiral centers, while including mixtures of stereochemical configuration at one or more other chiral centers.

Similarly, the compounds described herein may be include geometric centers, such as cis, trans, e.g. E, and Z, double bonds. It is to be understood that in another embodiment, the invention described herein is not limited to any particular geometric isomer requirement, and that the compounds, and compositions, methods, uses, and medicaments that include them may be pure, or may be any of a variety of geometric isomer mixtures. It is also to be understood that such mixtures of geometric isomers may include a single configuration at one or more double bonds, while including mixtures of geometry at one or more other double bonds.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups.

The term "alkyl" as used herein refers to substituted or unsubstituted straight chain and branched alkyl groups and cycloalkyl groups having from 1 to 40 carbon atoms ($C_1$-$C_{40}$), 1 to about 20 carbon atoms ($C_1$-$C_{20}$), 1 to 12 carbons ($C_1$-$C_{12}$), 1 to 8 carbon atoms ($C_1$-$C_8$), or, in some embodiments, from 1 to 6 carbon atoms ($C_1$-$C_6$). Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to substituted or unsubstituted straight chain and branched divalent alkenyl and cycloalkenyl groups having from 2 to 20 carbon atoms ($C_2$-$C_{20}$), 2 to 12 carbons ($C_2$-$C_{12}$), 2 to 8 carbon atoms ($C_2$-$C_8$) or, in some embodiments, from 2 to 4 carbon atoms ($C_2$-$C_4$) and at least one carbon-carbon double bond. Examples of straight chain alkenyl groups include those with from 2 to 8 carbon atoms such as —CH=CH—, —CH=CHCH$_2$— and the like. Examples of branched alkenyl groups include, but are not limited to, —CH=C (CH$_3$)— and the like.

The term "alkylene" as used herein refers to substituted or unsubstituted straight chain and branched divalent alkylene groups and cycloalkylene groups having from 1 to 40 carbon atoms ($C_1$-$C_{40}$), 1 to about 20 carbon atoms ($C_1$-$C_{20}$), 1 to 12 carbons ($C_1$-$C_{12}$), 1 to 8 carbon atoms ($C_1$-$C_8$) or, in some embodiments, from 1 to 4 carbon atoms ($C_1$-$C_4$), from 1 to 5 carbon atoms ($C_1$-$C_5$), from 2 to 5 carbon atoms ($C_2$-$C_5$) or from 3 to 4 carbon atoms ($C_3$-$C_4$). Examples of straight chain alkylene groups include those with from 1 to 8 carbon atoms such as methylene (—CH$_2$—), ethylene (—CH$_2$CH$_2$—), n-propylene (—CH$_2$CH$_2$CH$_2$—), n-butylene (—CH$_2$(CH$_2$)$_2$CH$_2$—) and the like. Examples of branched alkylene groups include, but are not limited to, isopropylidene (CH$_2$CH(CH$_3$)) and the like. Examples of cycloalkylene groups include, but are not limited to, cyclopropylidene, cyclobutylidene, cyclopentylidene and the like.

The term "hydroxyalkyl" as used herein refers to alkyl groups as defined herein substituted with at least one hydroxyl (—OH) group.

The term "cycloalkyl" as used herein refers to substituted or unsubstituted cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. In some embodiments, cycloalkyl groups can have 3 to 6 carbon atoms ($C_3$-$C_6$). Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like.

The term "acyl" as used herein refers to a group containing a carbonyl moiety wherein the group is bonded via the carbonyl carbon atom. The carbonyl carbon atom is also bonded to another carbon atom, which can be part of a substituted or unsubstituted alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-40, 6-10, 1-5 or 2-5 additional carbon atoms bonded to the carbonyl group. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "heterocyclylcarbonyl" is an example of an acyl group that is bonded to a substituted or unsubstituted heterocyclyl group, as the term "heterocyclyl" is defined herein. An example of a heterocyclylcarbonyl group is a prolyl group, wherein the prolyl group can be a D- or an L-prolyl group.

The term "aryl" as used herein refers to substituted or unsubstituted cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons ($C_6$-$C_{14}$) or from 6 to 10 carbon atoms ($C_6$-$C_{10}$) in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" and "arylalkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to substituted or unsubstituted aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. In some embodiments, heterocyclyl groups include heterocyclyl groups that include 3 to 8 carbon atoms ($C_3$-$C_8$), 3 to 6 carbon atoms ($C_3$-$C_6$) or 6 to 8 carbon atoms ($C_6$-$C_8$). A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. Representative heterocyclyl groups include, but are not limited to pyrrolidinyl, azetidinyl, piperidynyl, piperazinyl, morpholinyl, chromanyl, indolinonyl, isoindolinonyl, furanyl, pyrrolidinyl, pyridinyl, pyrazinyl, pyrimidinyl, triazinyl, thiophenyl, tetrahydrofuranyl, pyrrolyl, oxazolyl, oxadiazolyl, imidazolyl, triazyolyl, tetrazolyl, benzoxazolinyl, benzthiazolinyl, and benzimidazolinyl groups.

The term "heteroarylalkyl" as used herein refers to alkyl groups as defined herein in which a hydrogen or carbon bond of an alkyl group is replaced with a bond to a heteroaryl group as defined herein.

The term "amine" as used herein refers to primary, secondary, and tertiary amines. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, perfluorobutyl, —CF(CH$_3$)$_2$ and the like.

As used herein, the term "salts" and "pharmaceutically acceptable salts" refer to derivatives of the disclosed compounds wherein the parent compound is modified by making acid or base salts thereof. Examples of pharmaceutically acceptable salts include, but are not limited to, mineral or organic acid salts of basic groups such as amines; and alkali or organic salts of acidic groups such as carboxylic acids. Pharmaceutically acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

Pharmaceutically acceptable salts can be synthesized from the parent compound which contains a basic or acidic moiety by conventional chemical methods. In some instances, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in Remington's Pharmaceutical Sciences, 17th ed., Mack Publishing Company, Easton, Pa., 1985, the disclosure of which is hereby incorporated by reference.

The term "solvate" means a compound, or a salt thereof, that further includes a stoichiometric or non-stoichiometric amount of solvent bound by non-covalent intermolecular forces. Where the solvent is water, the solvate is a hydrate.

The term "prodrug" means a derivative of a compound that can hydrolyze, oxidize, or otherwise react under biological conditions (in vitro or in vivo) to provide an active compound, particularly a compound of the invention. Examples of prodrugs include, but are not limited to, derivatives and metabolites of a compound of the invention that include biohydrolyzable moieties such as biohydrolyzable amides, biohydrolyzable esters, biohydrolyzable carbamates, biohydrolyzable carbonates, biohydrolyzable ureides, and biohydrolyzable phosphate analogues. Specific prodrugs of compounds with carboxyl functional groups are the lower alkyl esters of the carboxylic acid. The carboxylate esters are conveniently formed by esterifying any of the carboxylic acid moieties present on the molecule. Prodrugs can typically be prepared using well-known methods, such as those described by Burger's Medicinal Chemistry and Drug Discovery 6th ed. (Donald J. Abraham ed., 2001, Wiley) and Design and Application of Prodrugs (H. Bundgaard ed., 1985, Harwood Academic Publishers GmbH).

Various embodiments of the present invention also contemplate pharmaceutical compositions comprising one or more compounds of the various embodiments of the present invention and one or more pharmaceutically acceptable carriers, diluents, excipients or combinations thereof. A "pharmaceutical composition" refers to a chemical or biological composition suitable for administration to a subject (e.g., mammal). Such compositions may be specifically formulated for administration via one or more of a number of routes, including but not limited to buccal, cutaneous, epicutaneous, epidural, infusion, inhalation, intraarterial, intracardial, intracerebroventricular, intradermal, intramuscular, intranasal, intraocular, intraperitoneal, intraspinal, intrathecal, intravenous, oral, parenteral, pulmonary, rectally via an enema or suppository, subcutaneous, subdermal, sublingual, transdermal, and transmucosal. In addition, administration can by means of capsule, drops, foams, gel, gum, injection, liquid, patch, pill, porous pouch, powder, tablet, or other suitable means of administration.

A "pharmaceutical excipient" or a "pharmaceutically acceptable excipient" comprises a carrier, sometimes a liquid, in which an active therapeutic agent is formulated. The excipient generally does not provide any pharmacological activity to the formulation, though it may provide chemical and/or biological stability, and release characteristics. Examples of suitable formulations can be found, for example, in Remington, The Science And Practice of Pharmacy, 20th Edition, (Gennaro, A. R., Chief Editor), Philadelphia College of Pharmacy and Science, 2000, which is incorporated by reference in its entirety.

As used herein "pharmaceutically acceptable carrier" or "excipient" includes any and all solvents, dispersion media, coatings, antibacterial and antifungal agents, isotonic and absorption delaying agents that are physiologically compatible. In one embodiment, the carrier is suitable for parenteral administration. Alternatively, the carrier can be suitable for intravenous, intraperitoneal, intramuscular, sublingual, or oral administration. Pharmaceutically acceptable carriers include sterile aqueous solutions or dispersions and sterile powders for the extemporaneous preparation of sterile injectable solutions or dispersion. The use of such media and agents for pharmaceutically active substances is well known in the art. Except insofar as any conventional media or agent is incompatible with the active compound, use thereof in the pharmaceutical compositions of the invention is contemplated. Supplementary active compounds can also be incorporated into the compositions.

Pharmaceutical compositions may be sterile and stable under the conditions of manufacture and storage. The composition can be formulated as a solution, microemulsion, liposome, or other ordered structure suitable to high drug concentration. The carrier can be a solvent or dispersion medium containing, for example, water, ethanol, polyol (e.g., glycerol, propylene glycol, and liquid polyethylene glycol), and suitable mixtures thereof. The proper fluidity can be maintained, for example, by the use of a coating such as lecithin, by the maintenance of the required particle size in the case of dispersion and by the use of surfactants.

In many cases, it will be preferable to include isotonic agents, for example, sugars, polyalcohols such as mannitol, sorbitol, or sodium chloride in the composition. Prolonged absorption of the injectable compositions can be brought about by including in the composition an agent which delays absorption, for example, monostearate salts and gelatin. Moreover, the compounds described herein can be formulated in a time release formulation, for example in a composition that includes a slow release polymer. The active compounds can be prepared with carriers that will protect the compound against rapid release, such as a controlled release formulation, including implants and microencapsulated delivery systems. Biodegradable, biocompatible polymers may be used, such as ethylene vinyl acetate, polyanhydrides, polyglycolic acid, collagen, polyorthoesters, polylactic acid and polylactic, polyglycolic copolymers (PLG). Many methods for the preparation of such formulations are known to those skilled in the art.

Oral forms of administration are also contemplated herein. The pharmaceutical compositions of the present invention may be orally administered as a capsule (hard or soft), tablet (film coated, enteric coated or uncoated), powder or granules (coated or uncoated) or liquid (solution or suspension). The formulations may be conveniently prepared by any of the methods well-known in the art. The pharmaceutical compositions of the present invention may include one or more suitable production aids or excipients including fillers, binders, disintegrants, lubricants, diluents, flow agents, buffering agents, moistening agents, preservatives, colorants, sweeteners, flavors, and pharmaceutically compatible carriers.

For each of the recited embodiments, the compounds can be administered by a variety of dosage forms as known in the art. Any biologically-acceptable dosage form known to persons of ordinary skill in the art, and combinations thereof, are contemplated. Examples of such dosage forms include, without limitation, chewable tablets, quick dissolve tablets, effervescent tablets, reconstitutable powders, elixirs, liquids, solutions, suspensions, emulsions, tablets, multi-layer tablets, bi-layer tablets, capsules, soft gelatin capsules, hard gelatin capsules, caplets, lozenges, chewable lozenges, beads, powders, gum, granules, particles, microparticles, dispersible granules, cachets, douches, suppositories, creams, topicals, inhalants, aerosol inhalants, patches, particle inhalants, implants, depot implants, ingestibles, injectables (including subcutaneous, intramuscular, intravenous, and intradermal), infusions, and combinations thereof.

Other compounds which can be included by admixture are, for example, medically inert ingredients (e.g., solid and liquid diluent), such as lactose, dextrosesaccharose, cellulose, starch or calcium phosphate for tablets or capsules, olive oil or ethyl oleate for soft capsules and water or vegetable oil for suspensions or emulsions; lubricating agents such as silica, talc, stearic acid, magnesium or calcium stearate and/or polyethylene glycols; gelling agents such as colloidal clays; thickening agents such as gum tragacanth or sodium alginate, binding agents such as starches, arabic gums, gelatin, methylcellulose, carboxymethylcellulose or polyvinylpyrrolidone; disintegrating agents such as starch, alginic acid, alginates or sodium starch glycolate; effervescing mixtures; dyestuff; sweeteners; wetting agents such as lecithin, polysorbates or laurylsulphates; and other therapeutically acceptable accessory ingredients, such as humectants, preservatives, buffers and antioxidants, which are known additives for such formulations.

Liquid dispersions for oral administration can be syrups, emulsions, solutions, or suspensions. The syrups can contain as a carrier, for example, saccharose or saccharose with glycerol and/or mannitol and/or sorbitol. The suspensions and the emulsions can contain a carrier, for example a natural gum, agar, sodium alginate, pectin, methylcellulose, carboxymethylcellulose, or polyvinyl alcohol.

The amount of active compound in a therapeutic composition according to various embodiments of the present invention may vary according to factors such as the disease state, age, gender, weight, patient history, risk factors, predisposition to disease, administration route, pre-existing treatment regime (e.g., possible interactions with other medications), and weight of the individual. Dosage regimens may be adjusted to provide the optimum therapeutic response. For example, a single bolus may be administered, several divided doses may be administered over time, or the dose may be proportionally reduced or increased as indicated by the exigencies of therapeutic situation.

"Dosage unit form," as used herein, refers to physically discrete units suited as unitary dosages for the mammalian subjects to be treated; each unit containing a predetermined quantity of active compound calculated to produce the desired therapeutic effect in association with the required pharmaceutical carrier. The specification for the dosage unit forms of the invention are dictated by and directly dependent on the unique characteristics of the active compound and the particular therapeutic effect to be achieved, and the limitations inherent in the art of compounding such an active compound for the treatment of sensitivity in individuals. In therapeutic use for treatment of conditions in mammals (e.g., humans) for which the compounds of the present invention or an appropriate pharmaceutical composition thereof are effective, the compounds of the present invention may be administered in an effective amount. The dosages as suitable for this invention may be a composition, a pharmaceutical composition or any other compositions described herein.

For each of the recited embodiments, the dosage is typically administered once, twice, or thrice a day, although more frequent dosing intervals are possible. The dosage may be administered every day, every 2 days, every 3 days, every 4 days, every 5 days, every 6 days, and/or every 7 days (once a week). In one embodiment, the dosage may be administered daily for up to and including 30 days, preferably between 7-10 days. In another embodiment, the dosage may be administered twice a day for 10 days. If the patient requires treatment for a chronic disease or condition, the dosage may be administered for as long as signs and/or symptoms persist. The patient may require "maintenance treatment" where the patient is receiving dosages every day for months, years, or the remainder of their lives. In addition, the composition of this invention may be to effect prophylaxis of recurring symptoms. For example, the dosage may be administered once or twice a day to prevent the onset of symptoms in patients at risk, especially for asymptomatic patients.

The compositions described herein may be administered in any of the following routes: buccal, epicutaneous, epidural, infusion, inhalation, intraarterial, intracardial, intracerebroventricular, intradermal, intramuscular, intranasal, intraocular, intraperitoneal, intraspinal, intrathecal, intravenous, oral, parenteral, pulmonary, rectally via an enema or suppository, subcutaneous, subdermal, sublingual, transdermal, and transmucosal. The preferred routes of administration are buccal and oral. The administration can be local, where the composition is administered directly, close to, in the locality, near, at, about, or in the vicinity of, the site(s) of disease, e.g., inflammation, or systemic, wherein the composition is given to the patient and passes through the body widely, thereby reaching the site(s) of disease. Local administration can be administration to the cell, tissue, organ, and/or organ system, which encompasses and/or is affected by the disease, and/or where the disease signs and/or symptoms are active or are likely to occur. Administration can be topical with a local effect, composition is applied directly where its action is desired. Administration can be enteral wherein the desired effect is systemic (non-local), composition is given via the digestive tract. Administration can be parenteral, where the desired effect is systemic, composition is given by other routes than the digestive tract.

In some embodiments, the present invention contemplates compositions comprising a therapeutically effective amount of one or more compounds of the various embodiments of the present invention. In some embodiments, the compositions are useful in a method for treating cancer, the method comprising administering a therapeutically effective amount of one or more compounds of any claim to a patient in need thereof. In some aspects, the various embodiments of the present invention contemplate a compound of the formula (I) (II) and (III) for use as a medicament for treating a patient in need of relief from cancers, including, but not limited to, prostate cancer, lung cancer, breast cancer, or pancreatic cancer.

In some other embodiments, the present invention contemplates compositions comprising a therapeutically effective amount of a compound of the present invention, together with a therapeutically effective amount of one or more other compounds of the same or different mode of action to a patient in need of relief from said cancer.

The term "therapeutically effective amount" as used herein, refers to that amount of one or more compounds of the various embodiments of the present invention that elicits a biological or medicinal response in a tissue system, animal or human, that is being sought by a researcher, veterinarian, medical doctor or other clinician, which includes alleviation of the symptoms of the disease or disorder being treated. In some embodiments, the therapeutically effective amount is that which may treat or alleviate the disease or symptoms of the disease at a reasonable benefit/risk ratio applicable to any medical treatment. However, it is to be understood that the total daily usage of the compounds and compositions described herein may be decided by the attending physician within the scope of sound medical judgment. The specific therapeutically-effective dose level for any particular patient will depend upon a variety of factors, including the condition being treated and the severity of the condition; activity of the specific compound employed; the specific composition employed; the age, body weight, general health, gender and diet of the patient: the time of administration, route of administration, and rate of excretion of the specific compound employed; the duration of the treatment; drugs used in combination or coincidentally with the specific compound employed; and like factors well known to the researcher, veterinarian, medical doctor or other clinician. It is also appreciated that the therapeutically effective amount can be selected with reference to any toxicity, or other undesirable side effect, that might occur during administration of one or more of the compounds described herein.

In addition to the illustrative dosages and dosing protocols described herein, it is to be understood that an effective amount of any one or a mixture of the compounds described herein can be determined by the attending diagnostician or physician by the use of known techniques and/or by observing results obtained under analogous circumstances. In determining the effective amount or dose, a number of factors are considered by the attending diagnostician or physician, including, but not limited to the species of mammal, including human, its size, age, and general health, the specific disease or disorder involved, the degree of or involvement or the severity of the disease or disorder, the response of the individual patient, the particular compound administered, the mode of administration, the bioavailability characteristics of the preparation administered, the dose regimen selected, the use of concomitant medication, and other relevant circumstances.

The term "patient" includes human and non-human animals such as companion animals (dogs and cats and the like) and livestock animals. Livestock animals are animals raised for food production. The patient to be treated is preferably a mammal, in particular a human being.

In some illustrative embodiments, this present invention is related to a compound having a general formula (I):

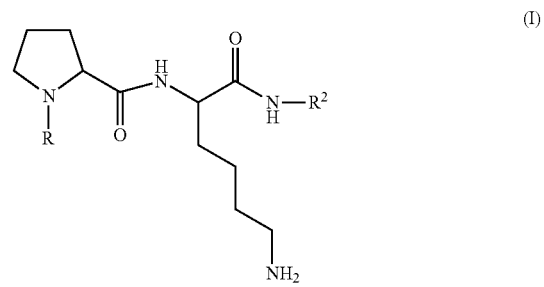

(I)

or a pharmaceutically acceptable salt thereof, wherein,

R is an alkyl, alkenyl, alkynyl, acyl, arylalkylacyl, arylacyl, cycloalkyl, heterocyclyl, aryl, heteroaryl, arylalkyl, or heteroarylalkyl, each of which is optionally substituted; and $R^2$ is an alkyl, alkenyl, alkynyl, acyl, cycloalkyl, heterocyclyl, aryl, heteroaryl, arylalkyl, or heteroarylalkyl, one to twelve amino acid residues (together with the attached nitrogen), each of which is optionally substituted.

In some illustrative embodiments, this present invention is related to a compound having a general formula (II):

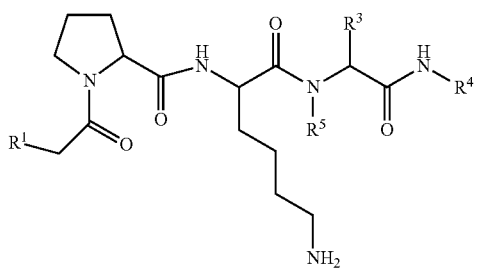

(II)

or a pharmaceutically acceptable salt thereof, wherein,
$R^1$ is an alkyl, alkenyl, alkynyl, cycloalkyl, heterocyclyl, aryl, heteroaryl, arylalkyl, or heteroarylalkyl, each of which is optionally substituted;
$R^3$ is an alkyl, alkenyl, alkynyl, acyl, arylalkylacyl, arylacyl, cycloalkyl, heterocyclyl, aryl, heteroaryl, arylalkyl, heteroarylalkyl, alkylamino, alkylaminoalkyl, or alkylguanidino, each of which is optionally substituted;
$R^4$ is hydrogen, an alkyl, alkenyl, alkynyl, acyl, cycloalkyl, heterocyclyl, aryl, heteroaryl, arylalkyl, or heteroarylalkyl, one to eleven amino acid residues (together with the attached nitrogen), each of which is optionally substituted; and
$R^5$ is hydrogen or an alkyl.

In some illustrative embodiments, this present invention is related to a compound having a general formula (III):

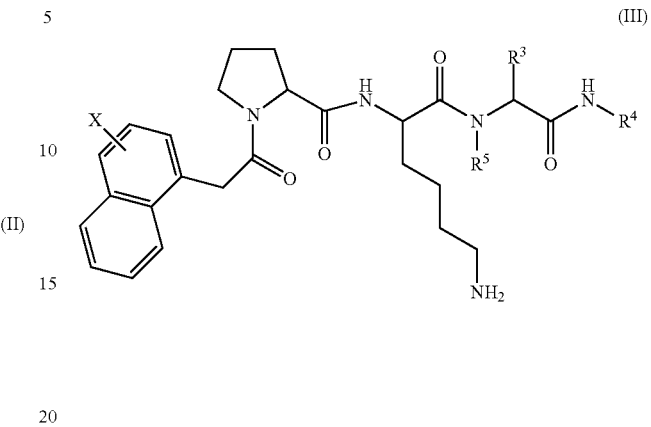

(III)

or a pharmaceutically acceptable salt thereof, wherein,
X represents seven substituents, independently, wherein X is hydrogen or halo;
$R^3$ is an alkyl, alkenyl, alkynyl, acyl, arylalkylacyl, arylacyl, cycloalkyl, heterocyclyl, aryl, heteroaryl, arylalkyl, heteroarylalkyl, alkylamino, alkylaminoalkyl, or alkylguanidino, each of which is optionally substituted;
$R^4$ is hydrogen, an alkyl, alkenyl, alkynyl, acyl, cycloalkyl, heterocyclyl, aryl, heteroaryl, arylalkyl, or heteroarylalkyl, one to eleven amino acid residues (together with the attached nitrogen), each of which is optionally substituted; and
$R^5$ is hydrogen or methyl.

In some illustrative embodiments, this present invention is related to a compound having a general formula (III), wherein $R^3$ is an alkylamino or alkylguanidino, each of which is optionally substituted; X is hydrogen; and $R^4$ and $R^5$ are hydrogen.

In some illustrative embodiments, this present invention is related to a compound having a general formula (III), wherein said compound is:

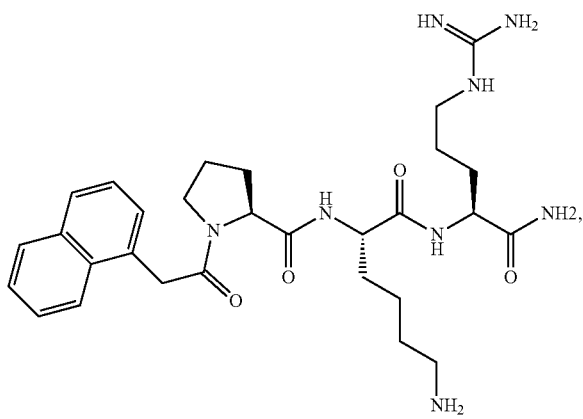

-continued
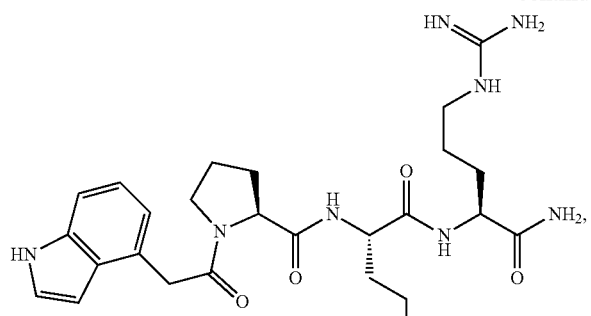
(SEQ ID NO: 1)
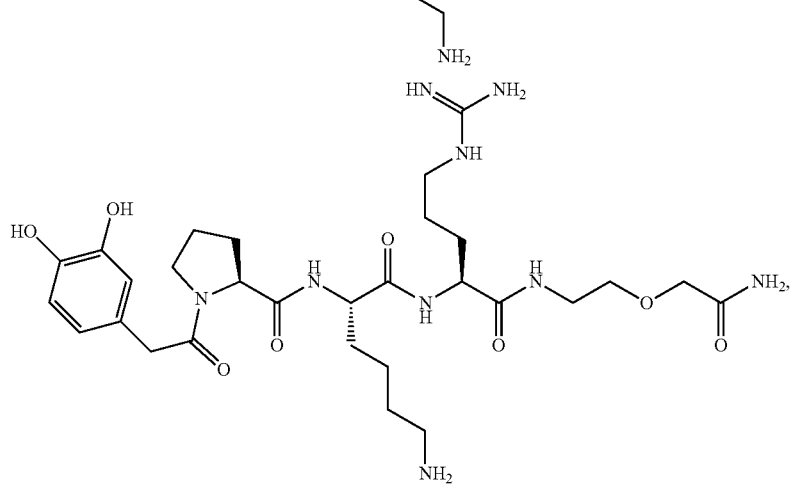
(SEQ ID NO: 2)
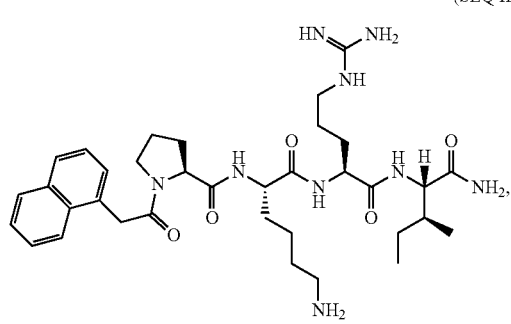
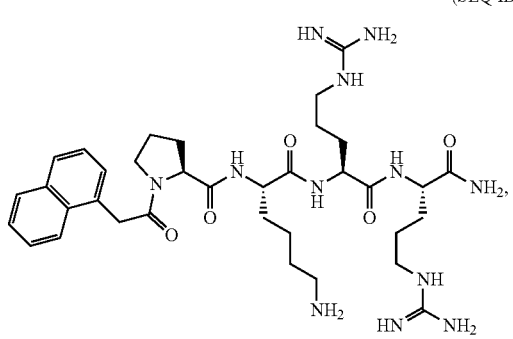
(SEQ ID NO: 3)
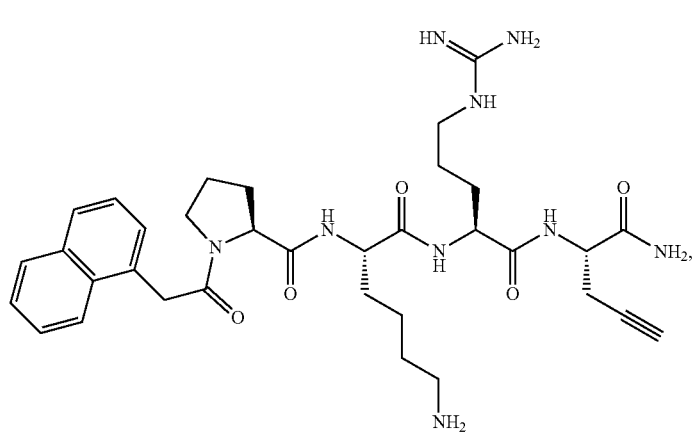

-continued
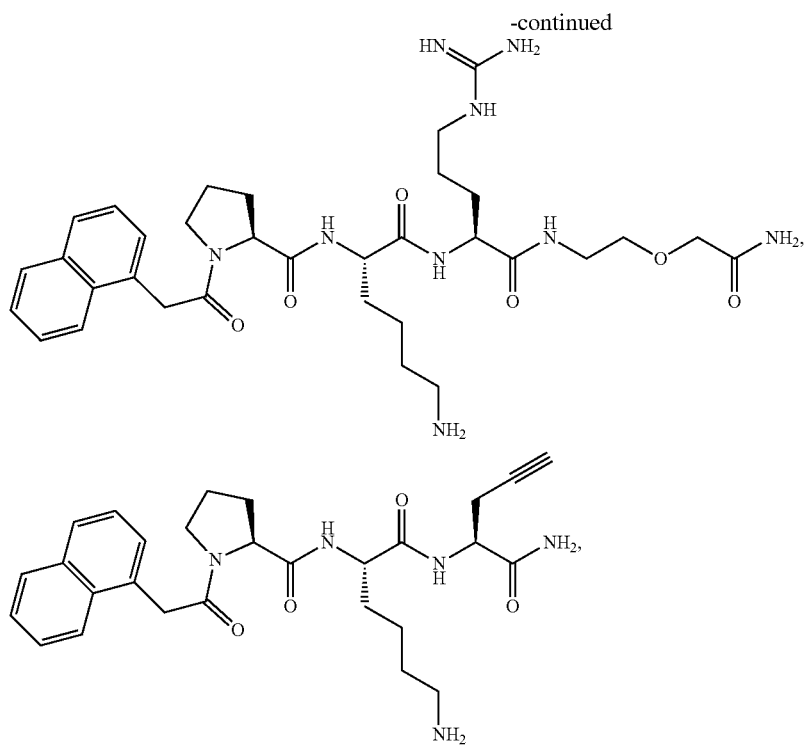
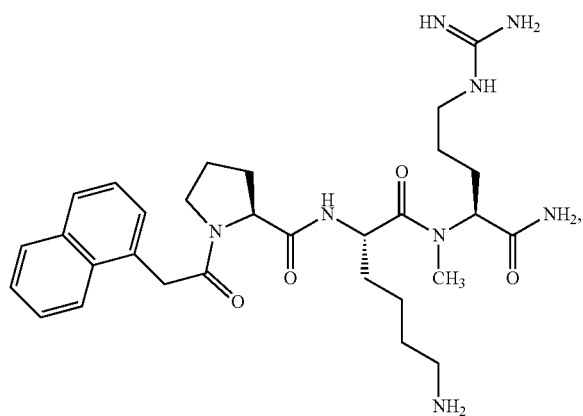
(SEQ ID NO: 4)
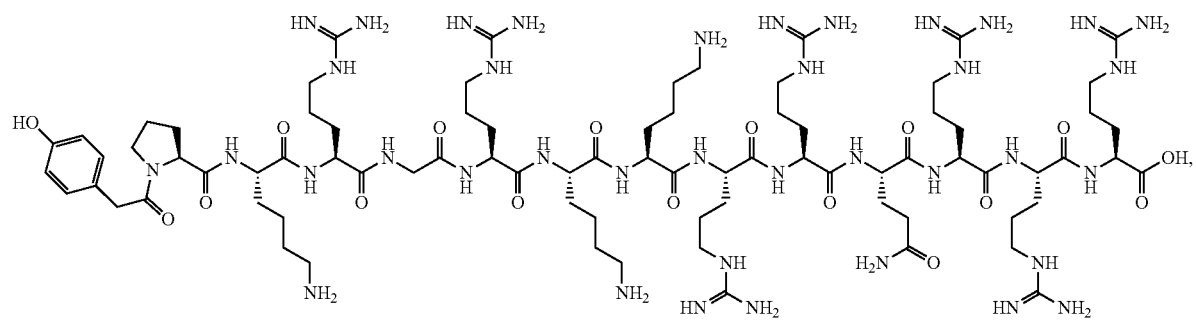

(SEQ ID NO: 5)
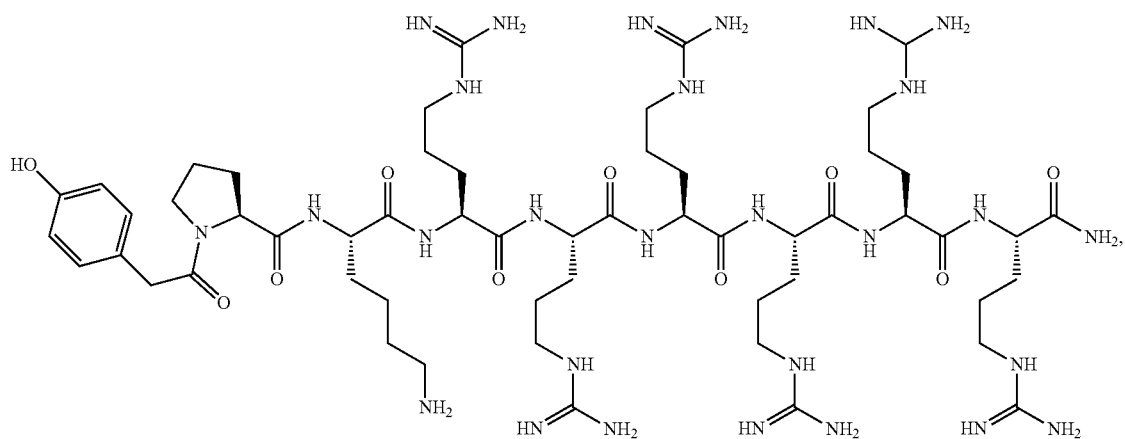
(SEQ ID NO: 6)
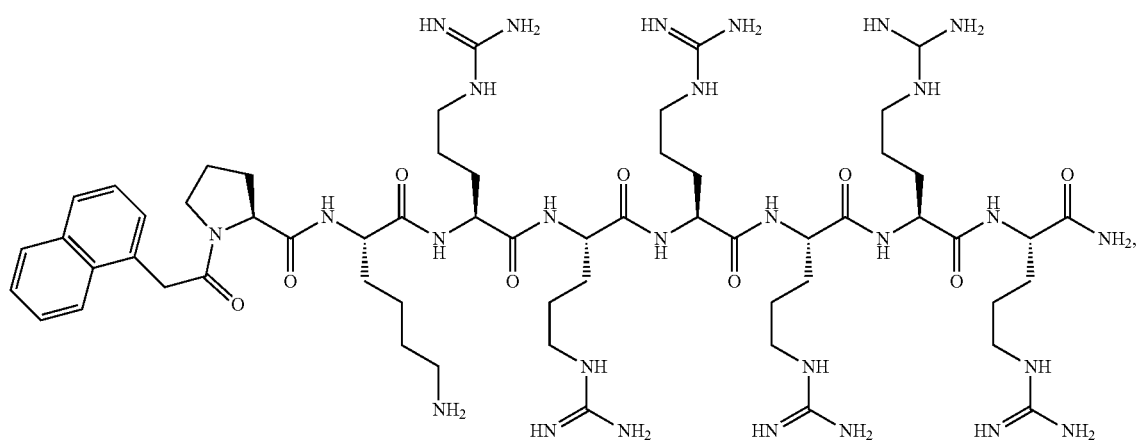
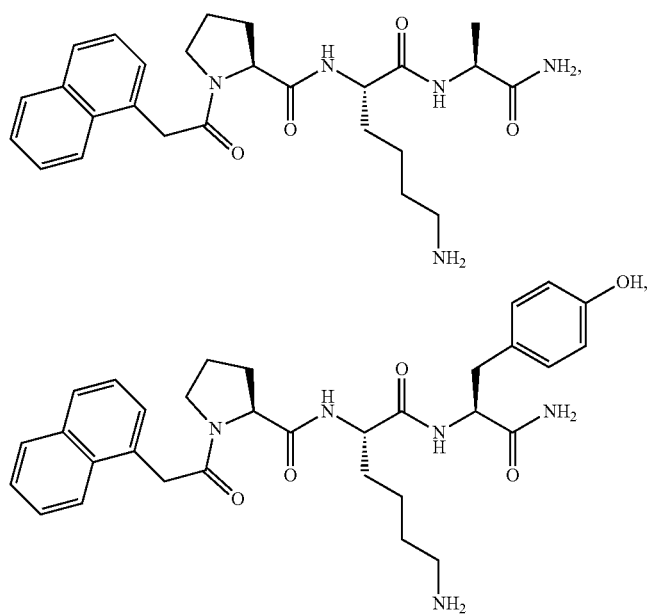

-continued
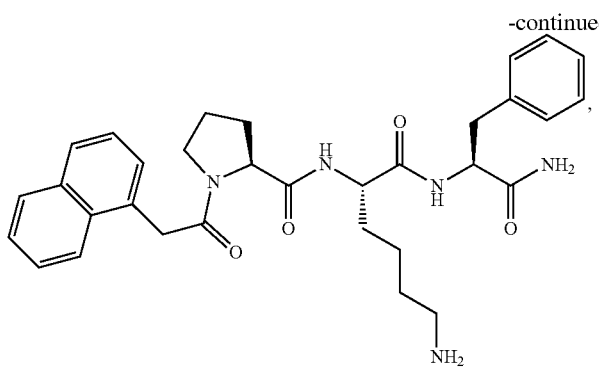
(SEQ ID NO: 7)
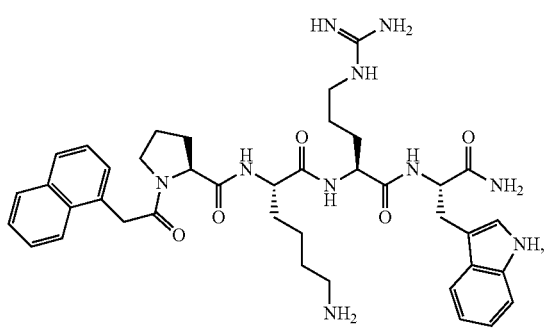
(SEQ ID NO: 8)
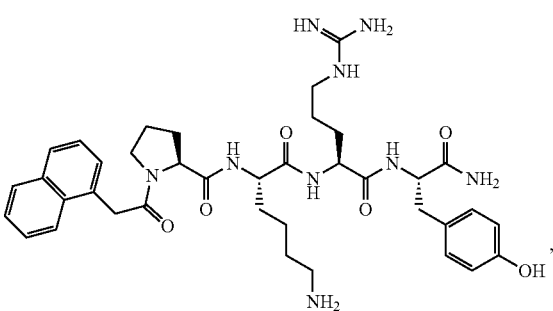
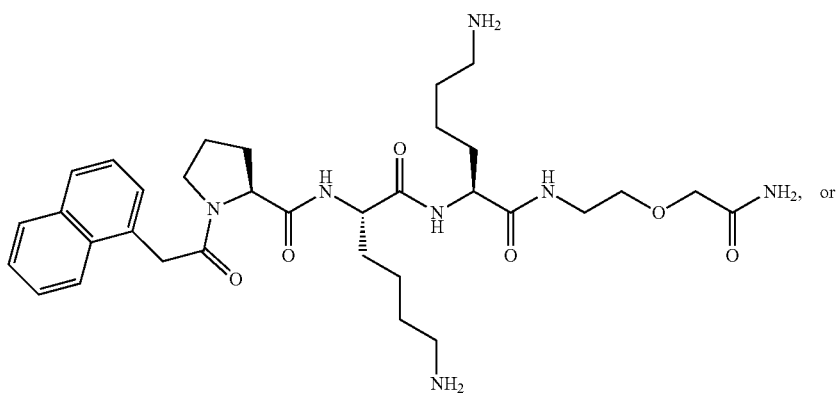
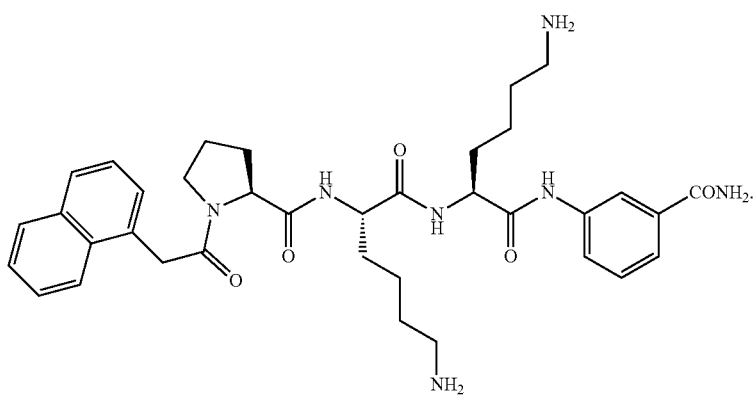

In some illustrative embodiments, this present invention is related to a compound having a general formula (III), wherein said compound is:
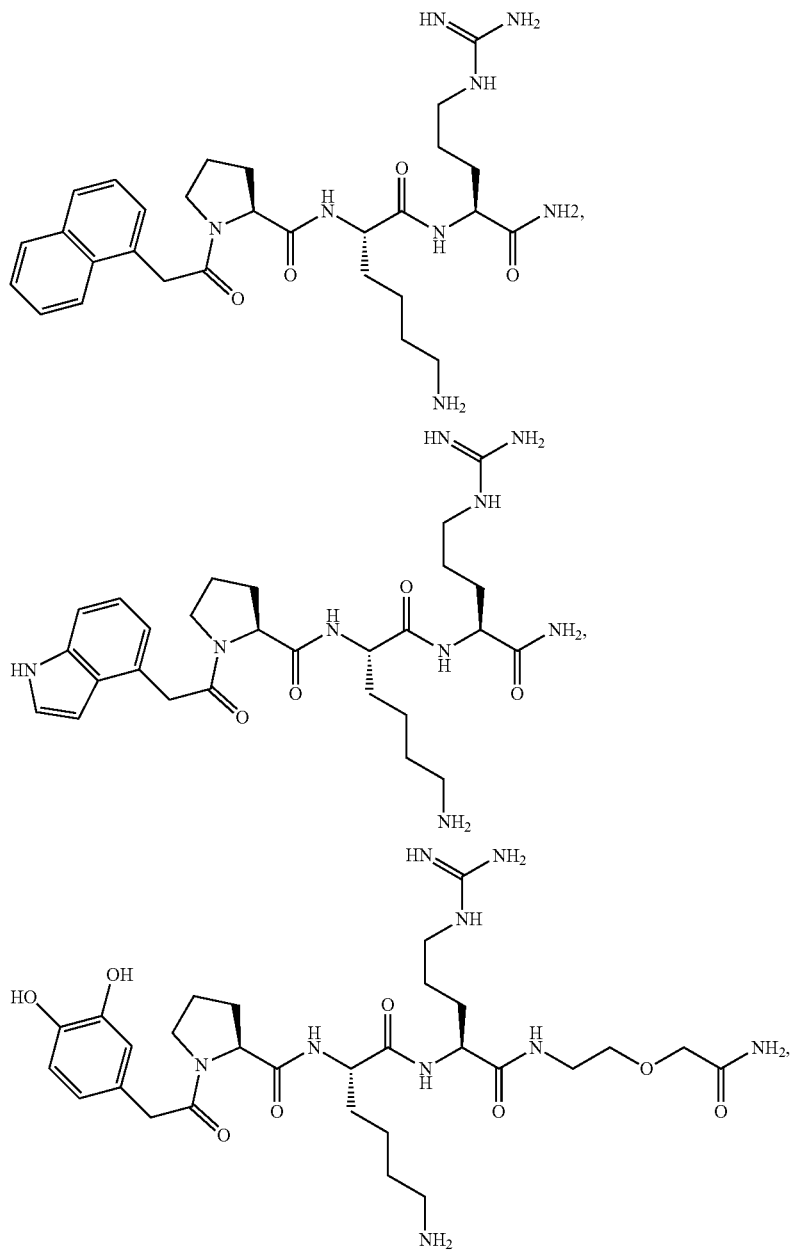
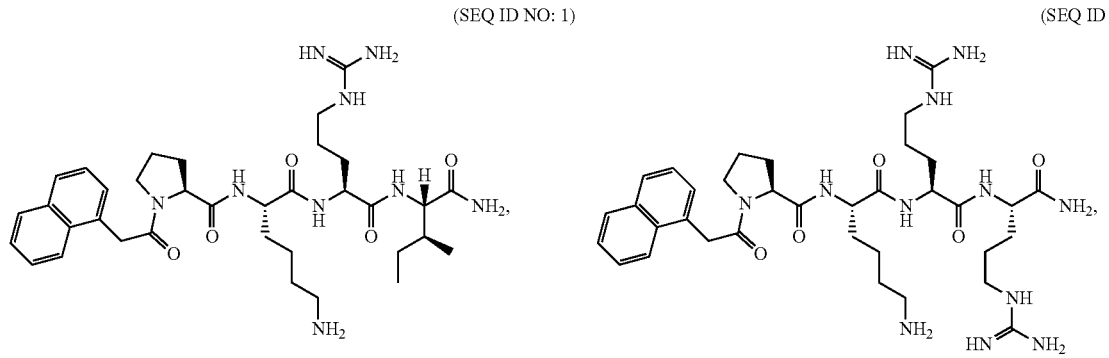
(SEQ ID NO: 1)      (SEQ ID NO: 2)

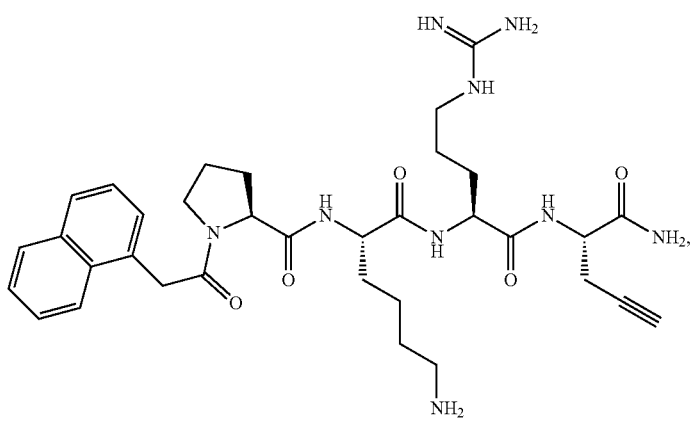
(SEQ ID NO: 3)
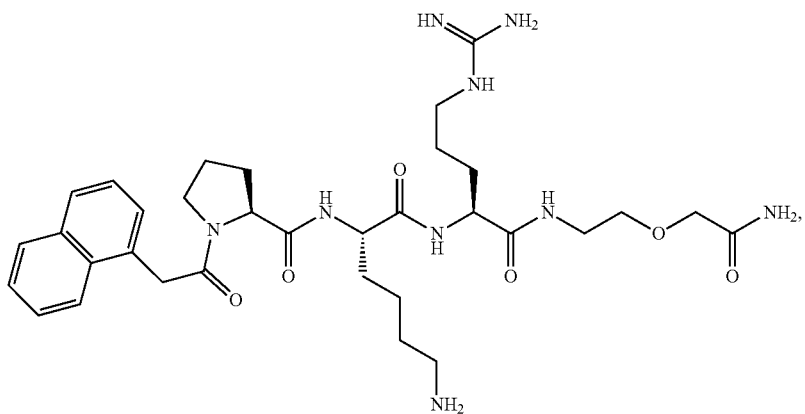
(SEQ ID NO: 7) (SEQ ID NO: 8)
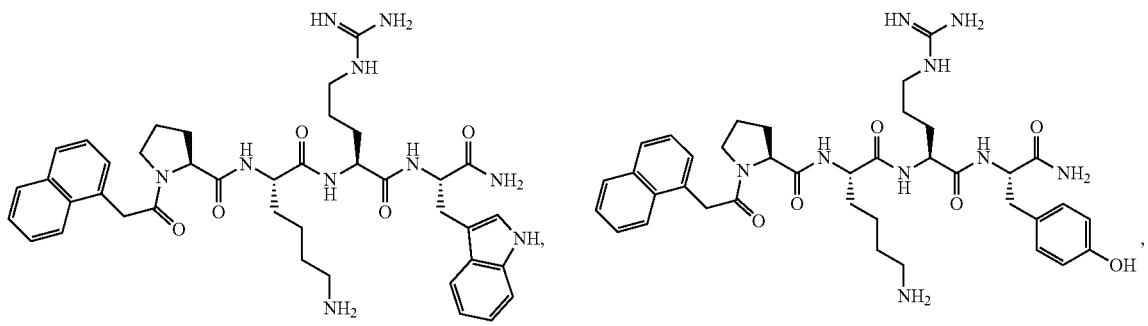
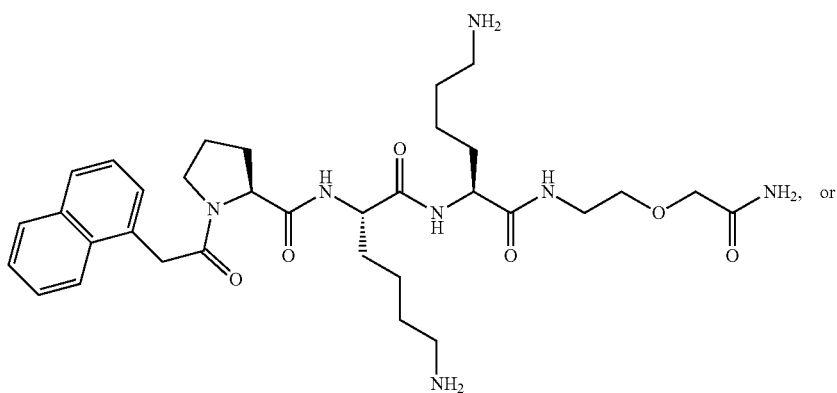

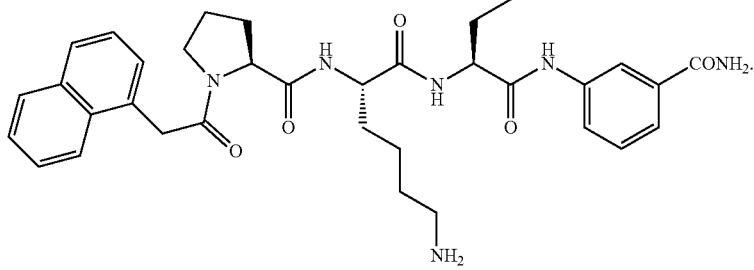
In some illustrative embodiments, this present invention is related to a compound having a general formula (III), wherein said compound is:
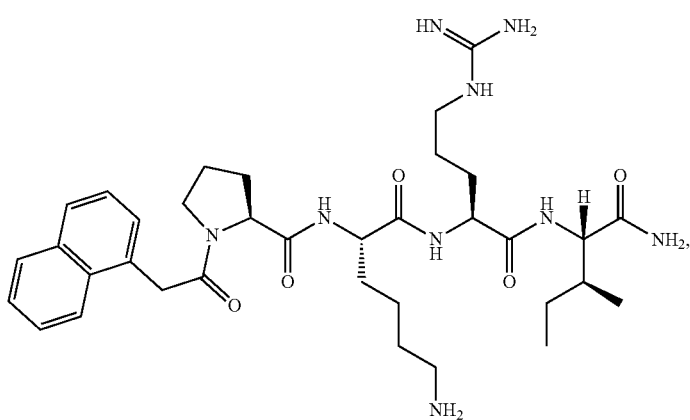
(SEQ ID NO: 1)
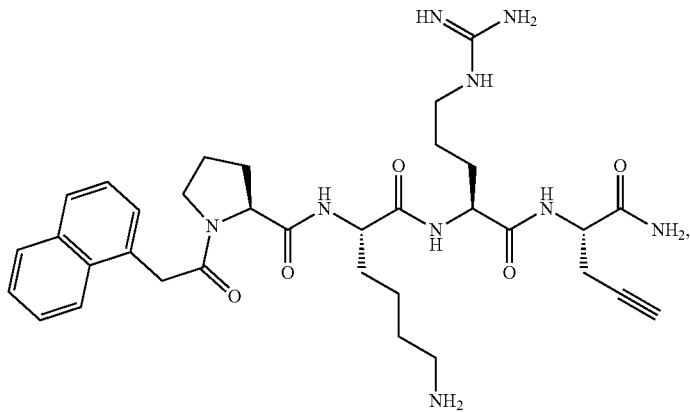
(SEQ ID NO: 3)

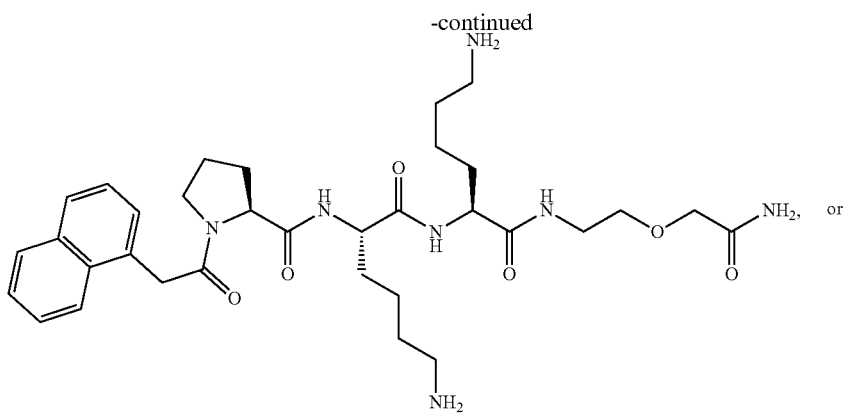
In some illustrative embodiments, this present invention is related to a compound having a general formula (I), wherein said compound is:
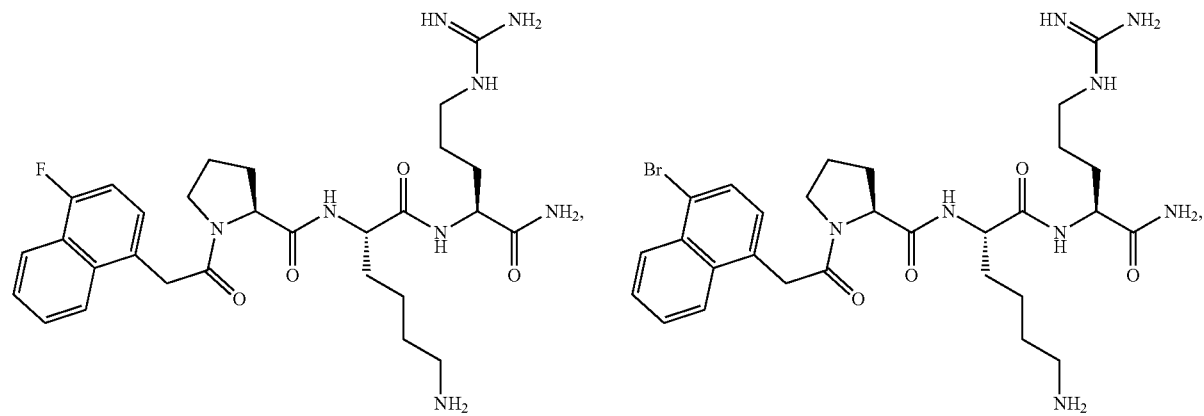

-continued
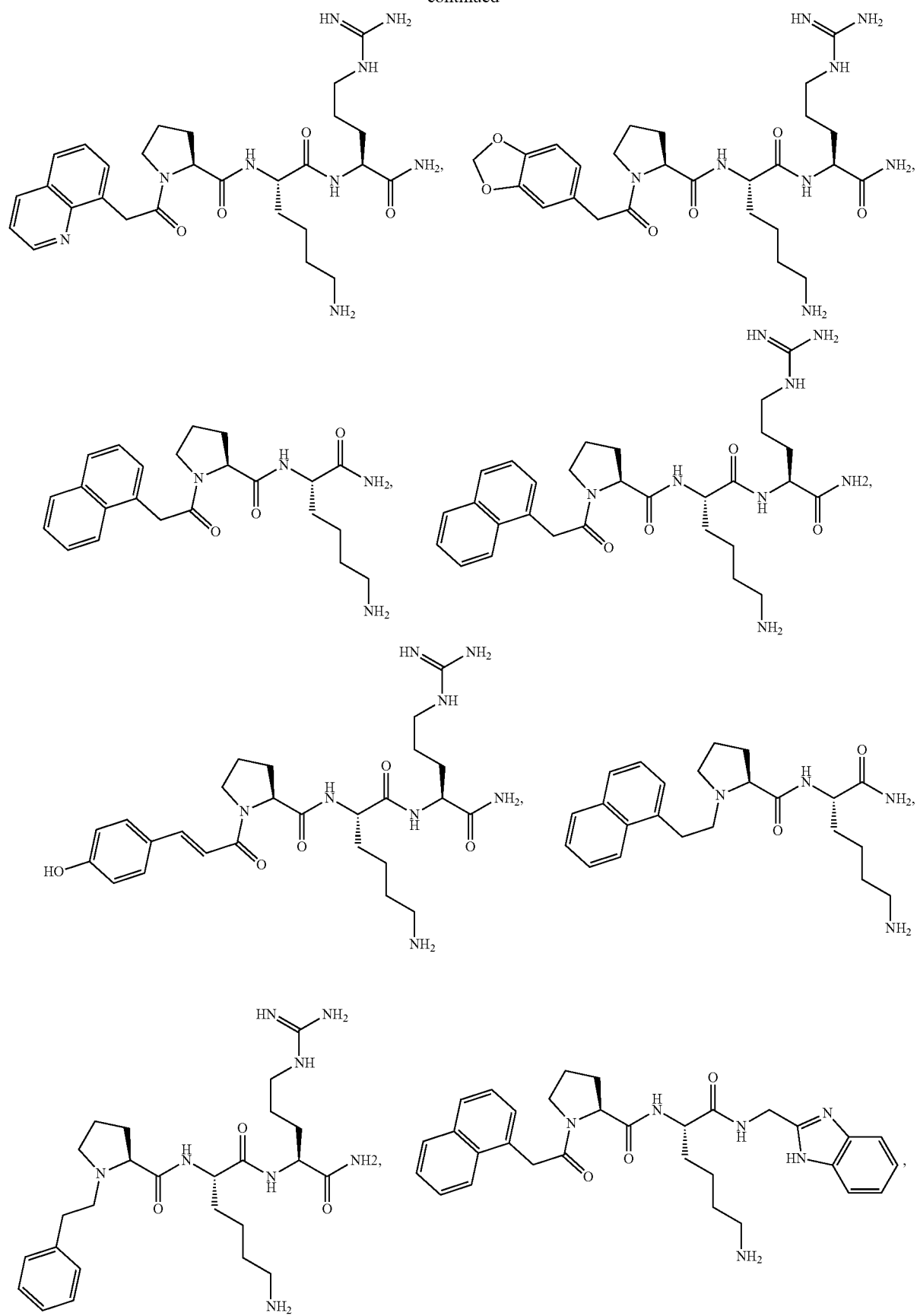

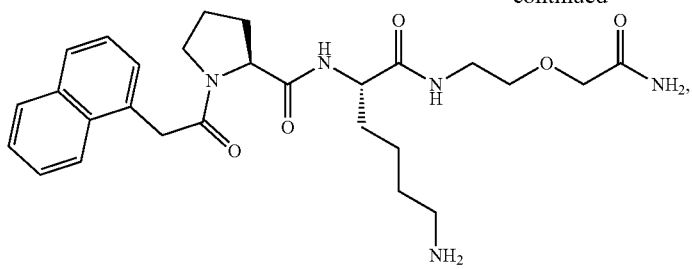
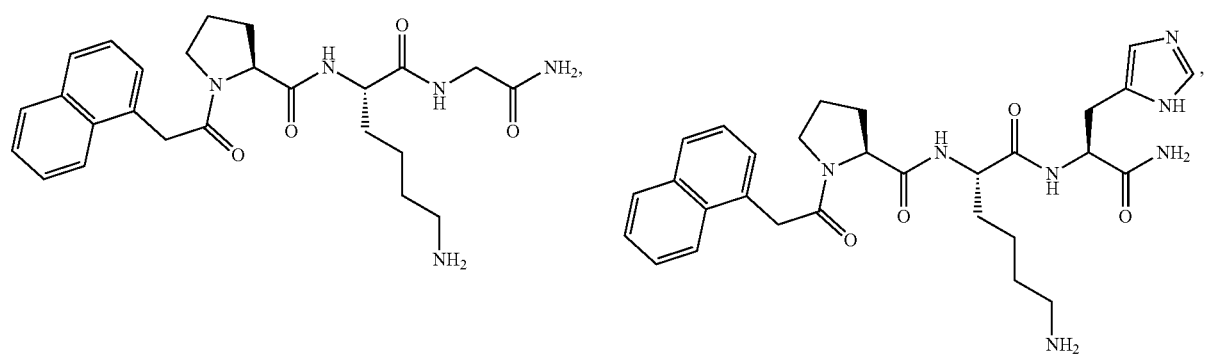
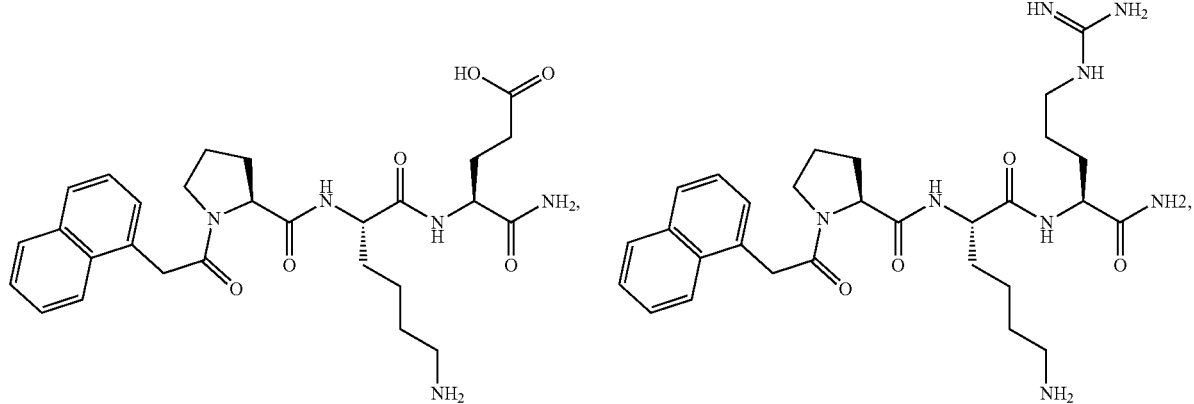
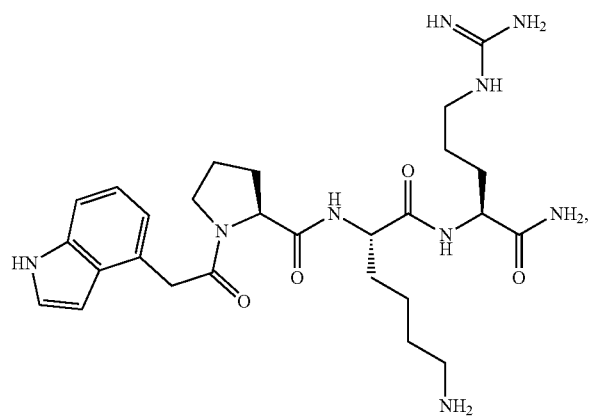

-continued
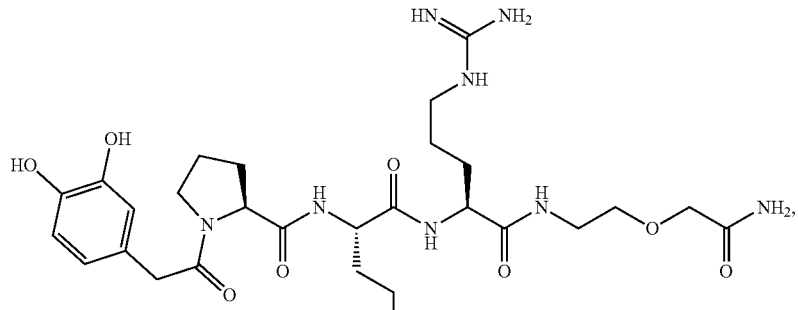
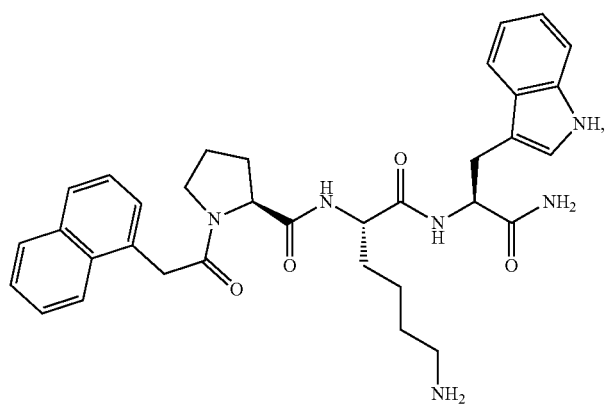
(SEQ ID NO: 1)
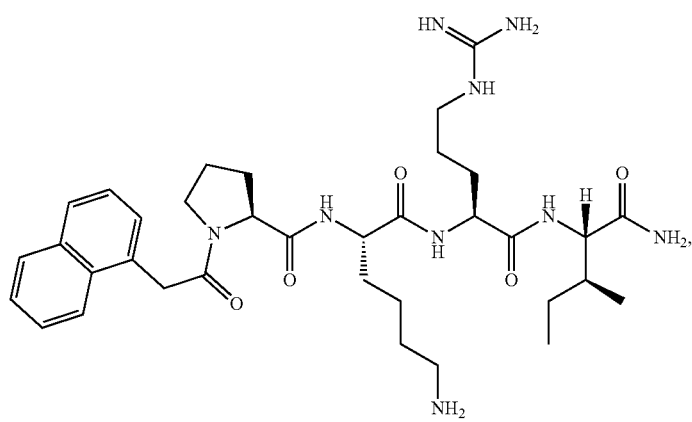
(SEQ ID NO: 2)
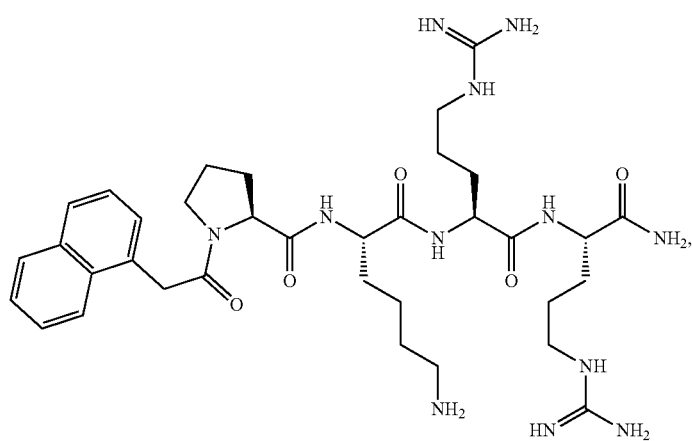

(SEQ ID NO: 3)
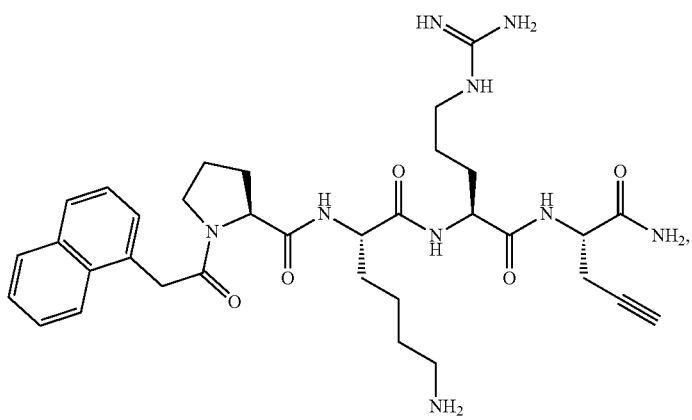
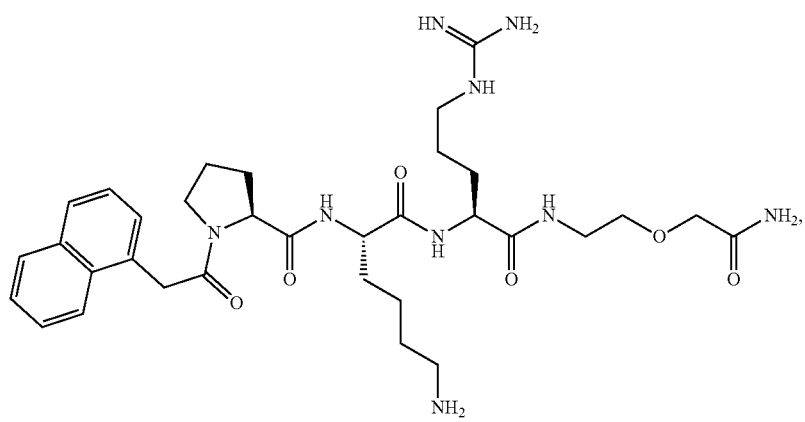
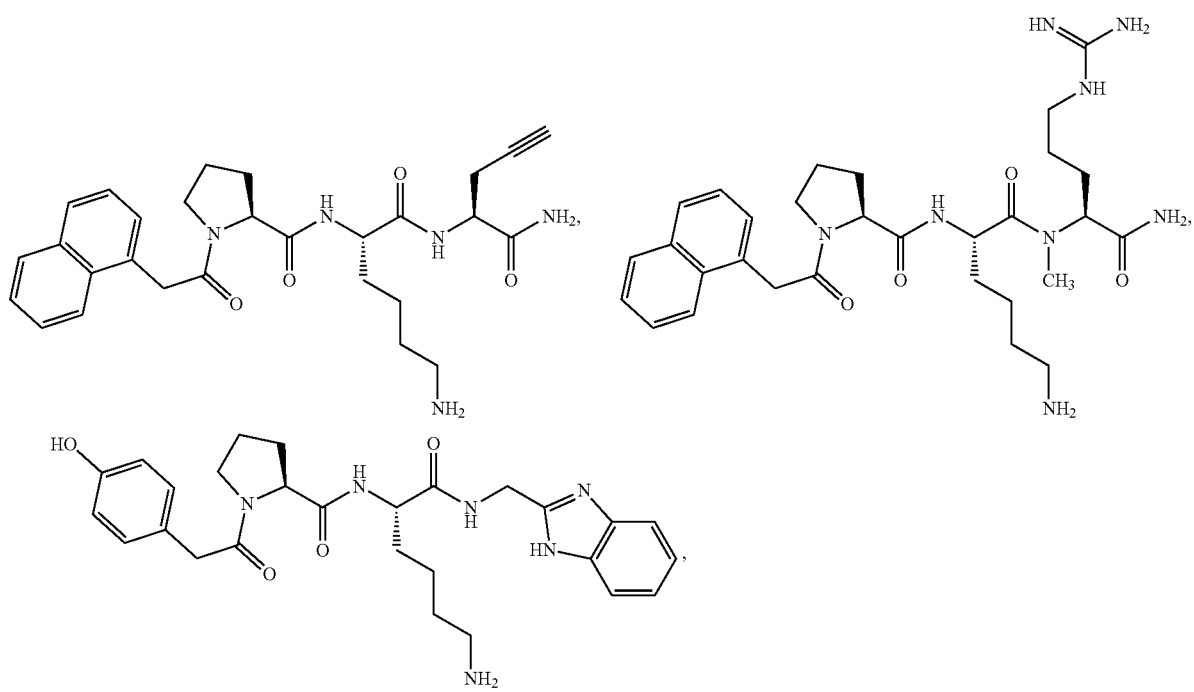

(SEQ ID NO: 4)
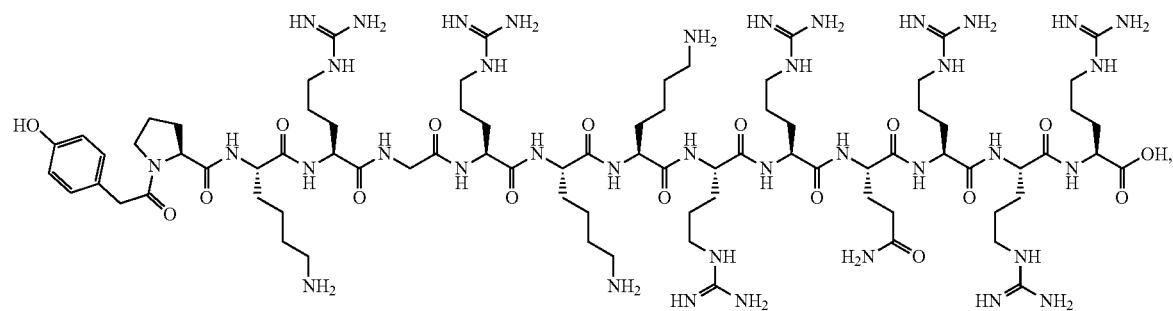
(SEQ ID NO: 5)
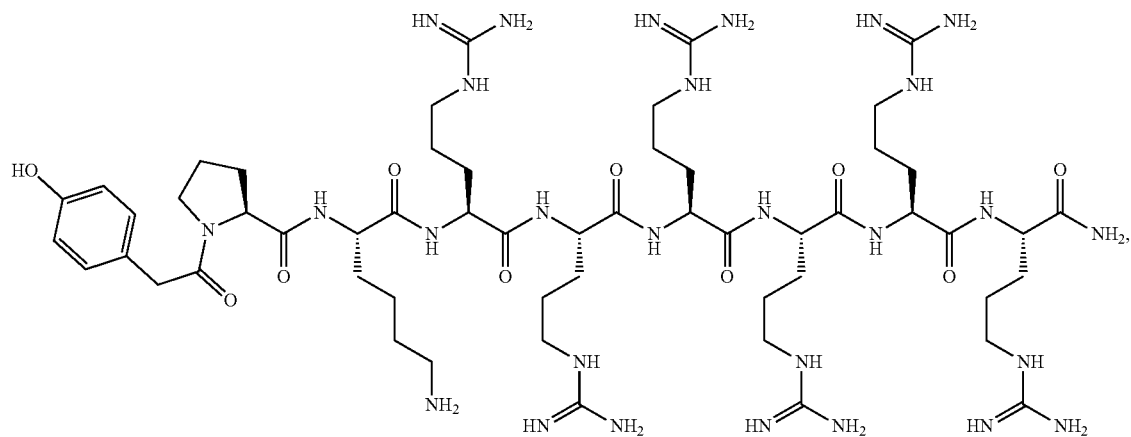
(SEQ ID NO: 6)
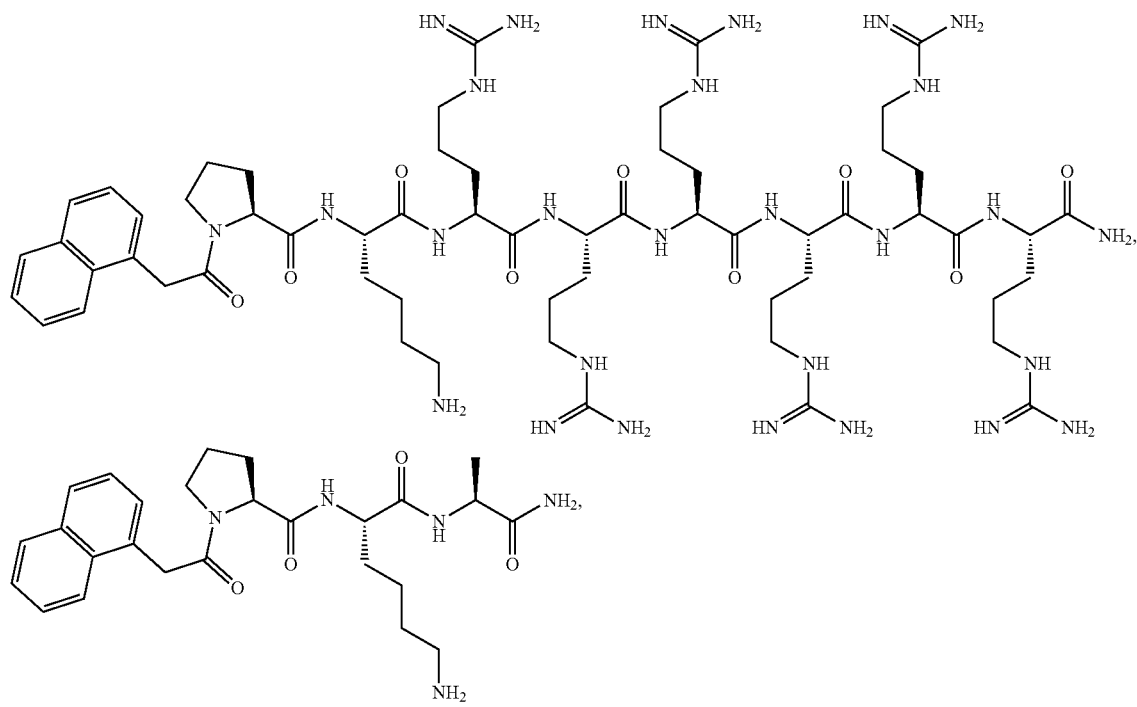

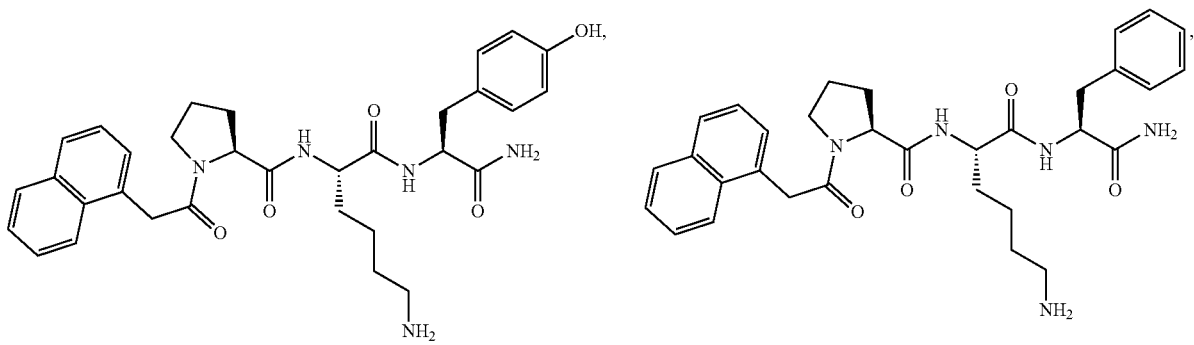
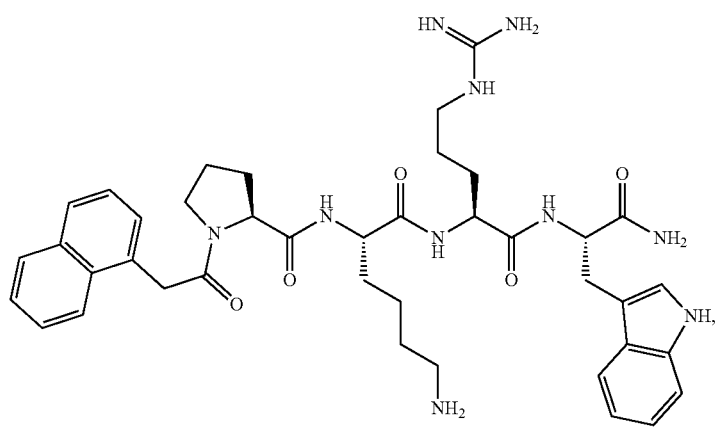
(SEQ ID NO: 7)
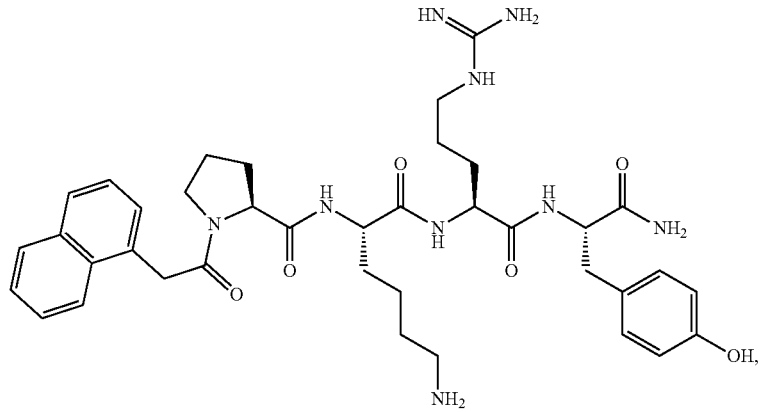
(SEQ ID NO: 8)
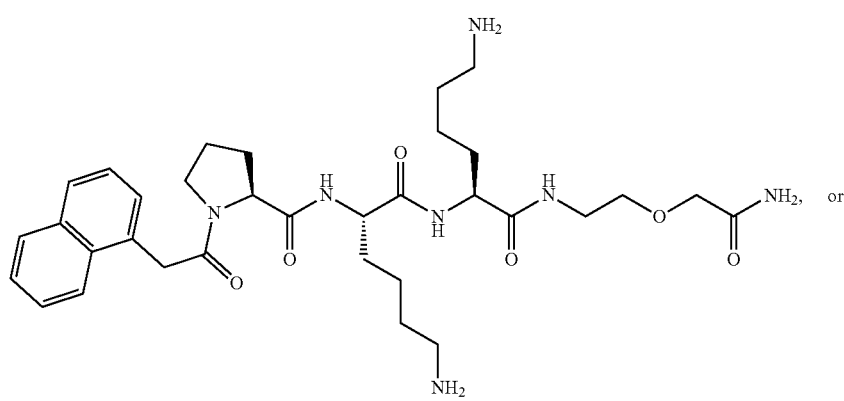

-continued

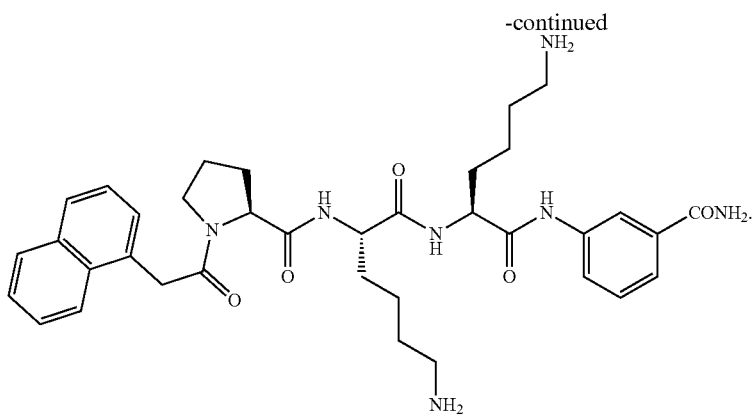

In some other illustrative embodiments, this present invention is related to a pharmaceutical composition comprising one or more compounds as disclosed herein, together with one or more pharmaceutically acceptable diluents, excipients, or carriers.

In some other illustrative embodiments, this present invention is related to a method for treating a patient with a disease caused by abnormal activities of protein methyltransferases (PMTs) comprising the step of administering a therapeutically effective amount of one or more compounds as disclosed herein, to the patient in need of relief from said disease, wherein said disease is a cancer, an inflammation disease, a neurodegenerative disease, or a cardiovascular disease.

In some other illustrative embodiments, this present invention is related to a method for treating a patient with a disease caused by abnormal activities of protein methyltransferases (PMTs) comprising the step of administering a therapeutically effective amount of one or more compounds as disclosed herein, to the patient in need of relief from said disease, wherein said cancer is a prostate, lung, breast, or pancreatic cancer.

In some other illustrative embodiments, this present invention is related to a method for treating a patient with a disease caused by abnormal activities of protein methyltransferases (PMTs) comprising the step of administering a therapeutically effective amount of one or more compounds as disclosed herein, together with a therapeutically effective amount of one or more other compounds of the same or different mode of action, to the patient in need of relief from said disease.

In some other illustrative embodiments, this present invention is related to a method for treating a patient with a cancer caused by abnormal activities of protein methyltransferases (PMTs) comprising the step of administering a therapeutically effective amount of one or more compounds as disclosed herein, to the patient in need of relief from said cancer.

In some other illustrative embodiments, this present invention is related to a method for treating a patient with a disease caused by abnormal activities of protein methyltransferases (PMTs) comprising the step of administering a therapeutically effective amount of one or more compounds to the patient in need of relief from said disease, wherein said compound has a formula (I)

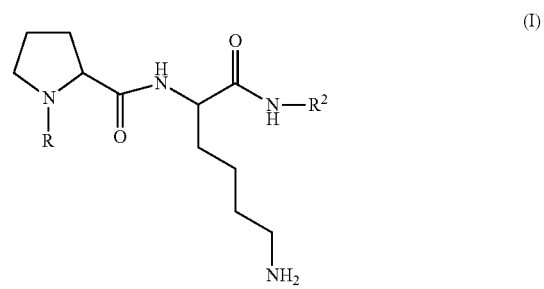

or a pharmaceutically acceptable salt thereof, wherein,
R is an alkyl, alkenyl, alkynyl, acyl, arylalkylacyl, arylacyl, cycloalkyl, heterocyclyl, aryl, heteroaryl, arylalkyl, or heteroarylalkyl, each of which is optionally substituted; and
$R^2$ is an alkyl, alkenyl, alkynyl, acyl, cycloalkyl, heterocyclyl, aryl, heteroaryl, arylalkyl, or heteroarylalkyl, one to twelve amino acid residues (together with the attached nitrogen), each of which is optionally substituted.

In some other illustrative embodiments, this present invention is related to a method for treating a patient with a disease caused by abnormal activities of protein methyltransferases (PMTs) comprising the step of administering a therapeutically effective amount of one or more compounds to the patient in need of relief from said disease, wherein said compound has a formula (I), wherein said disease is a cancer, an inflammation disease, a neurodegenerative disease, or a cardiovascular disease.

more compounds as disclosed herein, to the patient in need of relief from said cancer.

In some other illustrative embodiments, this present invention is related to a method for treating a patient with a disease caused by abnormal activities of protein methyltransferases (PMTs) comprising the step of administering a therapeutically effective amount of one or more compounds to the patient in need of relief from said disease, wherein said compound has a formula (II):

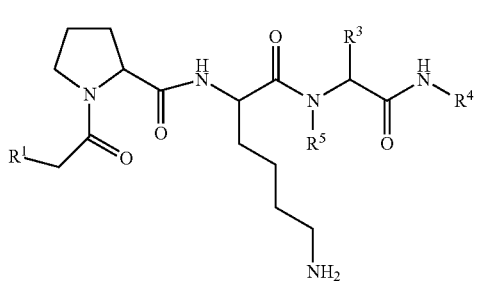

(II)

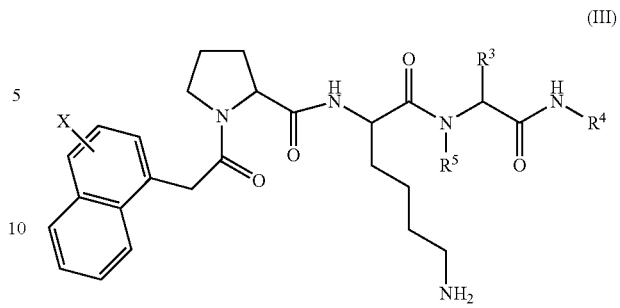

(III)

or a pharmaceutically acceptable salt thereof, wherein, $R^1$ is an alkyl, alkenyl, alkynyl, cycloalkyl, heterocyclyl, aryl, heteroaryl, arylalkyl, or heteroarylalkyl, each of which is optionally substituted;

$R^3$ is an alkyl, alkenyl, alkynyl, acyl, arylalkylacyl, arylacyl, cycloalkyl, heterocyclyl, aryl, heteroaryl, arylalkyl, heteroarylalkyl, alkylamino, alkylaminoalkyl, or alkylguanidino, each of which is optionally substituted;

$R^4$ is hydrogen, an alkyl, alkenyl, alkynyl, acyl, cycloalkyl, heterocyclyl, aryl, heteroaryl, arylalkyl, or heteroarylalkyl, one to eleven amino acid residues (together with the attached nitrogen), each of which is optionally substituted; and $R^5$ is hydrogen or an alkyl.

In some other illustrative embodiments, this present invention is related to a method for treating a patient with a disease caused by abnormal activities of protein methyltransferases (PMTs) comprising the step of administering a therapeutically effective amount of one or more compounds to the patient in need of relief from said disease, wherein said compound has a formula (III):

or a pharmaceutically acceptable salt thereof, wherein,

X represents seven substituents, independently, wherein X is hydrogen or halo;

$R^3$ is an alkyl, alkenyl, alkynyl, acyl, arylalkylacyl, arylacyl, cycloalkyl, heterocyclyl, aryl, heteroaryl, arylalkyl, heteroarylalkyl, alkylamino, alkylaminoalkyl, or alkylguanidino, each of which is optionally substituted;

$R^4$ is hydrogen, an alkyl, alkenyl, alkynyl, acyl, cycloalkyl, heterocyclyl, aryl, heteroaryl, arylalkyl, or heteroarylalkyl, one to eleven amino acid residues (together with the attached nitrogen), each of which is optionally substituted; and $R^5$ is hydrogen or methyl.

In some other illustrative embodiments, this present invention is related to a method for treating a patient with a disease caused by abnormal activities of protein methyltransferases (PMTs) comprising the step of administering a therapeutically effective amount of one or more compounds to the patient in need of relief from said disease, wherein said compound is

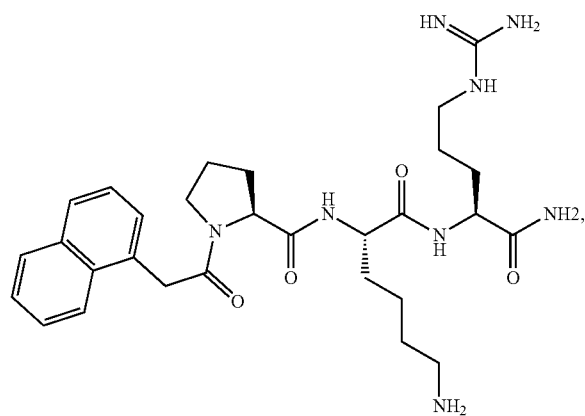

-continued
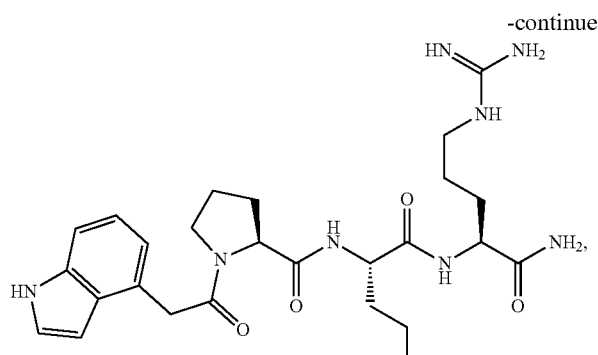
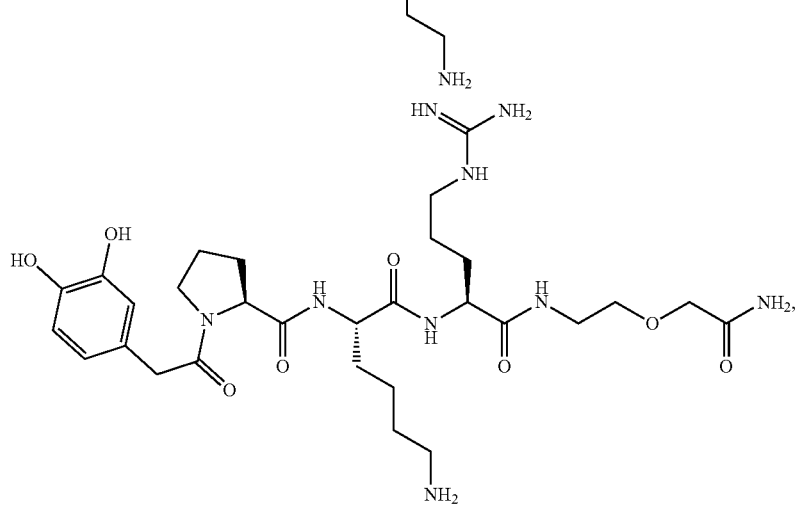
(SEQ ID NO: 1)
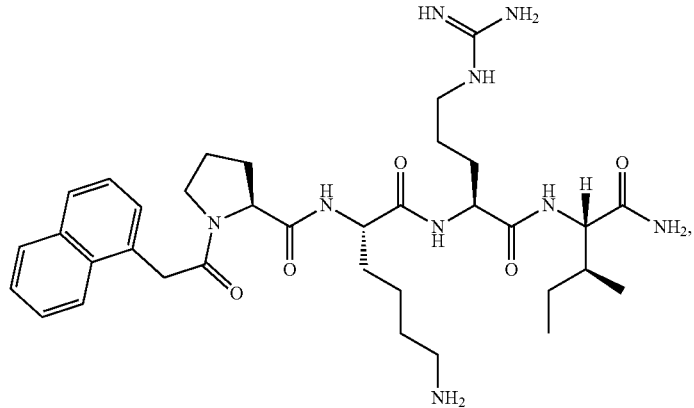
(SEQ ID NO: 2)
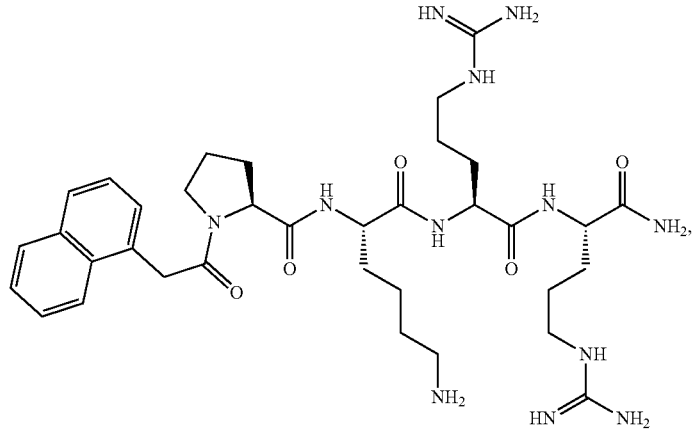

(SEQ ID NO: 3)
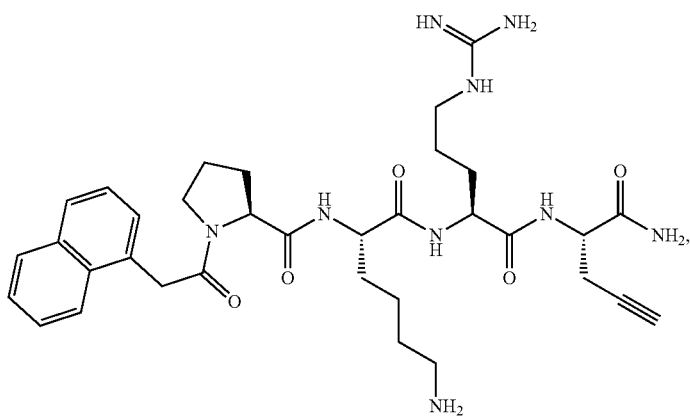
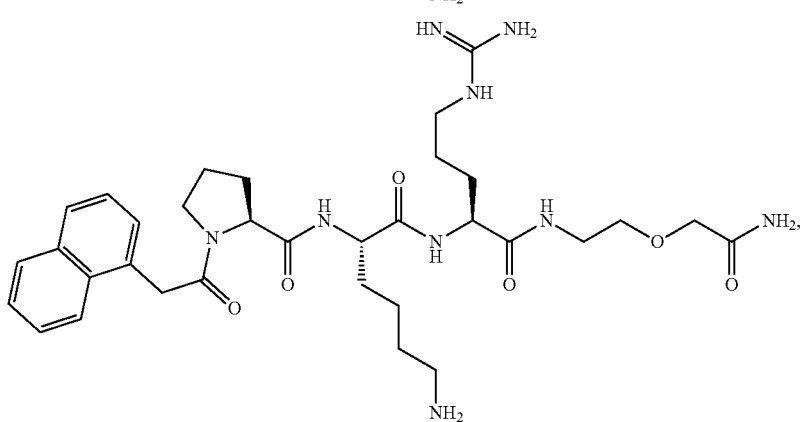
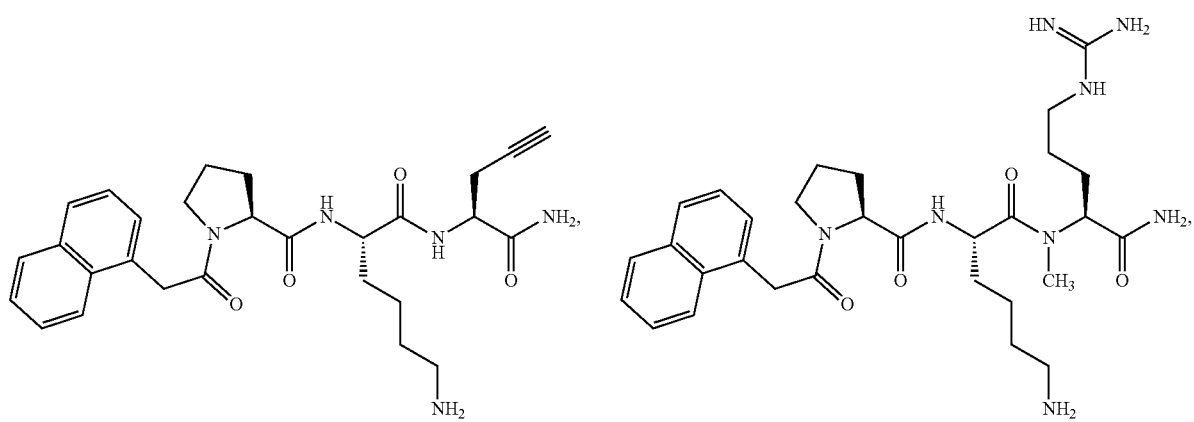
(SEQ ID NO: 4)
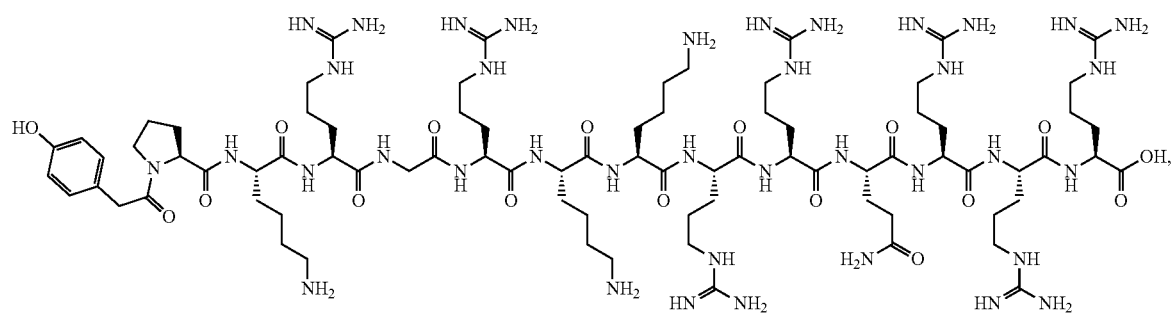

(SEQ ID NO: 5)
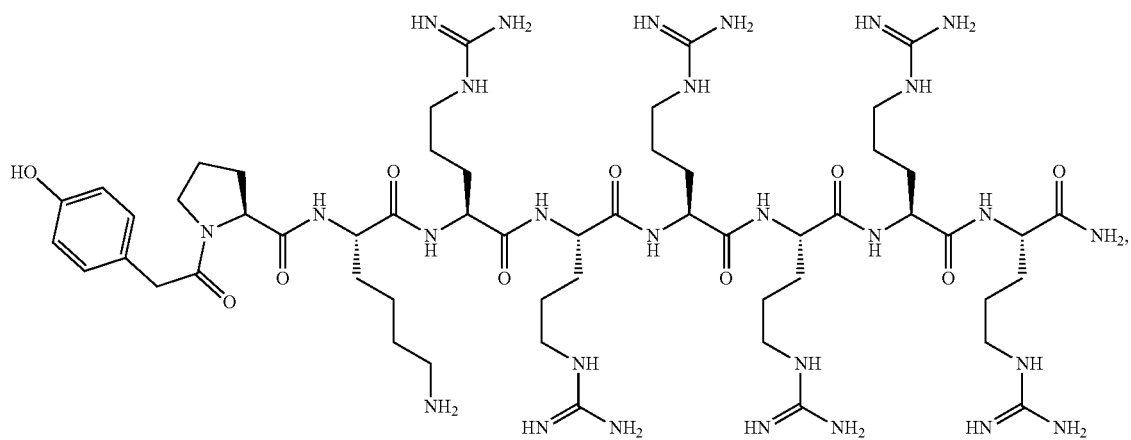
(SEQ ID NO: 6)
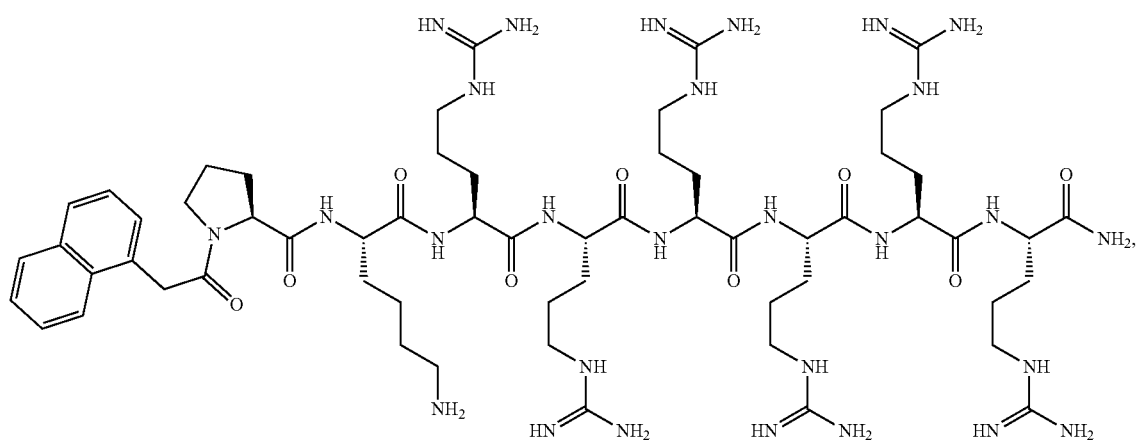
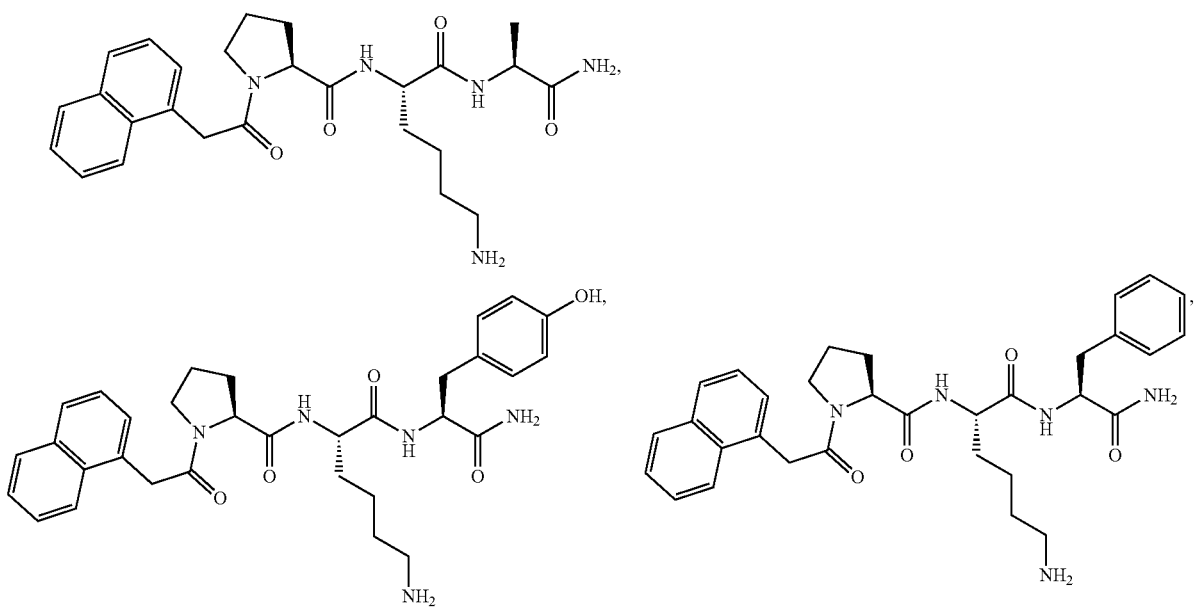

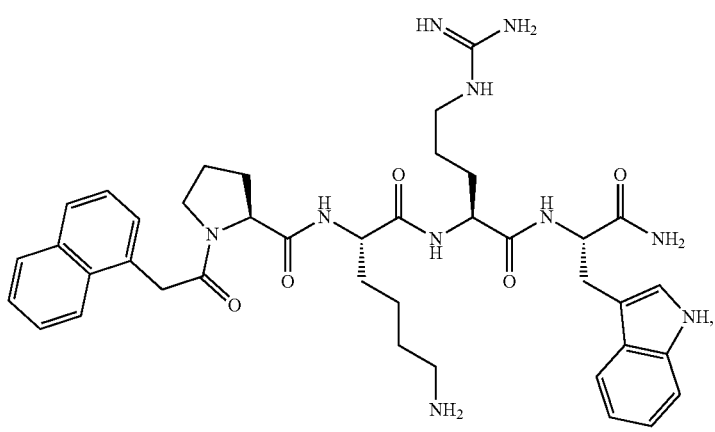
(SEQ ID NO: 7)
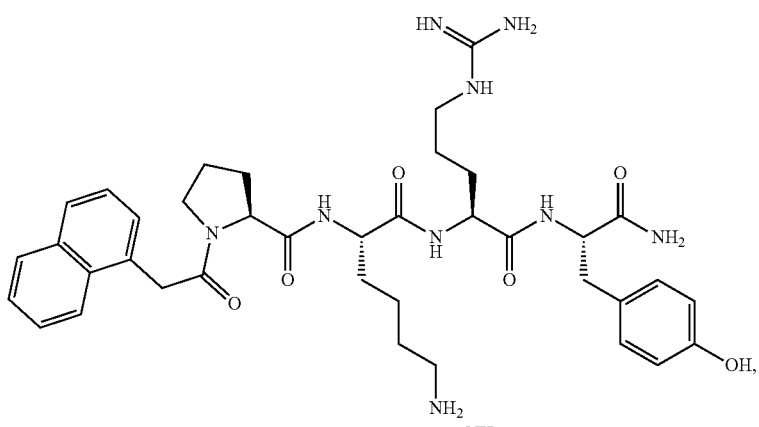
(SEQ ID NO: 8)
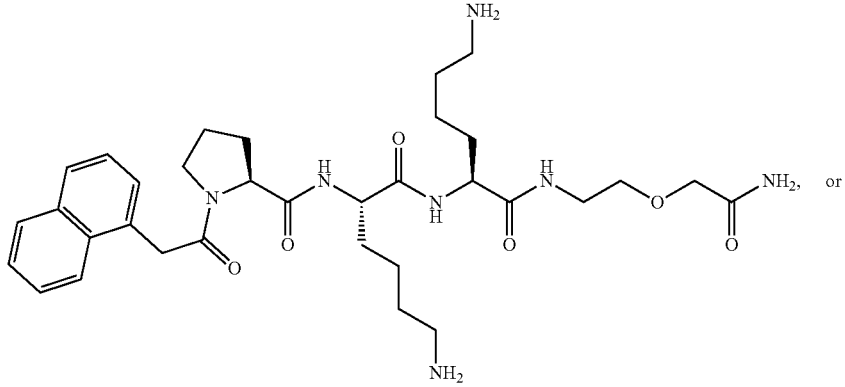
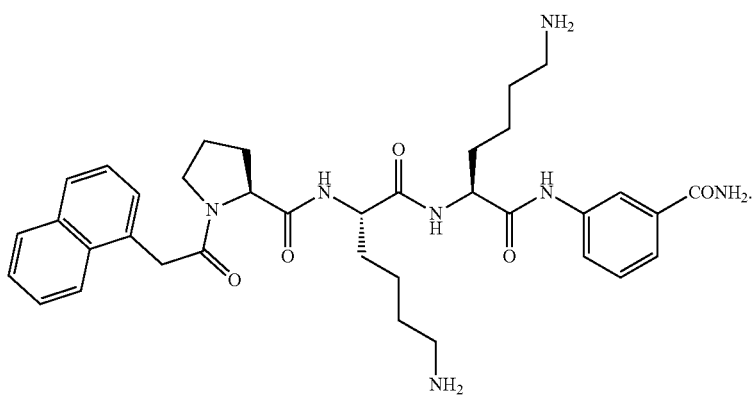

In some other illustrative embodiments, this present invention is related to a pharmaceutical composition comprising one or more compounds disclosed herein, together with one or more pharmaceutically acceptable diluents, excipients, or carriers.

In another embodiment, this present invention is related to a pharmaceutical composition comprising one or more compounds disclosed herein, together with one or more other therapeutically effective compounds and pharmaceutically acceptable diluents, excipients, or carriers.

In another embodiment, this present invention is related to a pharmaceutical composition comprising a compound disclosed herein, and a therapeutically effective amount of one or more other compounds targeting protein N-terminal methyltransferase pharmacological pathway, together with one or more therapeutically one or more pharmaceutically acceptable excipients.

In some embodiments, this present invention is related to a method for treating a patient with a cancer, the method comprising the step of administering a therapeutically effective amount of the compound disclosed herein to the patient in need of relief from said cancer.

In some embodiments, this present invention is related to a method for treating a patient with a prostate, lung, breast, or pancreatic cancer, the method comprising the step of administering a therapeutically effective amount of the compound disclosed herein to the patient in need of relief from said cancer.

In some embodiments, this present invention is related to a method for treating a patient with a cancer, the method comprising the step of administering a therapeutically effective amount of the compound disclosed herein, together with a therapeutically effective amount of a compound of the same or different mode of action, to the patient in need of relief from said cancer.

In some embodiments, this present invention is related to a method for treating a patient with a cancer, the method comprising the step of administering a therapeutically effective amount of the compound disclosed herein, together with a therapeutically effective amount of a compound targeting protein N-terminal methyltransferase pharmacological pathway, to the patient in need of relief from said cancer.

In some embodiments, this present invention is related to a method for treating a patient with a prostate, lung, breast, or pancreatic cancer, the method comprising the step of administering a therapeutically effective amount of the compound disclosed herein, together with a therapeutically effective amount of a compound targeting protein N-terminal methyltransferase pharmacological pathway, to the patient in need of relief from said cancer.

Protein N-terminal methyltransferases (NTMTs/NRMTs) are new additions to the list of PMTs (Yao, Y, et al., *J. Am. Chem. Soc.* 2011, 133, 16746-16749; Tsai, W W, et al., *Proc. Natl. Acad. Sci. USA* 2013, 110, 8870-8875). They catalyze the methylation of α-N-terminal amine of proteins starting with a motif X-P-K/R (X can be any amino acid except D/E) (Yao, Y, et al., *J. Am. Chem. Soc.* 2011, 133, 16746-16749; Bonsignore, L A, et al., *Oncotarget* 2015, 6, 12248-12263). Since the discovery of NTMT1 in 2010, there have been an increasing number of reports of α-N-terminal methylation detected on new protein substrates such as regulator of chromosome condensation 1 (RCC1), the tumor suppressor retinoblastoma 1 (RB1), oncoprotein SET, centromere H3 variants (CENP-A/B), damaged DNA-binding protein 2 (DDB2), and poly(ADP-ribose) polymerase 3. Among these substrates, RCC1, CENP-A/B, RB, and oncoprotein SET are critical cell cycle regulators and important for cell division and viability (Liszczak, G. et al., *Nat. Struct. Mol. Biol.* 2013, 20, 1098-1105). DDB2 and PARP3 have been implicated in DNA repair and the maintenance of genome stability (Richardson, S L, et al., *J. Biol. Chem.* 2015, 290, 11601-11610). It has been observed that the α-N-terminal methylation is essential to stabilize the interactions between RCC1 and chromatin during mitosis, to localize and enhance the interaction of CENPs with chromatin, and to facilitate the recruitment of DDB2 to DNA damage foci (Dong, C, et al., *Genes Dev.* 2015, 29, 2343-2348). Strong evidence of NTMT1 biological functions and relevance in cancer imply its promise as an attractive target for malignant melanoma and colorectal cancer.

The Human Protein Atlas data indicated that 100% malignant melanoma patients' tissues display medium to strong staining of NTMT1, while there is no detectable level of NTMT1 staining in the normal skin tissues. 90% colorectal cancer patients' tissues display high expression of NTMT1 with strong staining, while there is no detectable to medium level of NTMT1 staining in the normal colorectal tissue. Colorectal carcinoma showed a 3-fold increase in NTMT1 mRNA levels compared with normal cells in Oncomine. Knockdown of NTMT1 causes mitotic defects and enhances sensitivity of breast cancer cell lines to DNA damaging chemotherapeutics by 2-fold compared with control cells. On the other hand, knocking down NTMT1 is not toxic to non-transformed epithelial cells since knockdown has not shown any detectable effects on cell growth or phenotypic changes. In addition, NTMT1-knockout mice displayed phenotypes associated with impaired DNA repair. Blocking damaged DNA repair pathway and cell division represents a new approach to personalized cancer therapy since it may sensitize cancer cells to the DNA-damaging effects of chemotherapy as shown in some breast cancer cell lines. Meanwhile, such inhibitors have low toxicity for normal cells since normal cells have more functioning DNA repair pathways to tolerate such inhibition.

Several new inhibitors were designed and synthesized and characterized their $IC_{50}$ values. The most important result is that the $IC_{50}$ decreased to 0.4 µM when the substituent group is Naphthalene at $1^{st}$ position. We also confirmed it's competitively bind to peptide substrate binding pocket. In addition, we replaced the Naphthalene with an Indole ring and the $IC_{50}$ value decreased to 0.16 µM (Table 1).

TABLE 1

Inhibition $IC_{50}$ of selected compounds toward N-terminal methyltransferase1 (NTMT1)

| Compound ID | $IC_{50}$ (µM) |
| --- | --- |
| 1 | 0.40 ± 0.03 |
| 2 | 1.4 |
| 3 | 1.6 ± 0.27 |
| 4 | 0.16 ± 0.07 |
| 5 | 0.11 ± 0.02 |
| 6 | >100 |
| 7 | 1.2 |
| 8 | 5 |
| 9 | >100 |
| 10 | >100 |
| 11 | >100 |
| 12 | 16 ± 5.9 |
| 13 | 2.8 ± 0.89 |
| 14 | >33 |
| 15 | 20.7 ± 3.23 |
| 16 | >100 |
| 17 | 2.5 |
| 18 | 1.5 |
| 19 | 1.77 ± 0.20 |

TABLE 1-continued

Inhibition IC$_{50}$ of selected compounds toward N-terminal methyltransferase1 (NTMT1)

| Compound ID | IC$_{50}$ (µM) |
|---|---|
| 20 | 0.32 |
| 21 | >100 |
| 22 | >100 |
| 23 | >100 |
| 24 | 0.06 |
| 25 | 0.04 |
| 26 | 0.09 |
| 27 | 0.065 |
| 28 | 0.67 |
| 29 | 1.3 ± 0.51 |
| 30 | 10 |
| 31 | 1.56 ± 0.12 |
| 32 | 0.23 ± 0.03 |
| 33 | 0.054 ± 0.004 |
| 34 | 0.068 |
| 35 | 0.59 |
| 36 | 0.96 ± 0.032 |
| 37 | 3.13 ± 0.25 |
| 38 | 1.62 ± 0.11 |
| 39 | 5.76 |
| 40 | 1.63 |
| 41 | 0.96 |
| 42 | 0.84 |
| 43 | 0.095 ± 0.026 |
| 44 | 0.079 ± 0.013 |
| 45 | 0.086 ± 0.013 |
| 46 | 0.10 ± 0.013 |
| 47 | >100 |
| 48 | 8.96 ± 3.60 |

EXPERIMENTAL PROCEDURES

The present invention can be better understood by reference to the following examples which are offered by way of illustration. The present invention is not limited to the examples given herein.

Materials and Reagents

All Reagents and Chemicals were obtained from commercial suppliers such as P3 Biosystems, Chem-Impex, Fisher and used without further purification. Nickel-nitrilotriacetic acid resin was used as purchased from Fisher. Human NTMT1 clone (AD-003) was obtained from Addgene. The AdoHcy hydrolase (SAHH) clone was obtained through a Materials Transfer Agreement with Dr. Raymond C. Trievel (University of Michigan).

Instruments. All peptides were synthesized on a CEM Liberty microwave automatic peptide synthesizer. The compounds were purified by a C18 reverse-phase HPLC-Mass system (Agilent) and characterized by an Applied bio system Voyager MALDI time-of-flight mass spectrometer in positive mode. All IC$_{50}$ studies were performed on a BMG ClarioStar microplate reader.

Synthesis of Peptidomimetic Inhibitors

The peptides were prepared following the standard Fmoc strategy by solid-phase synthesis on MBHA Rink Amid Resin using a CEM Liberty microwave peptide synthesizer. Fmoc group was removed by 20% (v/v) piperidine in DMF and 0.1M HOBt (2×15 min). All amino acids derivatives at first positions were coupled following Method 1 or 2. After coupling, the resin was washed with DCM (3×5 ml), MeOH (3×5 ml), Hexane (3×5 ml). The compounds were cleaved by a cleavage cocktail (TFA:H$_2$O DODT:TIPS=94:2.5:2.5:1, v/v).

Enzyme Purification 4.1 NTMT1 purification. His-NTMT1 was purified as previously described by Richardson, et al[10]. His-NTMT1 was expressed in Escherichia coli BL21 (DE3) codon plus RIL cells in Terrific Broth medium in the presence of kanamycin, using a pET28a-LIC expression vector that encodes a full-length NTMT1 (amino acids 1-222) with His-6 tag obtained from Addgene. Cells were grown at 37° C. induced by isopropyl β-D-1-thiogalactopyranoside and incubated overnight at 15° C. Cells were harvested by centrifugation and suspended in 25 mM Tris-HCl buffer (pH 8.0) containing 0.3 M NaCl and 10 mM imidazole, lysed and centrifuged for 15 min at 4° C. The supernatant was purified by a nickel-nitrilotriacetic acid column. The protein was eluted with 25 mM Tris-HCl buffer (pH 8.0) containing 100 mM imidazole and 300 mM NaCl and then dialyzed in the dialysis buffer (25 mM Tris, pH 7.5, 150 mM NaCl, 50 mM KCl) three times to provide His-NTMT1. Protein purity (>95%) was verified by SDS-PAGE and the concentration was determined by Eppendorf spectrometer.

4.2 G9a purification. G9a/EHMT2 was expressed in E. coli BL21 (DE3) codon plus RIL in Terrific Broth (TB) in the presence of 50 µg/ml of kanamycin. Cells were grown at 37° C. to OD600 of 1.5 and induced by isopropyl-1-thio-D-galactopyranoside (IPTG), final concentration 0.3 mM, and incubated overnight at 15° C. Cells were harvested by centrifugation at 7,000 rpm. The cell pellets were frozen in liquid nitrogen and stored at −80° C. For purification the cell paste was thawed and resuspended in lysis buffer (phosphate-buffered saline, pH 7.4, 0.25 M NaCl, 5 mM imidazol, 2 mM ß-mercaptoethanol, 5% glycerol) with protease inhibitor (0.1 mM phenylmethyl sulfonyl fluoride, PMSF). The cells were lysed by passing through Microfluidizer (Microfluidics Corp.) at 10,000-20,000 psi. The crude extract was cleared by centrifugation and loaded onto 5 ml HiTrap Chelating column (Amersham Biosciences), charged with Ni$^{2+}$. The column was washed with 10 CV of 20 mM Tris-HCl buffer, pH 8.0, containing 250 mM NaCl, 50 mM imidazole and 5% glycerol, and the protein was eluted with elution buffer (20 mM Tris-HCl, pH 8.0, 250 mM NaCl, 250 mM imidazole, 5% glycerol).

4.3 PRMT1 purification. PRMT1 was expressed in E. coli BL21 (DE3) codon plus RIL in Terrific Broth (TB) in the presence of 50 µg/ml of kanamycin. Cells were grown at 37° C. to OD600 of 0.7 and induced by isopropyl-1-thio-D-galactopyranoside (IPTG), final concentration 0.3 mM, and incubated overnight at 15° C. Cells were harvested by centrifugation at 7,000 rpm. The cell pellets were frozen in liquid nitrogen and stored at −80° C. For purification the cell paste was thawed and resuspended in lysis buffer (25 mM HEPES, pH 7.4, 150 mM NaCl, 1 mM MgSO$_4$, 5% ethylene glycol, 5% glycerol) with protease inhibitor (0.1 mM phenylmethyl sulfonyl fluoride, PMSF). The cells were lysed by passing through Microfluidizer (Microfluidics Corp.) at 10,000-20,000 psi. The crude extract was cleared by centrifugation and loaded onto 5 ml HiTrap Chelating column (Amersham Biosciences), charged with Ni$^{2+}$. The column was washed with 10 CV of 25 mM HEPES buffer, pH 7.0, containing 300 mM NaCl, 10 mM imidazole and 5% glycerol, and the protein was eluted with elution buffer (25 mM HEPES buffer, pH 7.0, 300 mM NaCl, 1 M imidazole, 10% glycerol).

Kinetic Analysis of Compounds

Kinetic characterization of the peptide inhibitors was determined using a similar protocol as described abobe[11]. The inhibitors ranging in concentration from (2 µL of 0.14 µM-1 mM) and following a three-fold dilution were incubated with 0.2 µM NTMT1 with a reaction mixture which was added in the following order: H2O, 10× Tris-HCl Buffer (2 µL of 250 mM Tris pH 7.4, 100 mM NaCl, and 500 mM KCl), SAH hydrolase (1 µL of 100 µM), SAM (0.2 µL of 10 mM), NTMT1 (1 µL of 4 µM) and ThioGlo1 (0.2 µL of 1.5 mM DMSO solution). After 10 mins of incubation at 37° C., the reaction was initiated with 1 µM of GPKRIA. Fluorescence intensity was monitored using a BMG ClarioStar microplate reader (Ex=380 nm, Em=510 nm) at 37° C. for 15 min. The rates were fit to the log[inhibitor] vs response model using least squares nonlinear regression through GraphPad Prism 7 software. All experiments were performed in triplicate.

Inhibitory Mechanism Studies

Kinetic analysis of one of the top inhibitors, 1-NaphthaleneAc-PKR, was performed to determine the inhibition mechanism using the fluorescent-based assay described above[10-11]. First, seven $IC_{50}$ studies of 1-NaphthaleneAc-PKR were performed at varying concentrations of substrate peptide GPKRIA (0.5 $K_m$, $K_m$, 2 $K_m$, 4 $K_m$, 6 $K_m$, 8 $K_m$ and 10 $K_m$) and saturated concentration of SAM. The $IC_{50}$ values were plotted against the concentration of the Peptide/$K_m$. Next, seven $IC_{50}$ studies were performed at varying concentrations of SAM (0.5 $K_m$, $K_m$, 2 $K_m$, 4 $K_m$, 6 $K_m$, 8 $K_m$ and 10 $K_m$) and GPKRIA at its $K_m$ value. The $IC_{50}$ values were plotted against the concentration of the SAM/$K_m$.

Selectivity Studies 6.1 G9a. Kinetic analysis of the peptide inhibitors was also carried out using the SAH hydrolase-coupled fluorescence assay against G9a to characterize the selectivity. The inhibitors ranging in concentration from (2 µL of 0.14 µM-1 mM) and following a three-fold dilution were incubated with 25 nM G9a with a reaction mixture which was added in the following order: $H_2O$, 25 mM potassium phosphate buffer (pH=7.6), 1 mM EDTA, 2 mM $MgCl_2$, 0.01% Triton X-100, SAH hydrolase (1 µL of 100 µM), SAM (0.2 µL of 10 mM), G9a (1 µL of 500 nM) and ThioGlo1 (0.2 µL of 1.5 mM DMSO solution). After 10 mins of incubation at 37° C., the reaction was initiated with H3-21. Fluorescence intensity was monitored using a BMG ClarioStar microplate reader (Ex=380 nm, Em=510 nm) at 37° C. for 15 min. The rates were fit to the log[inhibitor] vs response model using least squares nonlinear regression through GraphPad Prism 7 software. All experiments were performed in triplicate.

6.2 PRMT1. Kinetic analysis of the peptide inhibitors was also carried out using the SAH hydrolase-coupled fluorescence assay against PRMT1 to characterize the selectivity. The inhibitors ranging in concentration from (2 µL of 0.14 µM-1 mM) and following a three-fold dilution were incubated with 25 nM G9a with a reaction mixture which was added in the following order: $H_2O$, 10×HEPES Buffer (250 mM HEPES, 2500 mM NaCl, 2.5 mM EDTA, 5 mM TCEP), SAH hydrolase (1 µL of 100 µM), SAM (0.2 µL of 10 mM), PRMT1 (1 µL of 4 µM) and ThioGlo1 (0.2 µL of 1.5 mM DMSO solution)[12]. After 10 mins of incubation at 37° C., the reaction was initiated with H4-21. Fluorescence intensity was monitored using a BMG ClarioStar microplate reader (Ex=380 nm, Em=510 nm) at 37° C. for 15 min. The rates were fit to the log[inhibitor] vs response model using least squares nonlinear regression through GraphPad Prism 7 software. All experiments were performed in triplicate.

Stability Studies of Peptidomimetic Inhibitors

To assess the stability of the peptidomimetic inhibitors, all the compounds synthesized will be incubated separately in fetal bovine serum with a final concentration of 2 mM at 37° C. over a period of 24 hours. 100 µL of sample was taken out at different time points (0, 1, 2, 4, 8, 16 and 24 h) and 200 µL cold acetone was added. After centrifuge at 4° C. for 10 min, precipitate was removed and supernatant was analyzed by HPLC-MS (Waters).

Experimental Procedure

Method 1

(S)—N—((S)-6-amino-1-(((S)-1-amino-5-guanidino-1-oxopentan-2-yl)amino)-1-oxohexan-2-yl)-1-(2-(naphthalen-1-yl)acetyl)pyrrolidine-2-carboxamide (1)

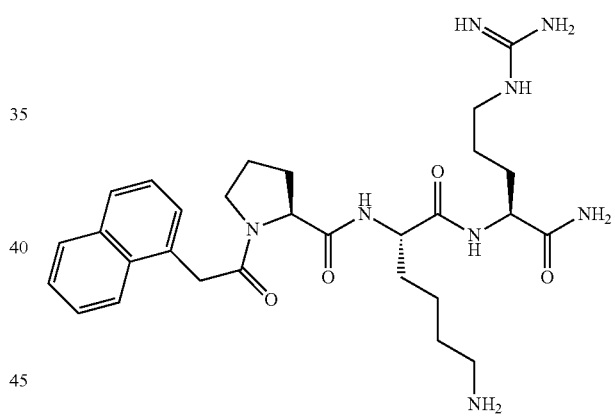

To the deprotected PKR peptide on resin (synthesized on CEM Liberty blue microwave peptide synthesizer) (0.05 mmol) in DMF (2 ml) was added 2-Naphtalene acetic acid (17.2 mg, 0.1 mmol), HOBT (13.5 mg, 0.1 mmol) and DIC (16 µL, 0.1 mmol). The mixture was placed on a shaker for 4 h. The resin was washed with DCM (3×5 ml), MeOH (3×5 ml), Hexane (3×5 ml). A cleavage cocktail (TFA:H2O:DODT:TIPS=94:2.5:2.5:1) was added to the resin and shake for 3~5 h. After filtering, solvent was removed under nitrogen atmosphere and the residue was mixed with 10 mL of ice-cold ether and then pelleted by centrifugation. The supernatant was discarded, and the pellet was washed well with chilled ether, air-dried. The crude product was purified by C18 reverse-phase HPLC. HRMS (MALDI-MASS) calculated for $C_{29}H_{42}N_8O_4$ (M+H)+ m/z 567.3329.

71

(S)—N—((S)-6-amino-1-(((S)-1-amino-5-guanidino-1-oxopentan-2-yl)amino)-1-oxohexan-2-yl)-1-(2-(4-fluoronaphthalen-1-yl)acetyl)pyrrolidine-2-carboxamide (2)

72

(S)—N—((S)-6-amino-1-(((S)-1-amino-5-guanidino-1-oxopentan-2-yl)amino)-1-oxohexan-2-yl)-1-(2-(quinolin-8-yl)acetyl)pyrrolidine-2-carboxamide (7)

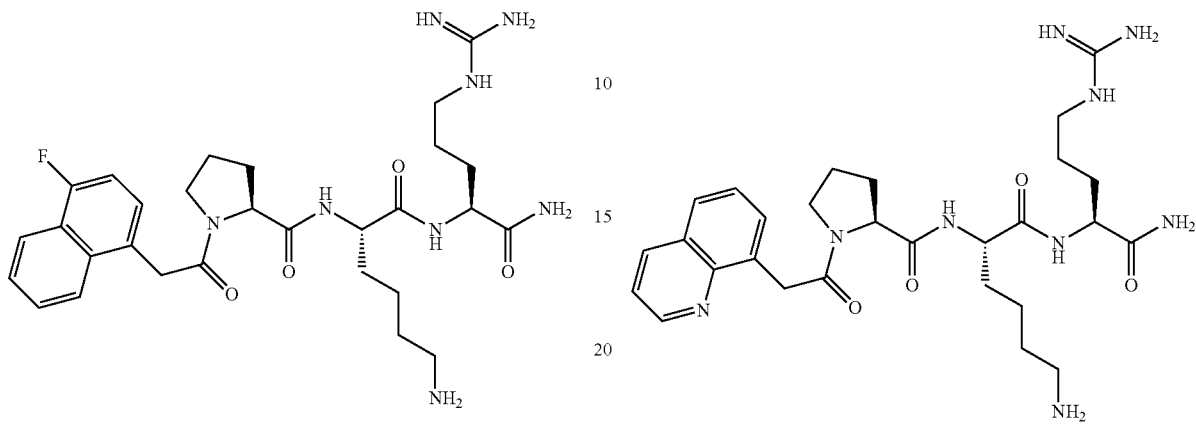

HRMS (MALDI-MASS) calculated for $C_{29}H_{41}FN_8O_4$ $(M+H)^+$ m/z 584.3283.

HRMS (MALDI-MASS) calculated for $C_{25}H_{34}N_4O_3$ $(M+H)^+$ m/z 567.3282.

(S)—N—((S)-6-amino-1-(((S)-1-amino-5-guanidino-1-oxopentan-2-yl)amino)-1-oxohexan-2-yl)-1-(2-(4-bromonaphthalen-1-yl)acetyl)pyrrolidine-2-carboxamide (3)

(S)-6-amino-2-(2-(N-cyclopentyl-2-(naphthalen-1-yl)acetamido)acetamido)hexanamide (10)

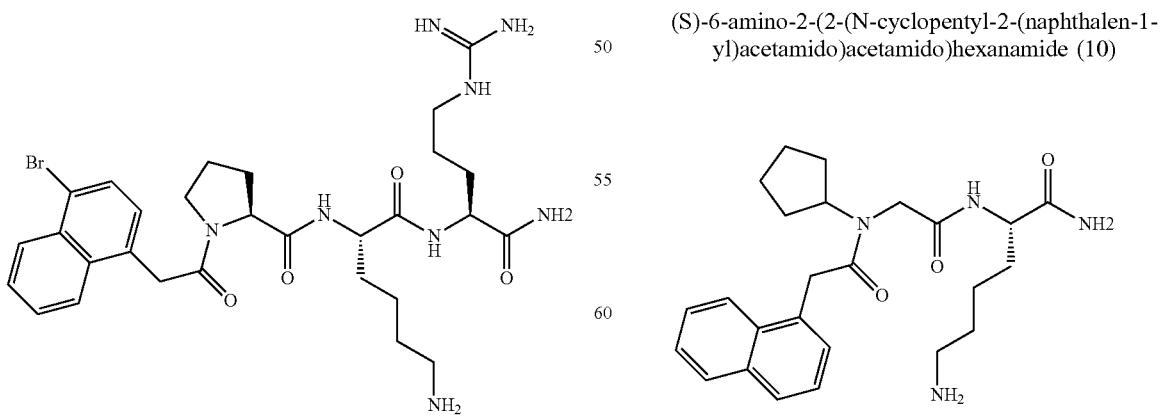

HRMS (MALDI-MASS) calculated for $C_{29}H_{41}BrN_8O_4$ $(M+H)^+$ m/z 645.2434.

HRMS (MALDI-MASS) calculated for $C_{28}H_{41}N_9O_4$ $(M+H)^+$ m/z 438.2631.

73

(S)—N—((S)-6-amino-1-(((S)-1-amino-5-guanidino-1-oxopentan-2-yl)amino)-1-oxohexan-2-yl)-1-(2-(benzo[d][1,3]dioxol-5-yl)acetyl)pyrrolidine-2-carboxamide (8)

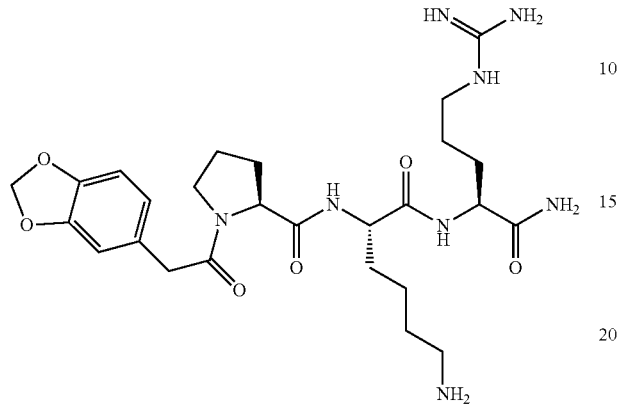

HRMS (MALDI-MASS) calculated for $C_{26}H_{40}N_8O_6$ (M+H)$^+$ m/z 560.3071.

74

(S)—N—((S)-1,6-diamino-1-oxohexan-2-yl)-1-(2-(naphthalen-1-yl)acetyl)pyrrolidine-2-carboxamide (13)

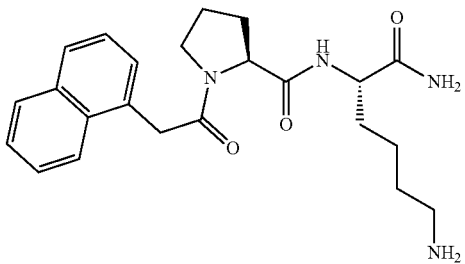 [SMILES: NCCCC[C@H](NC(=O)[C@@H]1CCCN1C(=O)Cc1cccc2ccccc12)C(N)=O]

HRMS (MALDI-MASS) calculated for $C_{23}H_{30}N_4O_3$ (M+H)$^+$ m/z 411.2318.

(S)—N—((S)-6-amino-1-(((S)-1,6-diamino-1-oxohexan-2-yl)amino)-1-oxohexan-2-yl)-1-(2-(naphthalen-1-yl)acetyl)pyrrolidine-2-carboxamide (20)

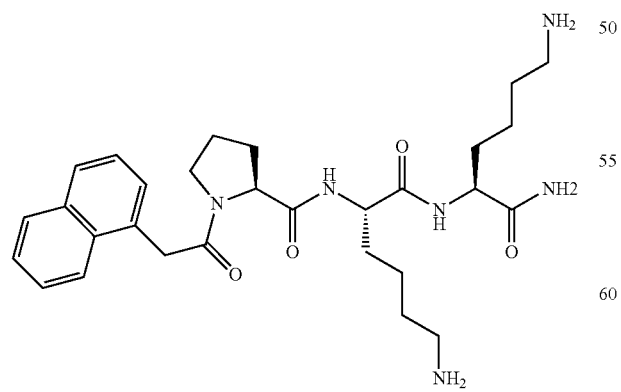

HRMS (MALDI-MASS) calculated for $C_{29}H_{42}N_6O_4$ (M+H)$^+$ m/z 539.3268.

(S)—N—((S)-6-amino-1-(((S)-1-amino-5-guanidino-1-oxopentan-2-yl)amino)-1-oxohexan-2-yl)-1-(2-(4-nitrophenyl)acetyl)pyrrolidine-2-carboxamide (48)

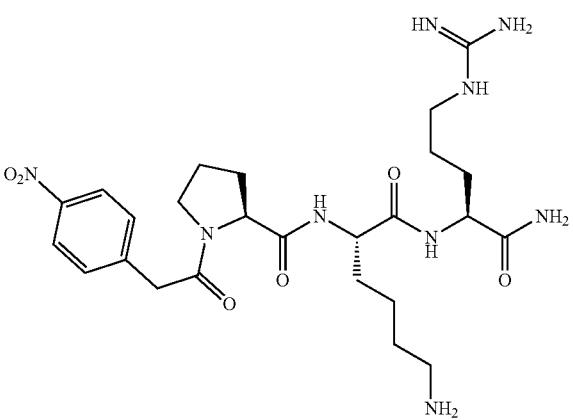 [SMILES: N=C(N)NCCC[C@H](NC(=O)[C@H](CCCCN)NC(=O)[C@@H]1CCCN1C(=O)Cc1ccc([N+](=O)[O-])cc1)C(N)=O]

HRMS (MALDI-MASS) calculated for $C_{25}H_{39}N_9O_6$ (M+H)$^+$ m/z 562.3023

75

(S)—N—((S)-6-amino-1-(((S)-1-amino-5-guanidino-1-oxopentan-2-yl)amino)-1-oxohexan-2-yl)-1-(2-(4-(hydroxymethyl)phenyl)acetyl)pyrrolidine-2-carboxamide (18)

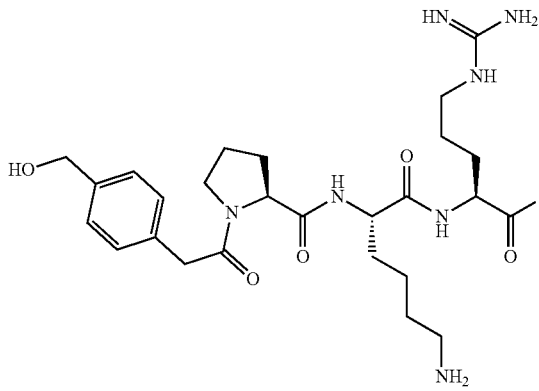

HRMS (MALDI-MASS) calculated for $C_{26}H_{42}N_8O_5$ (M+H)$^+$ m/z 547.3728

76

(S)—N—((S)-1-(((S)-1-amino-5-guanidino-1-oxopentan-2-yl)amino)-5-guanidino-1-oxopentan-2-yl)-1-(2-(4-hydroxyphenyl)acetyl)pyrrolidine-2-carboxamide (15)

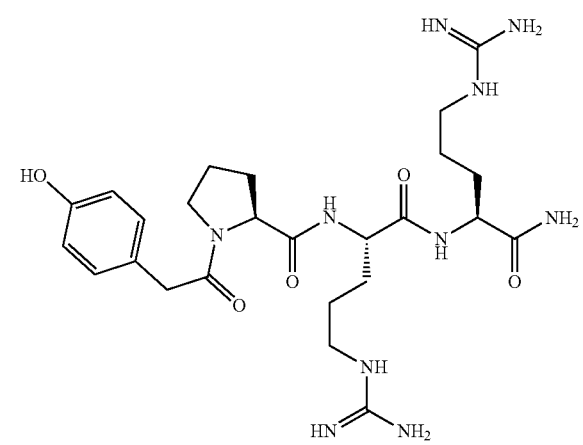

HRMS (MALDI-MASS) calculated for $C_{25}H_{40}N_{10}O_5$ (M+H)$^+$ m/z 561.3183

(S)—N—((S)-6-amino-1-(((S)-1-amino-5-guanidino-1-oxopentan-2-yl)amino)-1-oxohexan-2-yl)-1-((E)-3-(4-hydroxyphenyl)acryloyl)pyrrolidine-2-carboxamide (17)

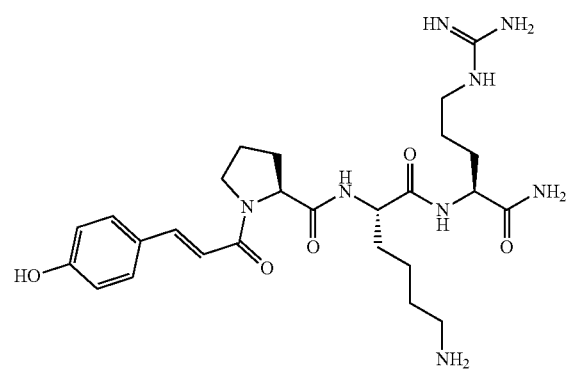 [SMILES: N=C(N)NCCC[C@H](NC(=O)[C@H](CCCCN)NC(=O)[C@@H]1CCCN1C(=O)/C=C/c1ccc(O)cc1)C(N)=O]

HRMS (MALDI-MASS) calculated for $C_{26}H_{40}N_8O_5$ (M+H)$^+$ m/z 545.3122

(S)-1-(2-(1H-indol-4-yl)acetyl)-N—((S)-6-amino-1-(((S)-1-amino-5-guanidino-1-oxopentan-2-yl)amino)-1-oxohexan-2-yl)pyrrolidine-2-carboxamide (4)

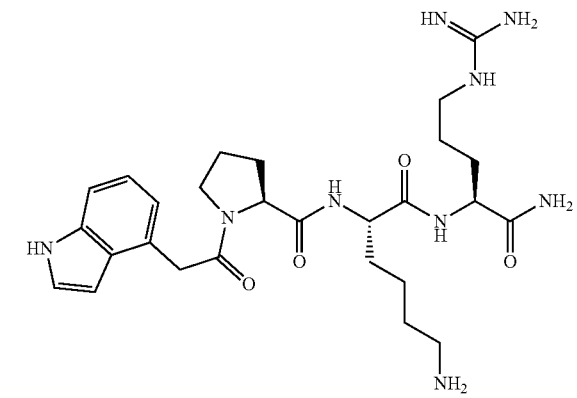 [SMILES: N=C(N)NCCC[C@H](NC(=O)[C@H](CCCCN)NC(=O)[C@@H]1CCCN1C(=O)Cc1cccc2[nH]ccc12)C(N)=O]

HRMS (MALDI-MASS) calculated for $C_{25}H_{39}N_9O_6$ (M+H)$^+$ m/z 556.3282

77

(S)—N—((S)-6-amino-1-(((S)-1-(((R)-1-amino-5-guanidino-1-oxopentan-2-yl)amino)-5-guanidino-1-oxopentan-2-yl)amino)-1-oxohexan-2-yl)-1-(2-(4-hydroxyphenyl)acetyl)pyrrolidine-2-carboxamide (SEQ ID NO: 9)

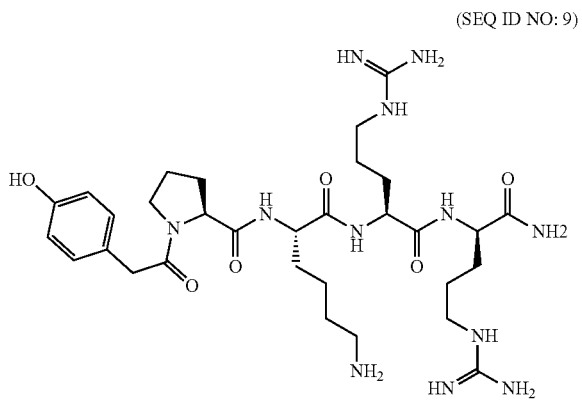 [SMILES: N=C(N)NCCC[C@H](NC(=O)[C@H](CCCCN)NC(=O)[C@@H]1CCCN1C(=O)Cc1ccc(O)cc1)C(=O)N[C@H](CCCNC(=N)N)C(N)=O]

HRMS (MALDI-MASS) calculated for $C_{31}H_{52}N_{12}O_6$ (M+H)$^+$ m/z 689.4133

78

(S)—N—((S)-6-amino-1-(((S)-1-((2-(2-amino-2-oxoethoxy)ethyl)amino)-5-guanidino-1-oxopentan-2-yl)amino)-1-oxohexan-2-yl)-1-(2-(3,4-dihydroxyphenyl)acetyl)pyrrolidine-2-carboxamide (5)

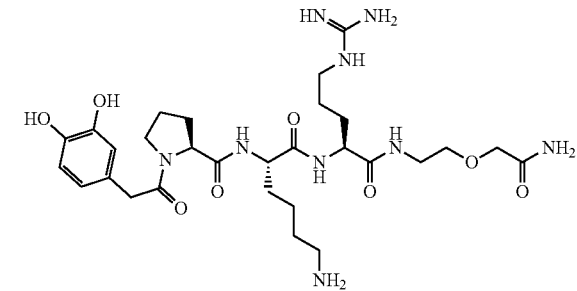 [SMILES: N=C(N)NCCC[C@H](NC(=O)[C@H](CCCCN)NC(=O)[C@@H]1CCCN1C(=O)Cc1ccc(O)c(O)c1)C(=O)NCCOCC(N)=O]

HRMS (MALDI-MASS) calculated for $C_{29}H_{47}N_9O_8$ (M+H)$^+$ m/z 650.3548.

(2-chloroacetyl)-L-prolyl-L-prolyl-L-lysyl-L-arginine (12)

(SEQ ID NO: 10)

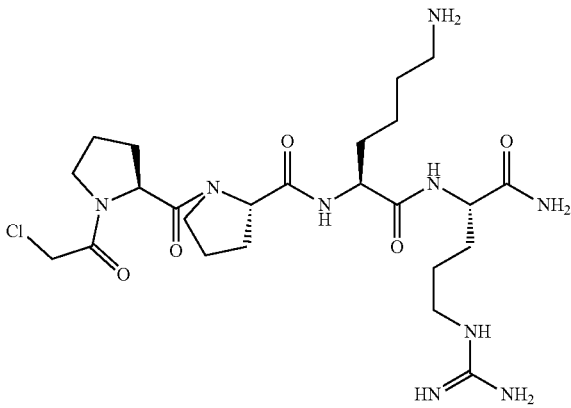

HRMS (MALDI-MASS) calculated for $C_{24}H_{42}ClN_8O_5$ (M+H)$^+$ m/z 573.2838

(S)—N—((S)-6-amino-1-(((S)-1-amino-5-guanidino-1-oxopentan-2-yl)amino)-1-oxohexan-2-yl)-1-((R)-2-(4-hydroxyphenyl)-2-(2-(4-hydroxyphenyl)acetamido)acetyl)pyrrolidine-2-carboxamide (21)

(SEQ ID NO: 11)

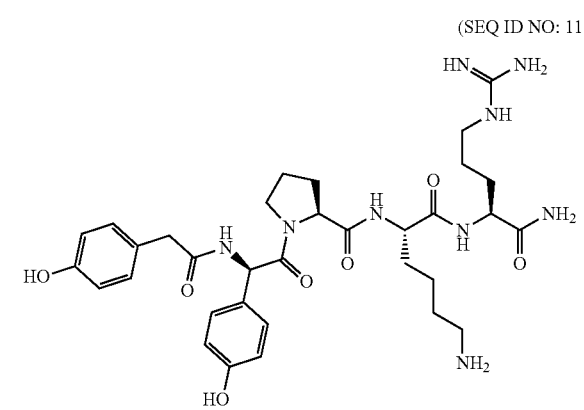

HRMS (MALDI-MASS) calculated for $C_{33}H_{47}N_9O_7$ (M+H)$^+$ m/z 682.3598.

(S)—N—((S)-6-amino-1-(((S)-1-amino-5-guanidino-1-oxopentan-2-yl)amino)-1-oxohexan-2-yl)-1-((S)-2-(4-hydroxyphenyl)-2-(2-(4-hydroxyphenyl)acetamido)acetyl)pyrrolidine-2-carboxamide (22)

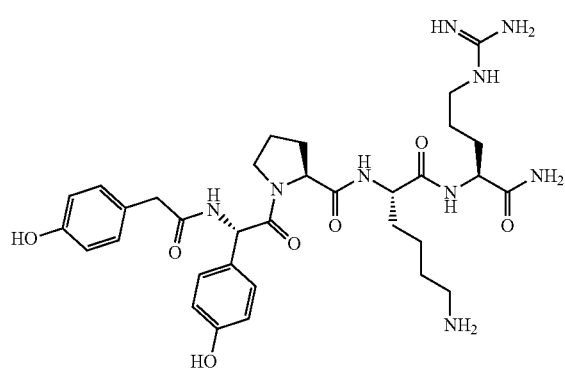 [SMILES: N=C(N)NCCC[C@H](NC(=O)[C@H](CCCCN)NC(=O)[C@@H]1CCCN1C(=O)[C@@H](NC(=O)Cc1ccc(O)cc1)c1ccc(O)cc1)C(N)=O]

HRMS (MALDI-MASS) calculated for $C_{33}H_{47}N_9O_7$ (M+H)$^+$ m/z 682.3598.

Method 2

(S)—N—((S)-6-amino-1-(((S)-1-amino-5-guanidino-1-oxopentan-2-yl)amino)-1-oxohexan-2-yl)-1-(2-(naphthalen-1-yl)ethyl)pyrrolidine-2-carboxamide (14)

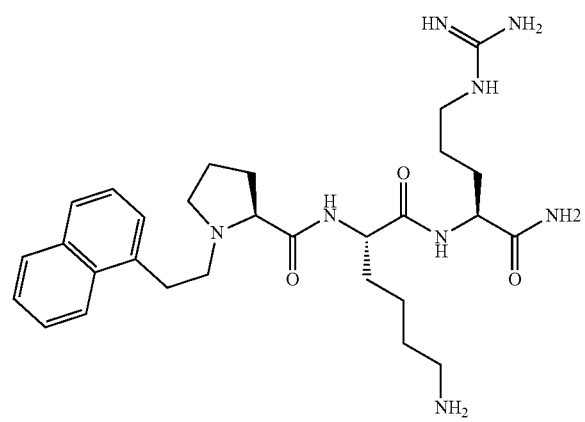 [SMILES: N=C(N)NCCC[C@H](NC(=O)[C@H](CCCCN)NC(=O)[C@@H]1CCCN1CCc1cccc2ccccc12)C(N)=O]

To the deprotected PKR peptide on resin (synthesized on CEM Liberty blue microwave peptide synthesizer) (0.05 mmol) in DMF (2 ml) was added 1-(2-bromoethyl)naphthalene (58.75 mg, 0.25 mmol), DIPEA (43.5 µL, 0.25 mmol) and KI (41.5 mg, 0.25 mmol). The mixture was placed on a shaker for 4 h. The resin was washed with DCM (3×5 ml), MeOH (3×5 ml), Hexane (3×5 ml). A cleavage cocktail (TFA:H2O:DODT:TIPS=94:2.5:2.5:1) was added to the resin and shake for 3~5 h. After filtering, cocktail solvent was removed under nitrogen atmosphere and the residue was mixed with 10 mL of ice-cold ether and then pelleted by centrifugation. The supernatant was discarded, and the pellet was washed well with chilled ether, air-dried. The crude product was purified by C18 reverse-phase HPLC. HRMS (MALDI-MASS) calculated for $C_{29}H_{42}N_8O_4$ (M+H)$^+$ m/z 567.3329.

(S)—N—((S)-1,6-diamino-1-oxohexan-2-yl)-1-(2-(naphthalen-1-yl)ethyl)pyrrolidine-2-carboxamide (9)

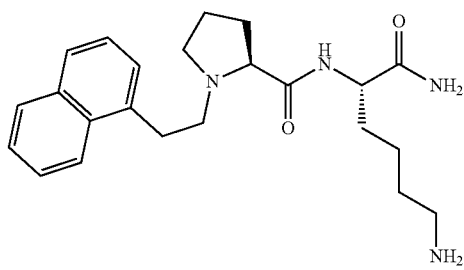 [SMILES: NCCCC[C@H](NC(=O)[C@@H]1CCCN1CCc1cccc2ccccc12)C(N)=O]

HRMS (MALDI-MASS) calculated for $C_{23}H_{32}N_4O_2$ (M+H)$^+$ m/z 397.2525.

(S)—N—((S)-6-amino-1-(((S)-1-amino-5-guanidino-1-oxopentan-2-yl)amino)-1-oxohexan-2-yl)-1-phenethylpyrrolidine-2-carboxamide (19)

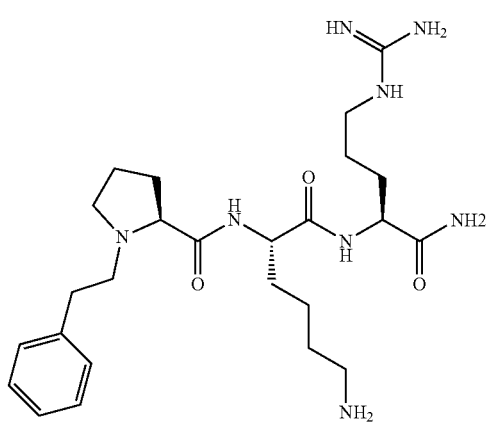 [SMILES: N=C(N)NCCC[C@H](NC(=O)[C@H](CCCCN)NC(=O)[C@@H]1CCCN1CCc1ccccc1)C(N)=O]

HRMS (MALDI-MASS) calculated for $C_{25}H_{42}N_8O_3$ (M+H)$^+$ m/z 503.3380.

81

(S)—N—((S)-6-amino-1-(((S)-1-amino-5-guanidino-1-oxopentan-2-yl)amino)-1-oxohexan-2-yl)-1-((R)-2-((4-hydroxyphenethyl)amino)-2-(4-hydroxyphenyl)acetyl)pyrrolidine-2-carboxamide (23)

(SEQ ID NO: 12)

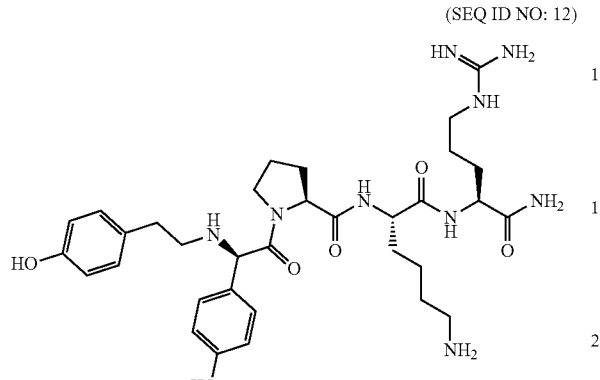

HRMS (MALDI-MASS) calculated for $C_{33}H_{49}N_9O_6$ (M+H)$^+$ m/z 668.3806.

82

Method 3

(S)—N-(1,6-diamino-1-oxohexan-2-yl)-1-(2-oxo-2-(phenylamino)ethyl)-1H-1,2,3-triazole-4-carboxamide (11)

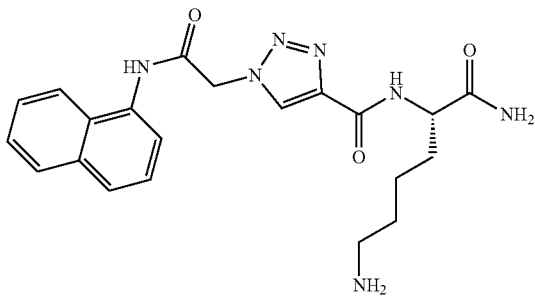 [SMILES: NCCCC[C@H](NC(=O)c1cn(CC(=O)Nc2cccc3ccccc23)nn1)C(N)=O]

HRMS (MALDI-MASS) calculated for $C_{17}H_{23}N_7O_3$ (M+H)$^+$ m/z 373.1826.

(S)—N—((S)-6-amino-1-(((S)-1-amino-5-guanidino-1-oxopentan-2-yl)amino)-1-oxohexan-2-yl)-1-((S)-2-((4-hydroxyphenethyl)amino)-2-(4-hydroxyphenyl)acetyl)pyrrolidine-2-carboxamide (47)

(SEQ ID NO: 13)

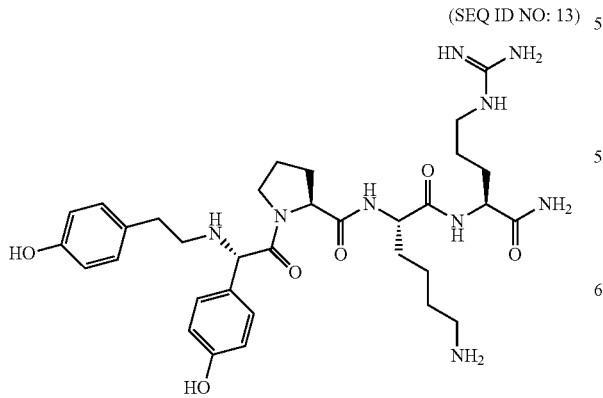

HRMS (MALDI-MASS) calculated for $C_{33}H_{49}N_9O_6$ (M+H)$^+$ m/z 668.3806.

(S)—N—((S)-6-amino-1-(((S)-1-(((2S,3S)-1-amino-3-methyl-1-oxopentan-2-yl)amino)-5-guanidino-1-oxopentan-2-yl)amino)-1-oxohexan-2-yl)-1-(2-(naphthalen-1-yl)acetyl)pyrrolidine-2-carboxamide (24)

(SEQ ID NO: 1)

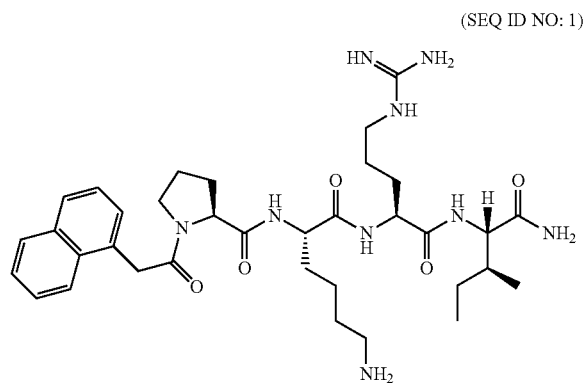 [SMILES: CC[C@H](C)[C@H](NC(=O)[C@H](CCCNC(=N)N)NC(=O)[C@H](CCCCN)NC(=O)[C@@H]1CCCN1C(=O)Cc1cccc2ccccc12)C(N)=O]

HRMS (MALDI-MASS) calculated for $C_{35}H_{54}N_9O_5$ (M+H)$^+$ m/z 680.4170.

83

(S)—N—((S)-6-amino-1-(((S)-1-(((S)-1-amino-5-guanidino-1-oxopentan-2-yl)amino)-5-guanidino-1-oxopentan-2-yl)amino)-1-oxohexan-2-yl)-1-(2-(naphthalen-1-yl)acetyl)pyrrolidine-2-carboxamide (25)

84

(S)—N—((S)-6-amino-1-(((S)-1-(((S)-1-amino-1-oxopent-4-yn-2-yl)amino)-5-guanidino-1-oxopentan-2-yl)amino)-1-oxohexan-2-yl)-1-(2-(naphthalen-1-yl)acetyl)pyrrolidine-2-carboxamide (26)

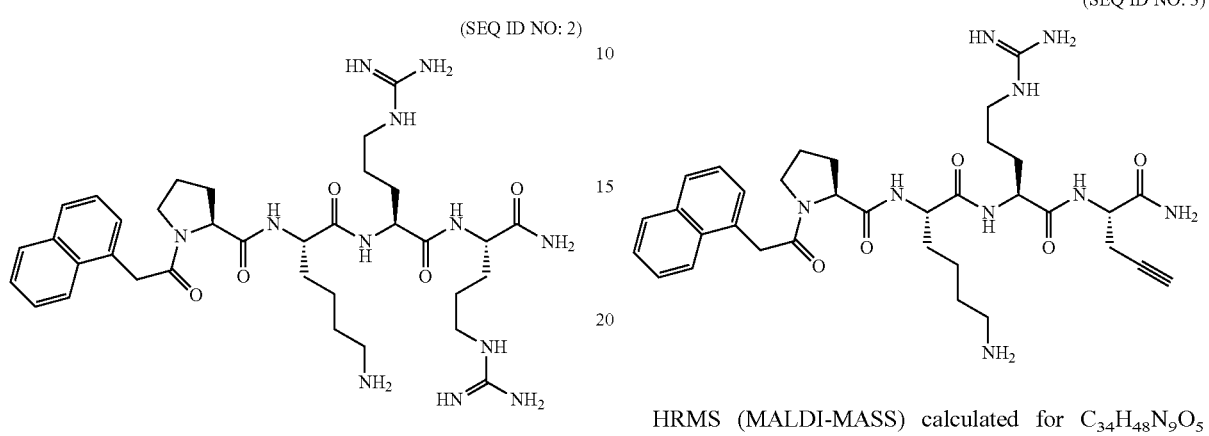

(SEQ ID NO: 2)

(SEQ ID NO: 3)

HRMS (MALDI-MASS) calculated for $C_{34}H_{48}N_9O_5$ $(M+H)^+$ m/z 662.3700.

HRMS (MALDI-MASS) calculated for $C_{35}H_{55}N_{12}O_5$ $(M+H)^+$ m/z 723.4340.

(S)—N—((S)-6-amino-1-(((S)-1-((2-(2-amino-2-oxoethoxy)ethyl)amino)-5-guanidino-1-oxopentan-2-yl)amino)-1-oxohexan-2-yl)-1-(2-(naphthalen-1-yl)acetyl)pyrrolidine-2-carboxamide (27)

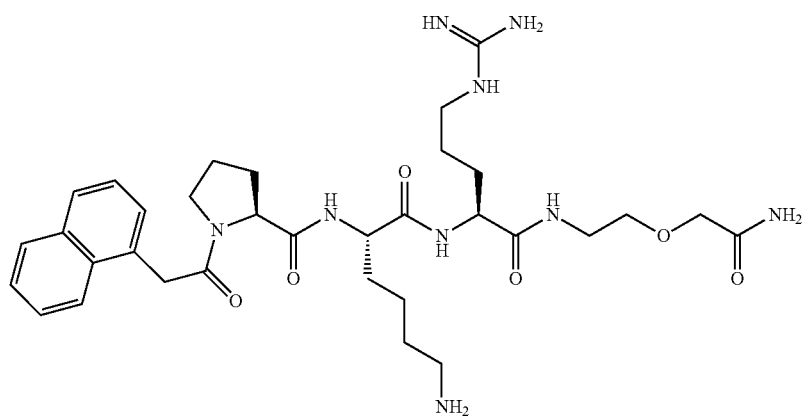 [SMILES: N=C(N)NCCC[C@H](NC(=O)[C@H](CCCCN)NC(=O)[C@@H]1CCCN1C(=O)Cc1cccc2ccccc12)C(=O)NCCOCC(N)=O]

HRMS (MALDI-MASS) calculated for $C_{33}H_{50}N_9O_6$ (M+H)$^+$ m/z 668.3806.

(S)—N—((S)-6-amino-1-(((S)-1-amino-1-oxopent-4-yn-2-yl)amino)-1-oxohexan-2-yl)-1-(2-(naphthalen-1-yl)acetyl)pyrrolidine-2-carboxamide (28)

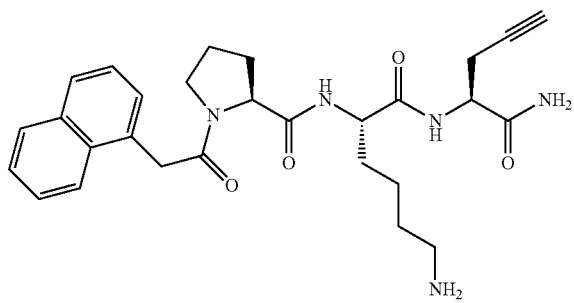 [SMILES: C#CC[C@H](NC(=O)[C@H](CCCCN)NC(=O)[C@@H]1CCCN1C(=O)Cc1cccc2ccccc12)C(N)=O]

HRMS (MALDI-MASS) calculated for $C_{28}H_{36}N_5O_4$ (M+H)$^+$ m/z 506.2689.

(S)—N—((S)-1-(((1H-benzo[d]imidazol-2-yl)methyl)amino)-6-amino-1-oxohexan-2-yl)-1-(2-(naphthalen-1-yl)acetyl)pyrrolidine-2-carboxamide (29)

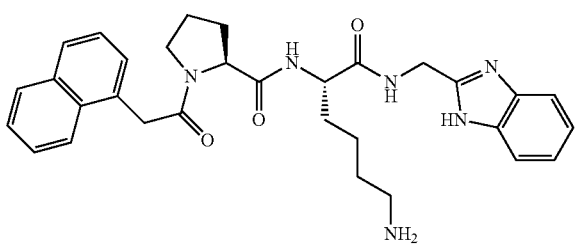 [SMILES: NCCCC[C@H](NC(=O)[C@@H]1CCCN1C(=O)Cc1cccc2ccccc12)C(=O)NCc1nc2ccccc2[nH]1]

HRMS (MALDI-MASS) calculated for $C_{31}H_{37}N_6O_3$ (M+H)$^+$ m/z 541.2849.

(S)—N—((S)-1-(((1H-benzo[d]imidazol-2-yl)methyl)amino)-6-amino-1-oxohexan-2-yl)-1-(2-(4-hydroxyphenyl)acetyl)pyrrolidine-2-carboxamide (30)

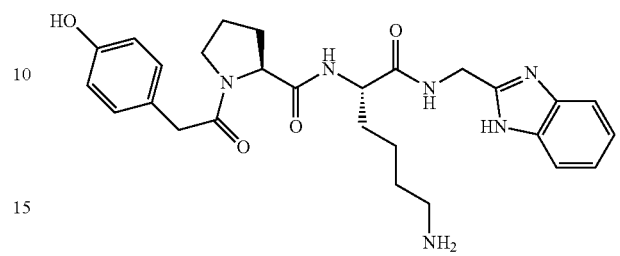

HRMS (MALDI-MASS) calculated for $C_{27}H_{35}N_6O_4$ (M+H)$^+$ m/z 507.2642.

(S)—N—((S)-6-amino-1-((2-(2-amino-2-oxoethoxy)ethyl)amino)-1-oxohexan-2-yl)-1-(2-(naphthalen-1-yl)acetyl)pyrrolidine-2-carboxamide (31)

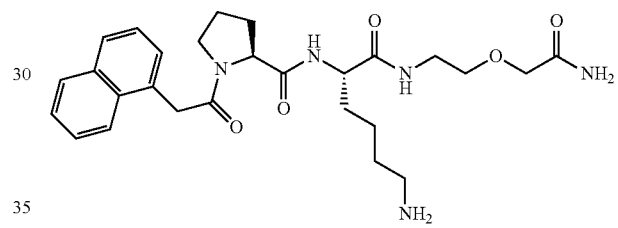

HRMS (MALDI-MASS) calculated for $C_{27}H_{38}N_5O_5$ (M+H)$^+$ m/z 512.2795.

(2-(4-hydroxyphenyl)acetyl)-L-prolyl-L-lysyl-L-arginylglycyl-L-arginyl-L-lysyl-L-lysyl-L-arginyl-L-arginyl-L-glutaminyl-L-arginyl-L-arginyl-L-arginine (32)

(SEQ ID NO: 4)

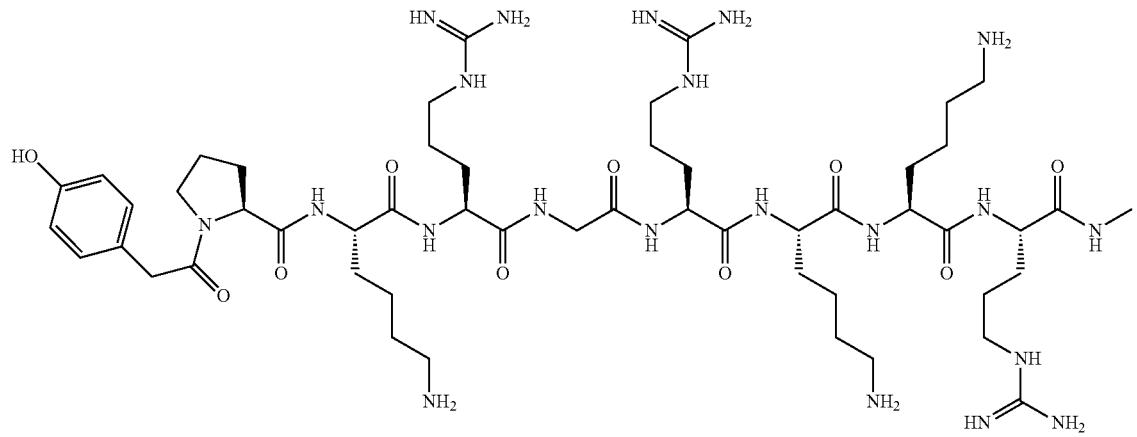

-continued
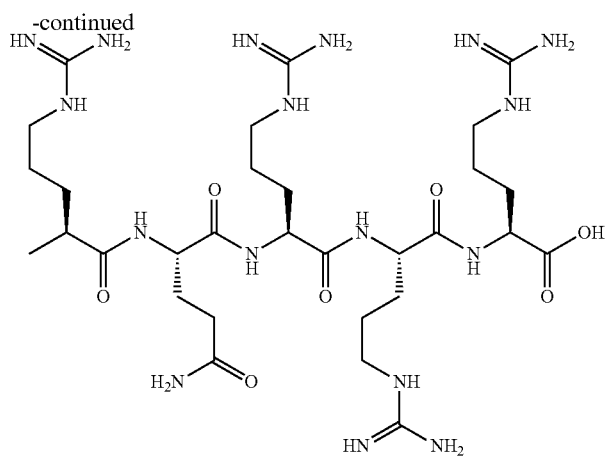
HRMS (MALDI-MASS) calculated for $C_{80}H_{147}N_{38}O_{17}$ (M+H)$^+$ m/z 1912.1728.
(S)—N-((6S,9S,12S,15S,18S,21S,24S)-1,28-di-amino-6-carbamoyl-9,12,15,18,21-pentakis(3-guanidinopropyl)-1-imino-8,11,14,17,20,23-hexaoxo-2,7,10,13,16,19,22-heptaazaoctacosan-24-yl)-1-(2-(4-hydroxyphenyl)acetyl)pyrrolidine-2-carboxamide (33)
(SEQ ID NO: 5)
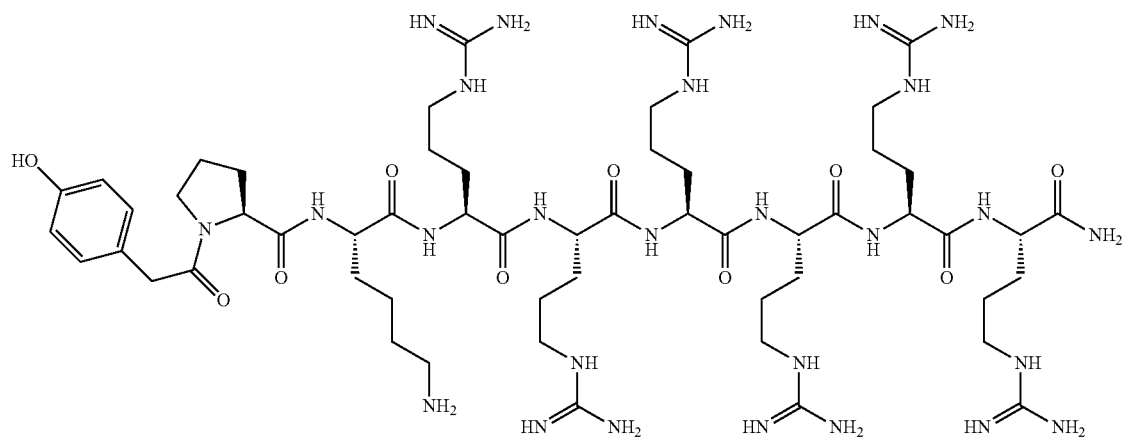
HRMS (MALDI-MASS) calculated for $C_{55}H_{101}N_{28}O_{10}$ (M+H)$^+$ m/z 1313.8177.

(S)—N-((6S,9S,12S,15S,18S,21S,24S)-1,28-di-amino-6-carbamoyl-9,12,15,18,21-pentakis(3-guanidinopropyl)-1-imino-8,11,14,17,20,23-hexaoxo-2,7,10,13,16,19,22-heptaazaoctacosan-24-yl)-1-(2-(naphthalen-1-yl)acetyl)pyrrolidine-2-carboxamide (34)

(SEQ ID NO: 6)

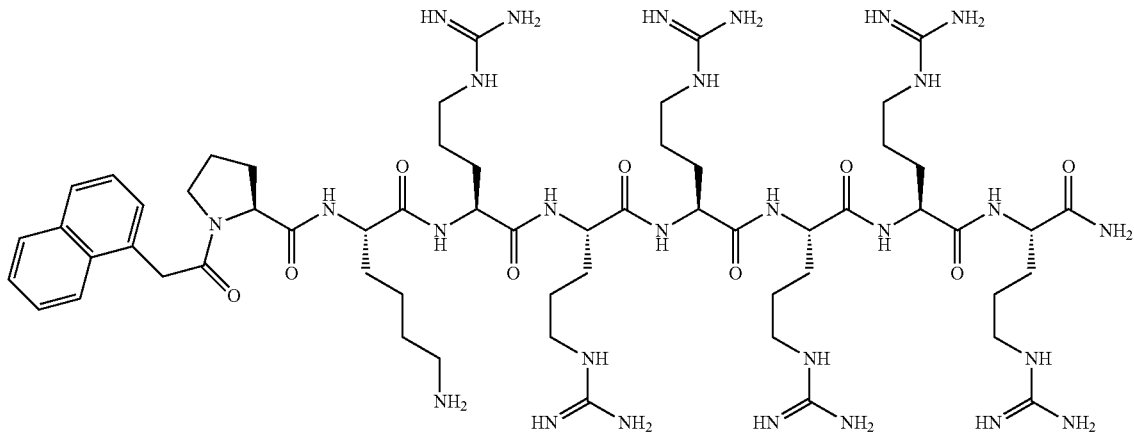

HRMS (MALDI-MASS) calculated for $C_{59}H_{103}N_{28}O_9$ (M+H)+ m/z 1347.8385.

(S)—N—((S)-6-amino-1-(((S)-1-amino-5-guanidino-1-oxopentan-2-yl)(methyl)amino)-1-oxohexan-2-yl)-1-(2-(naphthalen-1-yl)acetyl)pyrrolidine-2-carboxamide (35)

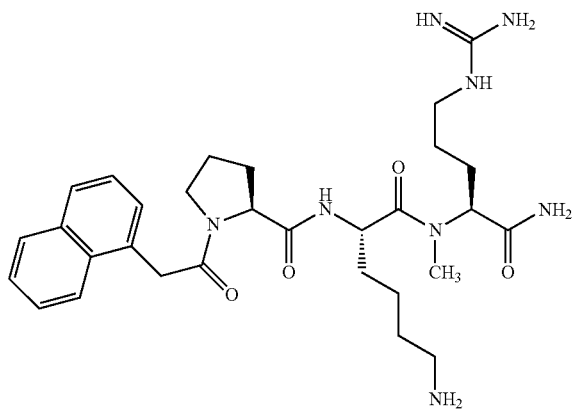 [SMILES: CN(C(=O)[C@H](CCCCN)NC(=O)[C@@H]1CCCN1C(=O)Cc1cccc2ccccc12)[C@@H](CCCNC(=N)N)C(N)=O]

HRMS (MALDI-MASS) calculated for $C_{30}H_{45}N_8O_4$ (M+H)+ m/z 581.3564.

(S)—N—((S)-6-amino-1-(((S)-1-amino-1-oxopropan-2-yl)amino)-1-oxohexan-2-yl)-1-(2-(naphthalen-1-yl)acetyl)pyrrolidine-2-carboxamide (36)

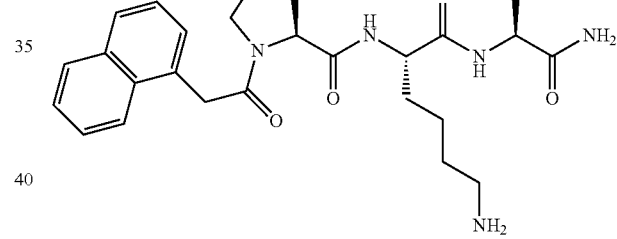

HRMS (MALDI-MASS) calculated for $C_{26}H_{36}N_5O_4$ (M+H)+ m/z 482.2767.

(S)—N—((S)-6-amino-1-((2-amino-2-oxoethyl)amino)-1-oxohexan-2-yl)-1-(2-(naphthalen-1-yl)acetyl)pyrrolidine-2-carboxamide (37)

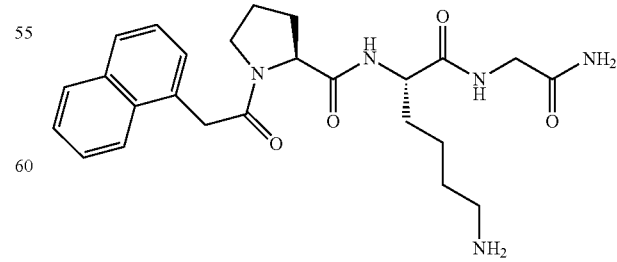

HRMS (MALDI-MASS) calculated for $C_{25}H_{34}N_5O_4$ (M+H)+ m/z 468.2611.

91

(S)—N—((S)-6-amino-1-(((S)-1-amino-3-(1H-imidazol-5-yl)-1-oxopropan-2-yl)amino)-1-oxohexan-2-yl)-1-(2-(naphthalen-1-yl)acetyl)pyrrolidine-2-carboxamide (38)

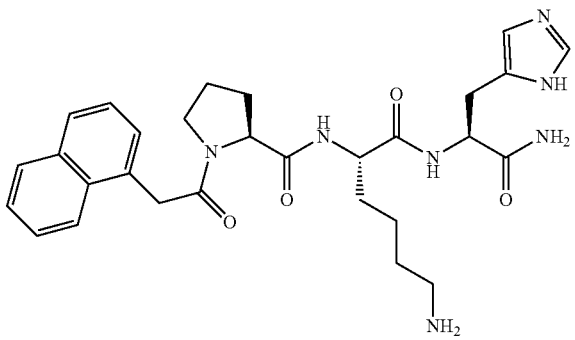 [SMILES: NCCCC[C@H](NC(=O)[C@@H]1CCCN1C(=O)Cc1cccc2ccccc12)C(=O)N[C@@H](Cc1cnc[nH]1)C(N)=O]

HRMS (MALDI-MASS) calculated for $C_{29}H_{38}N_7O_4$ (M+H)$^+$ m/z 548.2984.

92

(S)—N—((S)-6-amino-1-(((S)-1-amino-3-(1H-indol-3-yl)-1-oxopropan-2-yl)amino)-1-oxohexan-2-yl)-1-(2-(naphthalen-1-yl)acetyl)pyrrolidine-2-carboxamide (40)

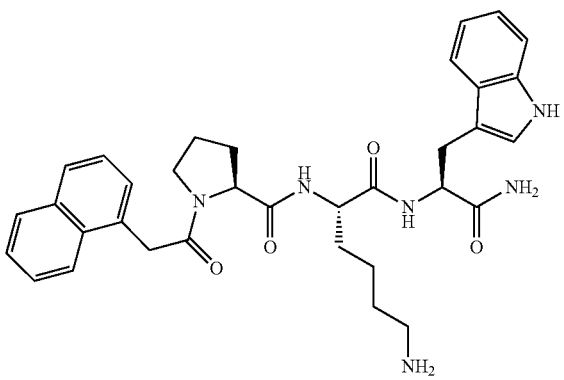

HRMS (MALDI-MASS) calculated for $C_{34}H_{41}N_6O_4$ (M+H)$^+$ m/z 597.3189.

(S)-5-amino-4-((S)-6-amino-2-((S)-1-(2-(naphthalen-1-yl)acetyl)pyrrolidine-2-carboxamido)hexanamido)-5-oxopentanoic acid (39)

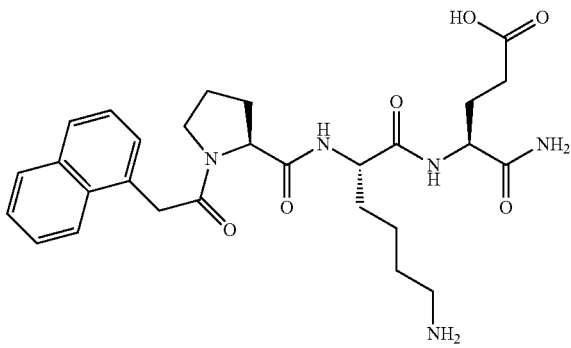 [SMILES: NCCCC[C@H](NC(=O)[C@@H]1CCCN1C(=O)Cc1cccc2ccccc12)C(=O)N[C@@H](CCC(=O)O)C(N)=O]

HRMS (MALDI-MASS) calculated for $C_{28}H_{38}N_5O_6$ (M+H)$^+$ m/z 540.2822.

(S)—N—((S)-6-amino-1-(((S)-1-amino-3-(4-hydroxyphenyl)-1-oxopropan-2-yl)amino)-1-oxohexan-2-yl)-1-(2-(naphthalen-1-yl)acetyl)pyrrolidine-2-carboxamide (41)

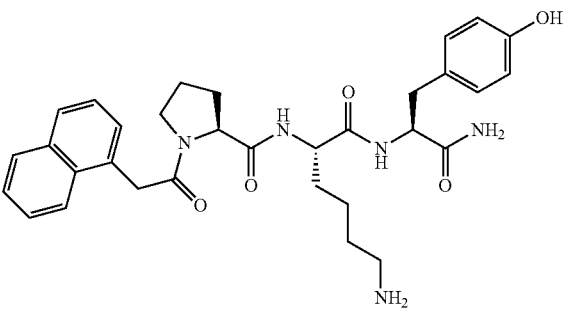 [SMILES: NCCCC[C@H](NC(=O)[C@@H]1CCCN1C(=O)Cc1cccc2ccccc12)C(=O)N[C@@H](Cc1ccc(O)cc1)C(N)=O]

HRMS (MALDI-MASS) calculated for $C_{32}H_{40}N_5O_5$ (M+H)$^+$ m/z 574.3029.

(S)—N—((S)-6-amino-1-(((S)-1-amino-1-oxo-3-phenylpropan-2-yl)amino)-1-oxohexan-2-yl)-1-(2-(naphthalen-1-yl)acetyl)pyrrolidine-2-carboxamide (42)

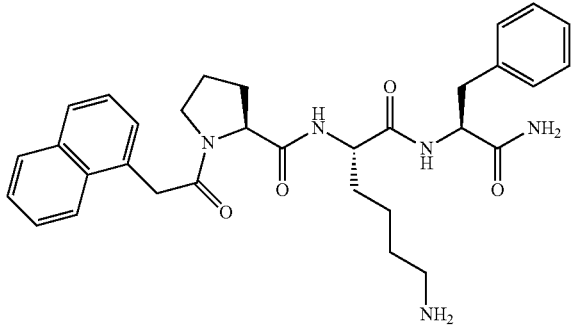 [SMILES: NCCCC[C@H](NC(=O)[C@@H]1CCCN1C(=O)Cc1cccc2ccccc12)C(=O)N[C@@H](Cc1ccccc1)C(N)=O]

HRMS (MALDI-MASS) calculated for $C_{32}H_{40}N_5O_4$ $(M+H)^+$ m/z 558.3080.

(S)—N—((S)-6-amino-1-(((S)-1-(((S)-1-amino-3-(1H-indol-3-yl)-1-oxopropan-2-yl)amino)-5-guanidino-1-oxopentan-2-yl)amino)-1-oxohexan-2-yl)pyrrolidine-2-carboxamide (43)

(SEQ ID NO: 7)

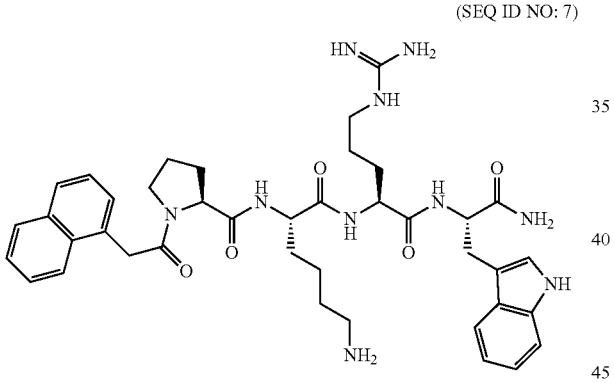

HRMS (MALDI-MASS) calculated for $C_{40}H_{52}N_{10}O_5$ $(M+H)^+$ m/z 753.4200.

(S)—N—((S)-6-amino-1-(((S)-1-(((S)-1-amino-3-(4-hydroxyphenyl)-1-oxopropan-2-yl)amino)-5-guanidino-1-oxopentan-2-yl)amino)-1-oxohexan-2-yl)-1-(2-(naphthalen-1-yl)acetyl)pyrrolidine-2-carboxamide (44)

(SEQ ID NO: 8)

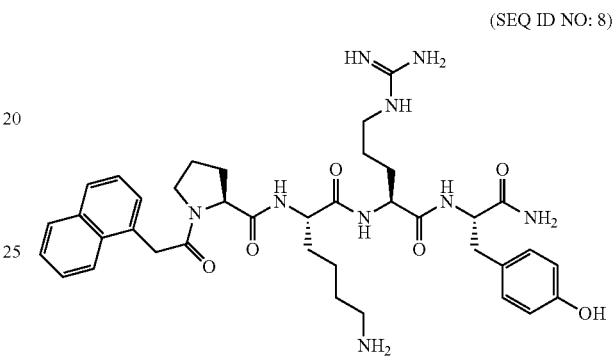

HRMS (MALDI-MASS) calculated for $C_{38}H_{52}N_9O_6$ $(M+H)^+$ m/z 730.4041.

(S)—N—((S)-6-amino-1-(((S)-6-amino-1-((2-(2-amino-2-oxoethoxy)ethyl)amino)-1-oxohexan-2-yl)amino)-1-oxohexan-2-yl)-1-(2-(naphthalen-1-yl)acetyl)pyrrolidine-2-carboxamide (45)

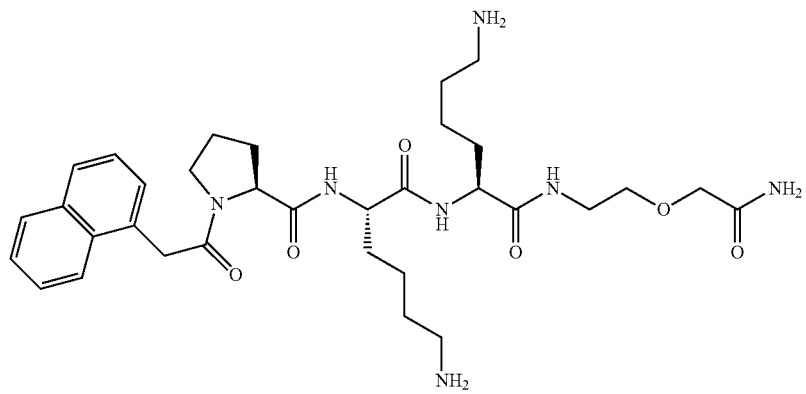 [SMILES: NCCCC[C@H](NC(=O)[C@H](CCCCN)NC(=O)[C@@H]1CCCN1C(=O)Cc1cccc2ccccc12)C(=O)NCCOCC(N)=O]

HRMS (MALDI-MASS) calculated for $C_{33}H_{50}N_7O_6$ $(M+H)^+$ m/z 640.3823.

(S)—N—((S)-6-amino-1-(((S)-6-amino-1-((3-carbamoylphenyl)amino)-1-oxohexan-2-yl)amino)-1-oxohexan-2-yl)-1-(2-(naphthalen-1-yl)acetyl)pyrrolidine-2-carboxamide (46)

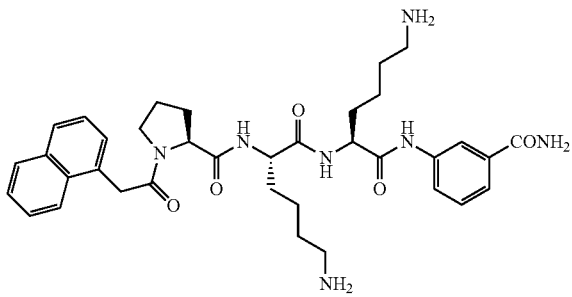 [SMILES: NCCCC[C@H](NC(=O)[C@H](CCCCN)NC(=O)[C@@H]1CCCN1C(=O)Cc1cccc2ccccc12)C(=O)Nc1cccc(C(N)=O)c1]

HRMS (MALDI-MASS) calculated for $C_{36}H_{48}N_7O_5$ $(M+H)^+$ m/z 658.3717.

Those skilled in the art will recognize that numerous modifications can be made to the specific implementations described above. The implementations should not be limited to the particular limitations described. Other implementations may be possible.

It is intended that that the scope of the present methods and compositions be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:
1. A compound selected from the group consisting of:
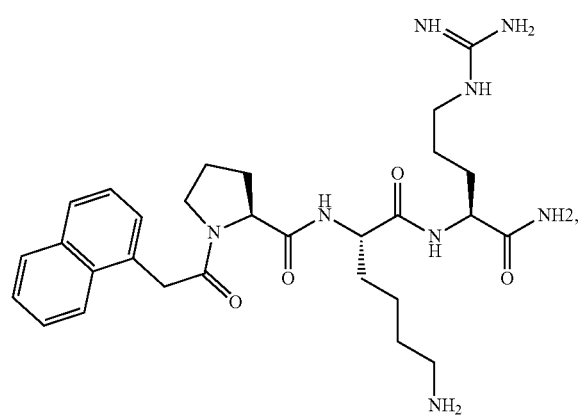
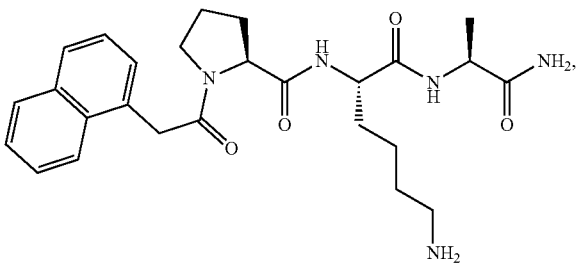
wherein the compound exhibits N-terminal methyltransferase 1 (NTMT1) inhibiting activity.
2. A pharmaceutical composition comprising one or more compounds of claim 1, together with one or more pharmaceutically acceptable diluents, excipients, or carriers.

```
                        SEQUENCE LISTING

<160> NUMBER OF SEQ ID NOS: 13

<210> SEQ ID NO 1
<211> LENGTH: 4
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (4)..(4)
<223> OTHER INFORMATION: AMIDATION

<400> SEQUENCE: 1

Pro Lys Arg Ile
1

<210> SEQ ID NO 2
<211> LENGTH: 4
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (4)..(4)
<223> OTHER INFORMATION: ACETYLATION,
<220> FEATURE:
<221> NAME/KEY: MOD_RES
<222> LOCATION: (4)..(4)
<223> OTHER INFORMATION: AMIDATION

<400> SEQUENCE: 2

Pro Lys Arg Arg
1

<210> SEQ ID NO 3
```

```
<211> LENGTH: 4
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (4)..(4)
<223> OTHER INFORMATION: beta-acetyleneala

<400> SEQUENCE: 3

Pro Lys Arg Xaa
1

<210> SEQ ID NO 4
<211> LENGTH: 13
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,

<400> SEQUENCE: 4

Pro Lys Arg Gly Arg Lys Lys Arg Arg Asn Arg Arg Arg
1               5                   10

<210> SEQ ID NO 5
<211> LENGTH: 8
<212> TYPE: PRT
<213> ORGANISM: Artificial sequence
<220> FEATURE:
<223> OTHER INFORMATION: terminal modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (8)..(8)
<223> OTHER INFORMATION: AMIDATION

<400> SEQUENCE: 5

Pro Lys Arg Arg Arg Arg Arg Arg
1               5

<210> SEQ ID NO 6
<211> LENGTH: 8
<212> TYPE: PRT
<213> ORGANISM: Artificial sequence
<220> FEATURE:
<223> OTHER INFORMATION: terminal modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (8)..(8)
<223> OTHER INFORMATION: AMIDATION

<400> SEQUENCE: 6

Pro Lys Arg Arg Arg Arg Arg Arg
1               5
```

```
<210> SEQ ID NO 7
<211> LENGTH: 4
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (4)..(4)
<223> OTHER INFORMATION: AMIDATION

<400> SEQUENCE: 7

Pro Lys Arg Trp
1

<210> SEQ ID NO 8
<211> LENGTH: 4
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (4)..(4)
<223> OTHER INFORMATION: AMIDATION

<400> SEQUENCE: 8

Pro Lys Arg Tyr
1

<210> SEQ ID NO 9
<211> LENGTH: 4
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (4)..(4)
<223> OTHER INFORMATION: AMIDATION

<400> SEQUENCE: 9

Pro Lys Arg Arg
1

<210> SEQ ID NO 10
<211> LENGTH: 4
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (4)..(4)
<223> OTHER INFORMATION: AMIDATION

<400> SEQUENCE: 10
```

```
Pro Pro Lys Arg
1

<210> SEQ ID NO 11
<211> LENGTH: 4
<212> TYPE: PRT
<213> ORGANISM: Artificial sequenence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: ACETYLATION,
<220> FEATURE:
<221> NAME/KEY: MOD_RES
<222> LOCATION: (4)..(4)
<223> OTHER INFORMATION: AMIDATION

<400> SEQUENCE: 11

Tyr Pro Lys Arg
1

<210> SEQ ID NO 12
<211> LENGTH: 4
<212> TYPE: PRT
<213> ORGANISM: Artificial sequence
<220> FEATURE:
<223> OTHER INFORMATION: terminal ends modified peptide
<220> FEATURE:
<221> NAME/KEY: MOD_RES
<222> LOCATION: (1)..(1)
<223> OTHER INFORMATION: N-ETHYLATION,
<220> FEATURE:
<221> NAME/KEY: MOD_RES
<222> LOCATION: (4)..(4)
<223> OTHER INFORMATION: AMIDATION

<400> SEQUENCE: 12

Tyr Pro Lys Arg
1

<210> SEQ ID NO 13
<211> LENGTH: 4
<212> TYPE: PRT
<213> ORGANISM: Artificial sequence
<220> FEATURE:
<223> OTHER INFORMATION: Terminal ends modified peptide
<220> FEATURE:
<221> NAME/KEY: MOD_RES
<222> LOCATION: (1)..(1)
<223> OTHER INFORMATION: 2-ETHYLATION,
<220> FEATURE:
<221> NAME/KEY: MOD_RES
<222> LOCATION: (1)..(1)
<220> FEATURE:
<221> NAME/KEY: MOD_RES
<222> LOCATION: (4)..(4)
<223> OTHER INFORMATION: AMIDATION

<400> SEQUENCE: 13

Tyr Pro Lys Arg
1
```